United States Patent
Hyde et al.

(10) Patent No.: US 9,793,596 B2
(45) Date of Patent: Oct. 17, 2017

(54) FACILITATING WIRELESS COMMUNICATION IN CONJUNCTION WITH ORIENTATION POSITION

(71) Applicant: Elwha LLC, Bellevue, WA (US)

(72) Inventors: Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 100 days.

(21) Appl. No.: 13/902,585

(22) Filed: May 24, 2013

(65) Prior Publication Data

US 2015/0031345 A1    Jan. 29, 2015

Related U.S. Application Data

(63) Continuation-in-part of application No. 13/842,040, filed on Mar. 15, 2013.

(51) Int. Cl.
*H04M 1/00* (2006.01)
*H01Q 1/24* (2006.01)
(Continued)

(52) U.S. Cl.
CPC .............. *H01Q 1/241* (2013.01); *H01Q 3/26* (2013.01); *H01Q 15/0086* (2013.01);
(Continued)

(58) Field of Classification Search
CPC ........ H03W 8/245; H01Q 3/26; H04W 16/28; H04M 1/72519
(Continued)

(56) References Cited

U.S. PATENT DOCUMENTS 5,347,286 A    9/1994  Babitch
5,515,059 A    5/1996  How et al.
(Continued)

FOREIGN PATENT DOCUMENTS

CN    102790277 A    11/2012
EP    1 124 391 A1    8/2001
(Continued)

OTHER PUBLICATIONS

Brown, Michael; "Meet 60Ghz Wi-Fi, the insanely fast future of wireless networking," PC World; http://www.pcworld.com/article/2030041/meet-60ghz-wi-fi-the-insanely-fast-future-of-wireless-networking.html, Mar. 6, 2013.
(Continued)

*Primary Examiner* — Danh Le

(57) ABSTRACT

Disclosed herein are example embodiments for facilitating wireless communication in conjunction with orientation position. For certain example embodiments, at least one device, such as a portable wireless node: (i) may obtain one or more antenna assembly configuration parameters that are associated with at least one orientation position of at least one portable wireless node; or (ii) may utilize one or more antenna assembly configuration parameters that are associated with at least one orientation position of at least one portable wireless node. However, claimed subject matter is not limited to any particular described embodiments, implementations, examples, or so forth.

41 Claims, 35 Drawing Sheets

(51) Int. Cl.
*H01Q 3/26* (2006.01)
*H01Q 15/00* (2006.01)
*H04W 16/28* (2009.01)
*H04W 88/00* (2009.01)
*H04L 12/24* (2006.01)

(52) U.S. Cl.
CPC ......... *H04L 41/0803* (2013.01); *H04W 16/28* (2013.01); *H04W 88/00* (2013.01)

(58) Field of Classification Search
USPC ................ 455/562.1, 550.1, 418; 342/372
See application file for complete search history.

(56) References Cited

U.S. PATENT DOCUMENTS

| | | | |
|---|---|---|---|
| 6,122,524 A | 9/2000 | Goerke | |
| 6,571,097 B1* | 5/2003 | Takai | H04B 7/086 370/331 |
| 6,954,180 B1* | 10/2005 | Braun | H01Q 1/242 343/702 |
| 6,980,782 B1 | 12/2005 | Braun et al. | |
| 7,068,234 B2 | 6/2006 | Sievenpiper | |
| 7,106,715 B1 | 9/2006 | Kelton et al. | |
| 7,688,306 B2 | 3/2010 | Wehrenberg et al. | |
| 7,911,386 B1 | 3/2011 | Itoh et al. | |
| 7,978,063 B2 | 7/2011 | Baldus et al. | |
| 8,159,399 B2 | 4/2012 | Dorsey et al. | |
| 8,217,843 B2 | 7/2012 | Shtrom et al. | |
| 8,280,427 B2 | 10/2012 | Wang et al. | |
| 8,494,558 B2 | 7/2013 | Jonsson et al. | |
| 8,548,525 B2 | 10/2013 | Wong et al. | |
| 8,577,392 B1 | 11/2013 | Pai et al. | |
| 8,618,937 B2 | 12/2013 | Rofougaran et al. | |
| 8,792,414 B2 | 7/2014 | Kish | |
| 2002/0147032 A1 | 10/2002 | Yoon et al. | |
| 2003/0090418 A1 | 5/2003 | Howell | |
| 2003/0236096 A1 | 12/2003 | Yamazaki | |
| 2004/0198401 A1* | 10/2004 | Rodgers | H04B 7/022 455/502 |
| 2004/0204026 A1 | 10/2004 | Steer et al. | |
| 2004/0259497 A1 | 12/2004 | Dent | |
| 2005/0195103 A1 | 9/2005 | Davis et al. | |
| 2005/0250543 A1 | 11/2005 | Thermond | |
| 2006/0017692 A1 | 1/2006 | Wehrenberg et al. | |
| 2006/0052112 A1 | 3/2006 | Baussi et al. | |
| 2006/0148405 A1 | 7/2006 | Wu et al. | |
| 2006/0232468 A1 | 10/2006 | Parker et al. | |
| 2007/0063911 A1 | 3/2007 | Davidson et al. | |
| 2008/0074307 A1 | 3/2008 | Boric-Lubecke et al. | |
| 2008/0077326 A1 | 3/2008 | Funk et al. | |
| 2008/0096566 A1 | 4/2008 | Brunner et al. | |
| 2008/0242354 A1* | 10/2008 | Rofougaran | 455/557 |
| 2008/0258971 A1 | 10/2008 | Nichols et al. | |
| 2008/0274712 A1 | 11/2008 | Rofougaran | |
| 2008/0304425 A1 | 12/2008 | Karaoguz | |
| 2008/0311851 A1 | 12/2008 | Hansen et al. | |
| 2008/0311957 A1 | 12/2008 | Jantunen et al. | |
| 2009/0047950 A1 | 2/2009 | Doppler et al. | |
| 2009/0117858 A1 | 5/2009 | Furrer et al. | |
| 2009/0212941 A1 | 8/2009 | Vock et al. | |
| 2009/0325479 A1 | 12/2009 | Chakrabarti et al. | |
| 2010/0027518 A1 | 2/2010 | Wang | |
| 2010/0080177 A1 | 4/2010 | Rofougaran | |
| 2010/0097208 A1 | 4/2010 | Rosing et al. | |
| 2010/0177664 A1* | 7/2010 | Thoumy | H04B 7/0617 370/254 |
| 2010/0188331 A1 | 7/2010 | Wehrenberg et al. | |
| 2010/0194655 A1 | 8/2010 | Cook | |
| 2010/0194663 A1 | 8/2010 | Rothwell et al. | |
| 2010/0211777 A1 | 8/2010 | Ishihara et al. | |
| 2010/0231453 A1 | 9/2010 | Shinkai et al. | |
| 2010/0231473 A1 | 9/2010 | Shtrom et al. | |
| 2010/0279751 A1 | 11/2010 | Pourseyed et al. | |
| 2010/0297953 A1 | 11/2010 | Rofougaran | |
| 2010/0309872 A1 | 12/2010 | Amini et al. | |
| 2011/0009105 A1 | 1/2011 | Lee et al. | |
| 2011/0015860 A1 | 1/2011 | Nesbitt | |
| 2011/0063168 A1 | 3/2011 | Skarp | |
| 2011/0090113 A1 | 4/2011 | Fenton | |
| 2011/0105184 A1* | 5/2011 | Piirainen | H04W 24/02 455/562.1 |
| 2011/0143746 A1* | 6/2011 | Lehser | 455/423 |
| 2011/0151931 A1 | 6/2011 | Kish et al. | |
| 2011/0175672 A1 | 7/2011 | Nguyen et al. | |
| 2011/0201357 A1 | 8/2011 | Garrett et al. | |
| 2011/0207444 A1 | 8/2011 | Hansen et al. | |
| 2011/0210787 A1 | 9/2011 | Lee et al. | |
| 2011/0250928 A1 | 10/2011 | Schlub et al. | |
| 2011/0273359 A1 | 11/2011 | Tischer et al. | |
| 2011/0298672 A1 | 12/2011 | Otto et al. | |
| 2011/0305175 A1* | 12/2011 | Hethuin | H01Q 1/125 370/310 |
| 2011/0306306 A1 | 12/2011 | Reed | |
| 2012/0009942 A1 | 1/2012 | Zoubir | |
| 2012/0014367 A1* | 1/2012 | Caillerie | H04B 7/0639 370/345 |
| 2012/0021693 A1 | 1/2012 | Wintzell et al. | |
| 2012/0056784 A1 | 3/2012 | Xie et al. | |
| 2012/0157120 A1 | 6/2012 | Hansen et al. | |
| 2012/0182867 A1 | 7/2012 | Farrag et al. | |
| 2012/0194399 A1 | 8/2012 | Bily et al. | |
| 2012/0202560 A1 | 8/2012 | Donaldson | |
| 2012/0299772 A1 | 11/2012 | Shtrom et al. | |
| 2013/0040655 A1* | 2/2013 | Keidar | H01Q 1/245 455/456.1 |
| 2013/0045759 A1 | 2/2013 | Smith | |
| 2013/0053061 A1 | 2/2013 | Kang et al. | |
| 2013/0078908 A1 | 3/2013 | Smith | |
| 2013/0176161 A1 | 7/2013 | Derham et al. | |
| 2013/0184022 A1* | 7/2013 | Schmidt | H04W 52/281 455/509 |
| 2013/0207806 A1 | 8/2013 | Lehmann | |
| 2014/0051461 A1* | 2/2014 | Ranki | H04W 4/026 455/456.1 |
| 2014/0113671 A1 | 4/2014 | Schwengler | |
| 2014/0120947 A1 | 5/2014 | Siomina | |
| 2014/0153418 A1 | 6/2014 | Hariharan et al. | |
| 2014/0211677 A1 | 7/2014 | Barbieri et al. | |
| 2014/0274112 A1 | 9/2014 | Vitek et al. | |
| 2014/0306843 A1* | 10/2014 | Merkel | G01S 3/14 342/385 |
| 2015/0030256 A1 | 1/2015 | Brady et al. | |

FOREIGN PATENT DOCUMENTS

| | | |
|---|---|---|
| EP | 1 369 954 A3 | 10/2004 |
| EP | 1 562 257 A1 | 8/2005 |
| EP | 2 334 113 A1 | 6/2011 |
| KR | 2003-0019814 | 3/2003 |
| WO | WO 98/29968 A2 | 7/1998 |
| WO | WO 2007/090424 A1 | 8/2007 |
| WO | WO 2012/050614 A1 | 4/2012 |

OTHER PUBLICATIONS

Teral, Stephanie; "Mobile Spectrum, Annual Market Size and Forecasts Analysis", Infonetics Research Inc., Feb. 18, 2013, pp. i-23.

PCT International Search Report; International App. No. PCT/US2014/027741; dated Jul. 28, 2014; 5 pages.

Cisco, "Cisco Wireless LAN Controller Configuration Guide", Software Release 7.0; bearing a date of Jun. 2010; pp. 1-2, 4-68, 4-116, 7-17 and 12-34.

Nokia Corporation; "Linux Cross Reference"; Version 4.0; downloaded on May 28, 2015; pp. 1-24; Copyright © 2009 Nokia Corporation.

European Patent Office, Supplementary European Search Report,

(56) References Cited

OTHER PUBLICATIONS

Pursuant to Rule 62 EPC; App. No. EP 14 76 3930.6; dated Oct. 17, 2016; pp. 1-8.

* cited by examiner

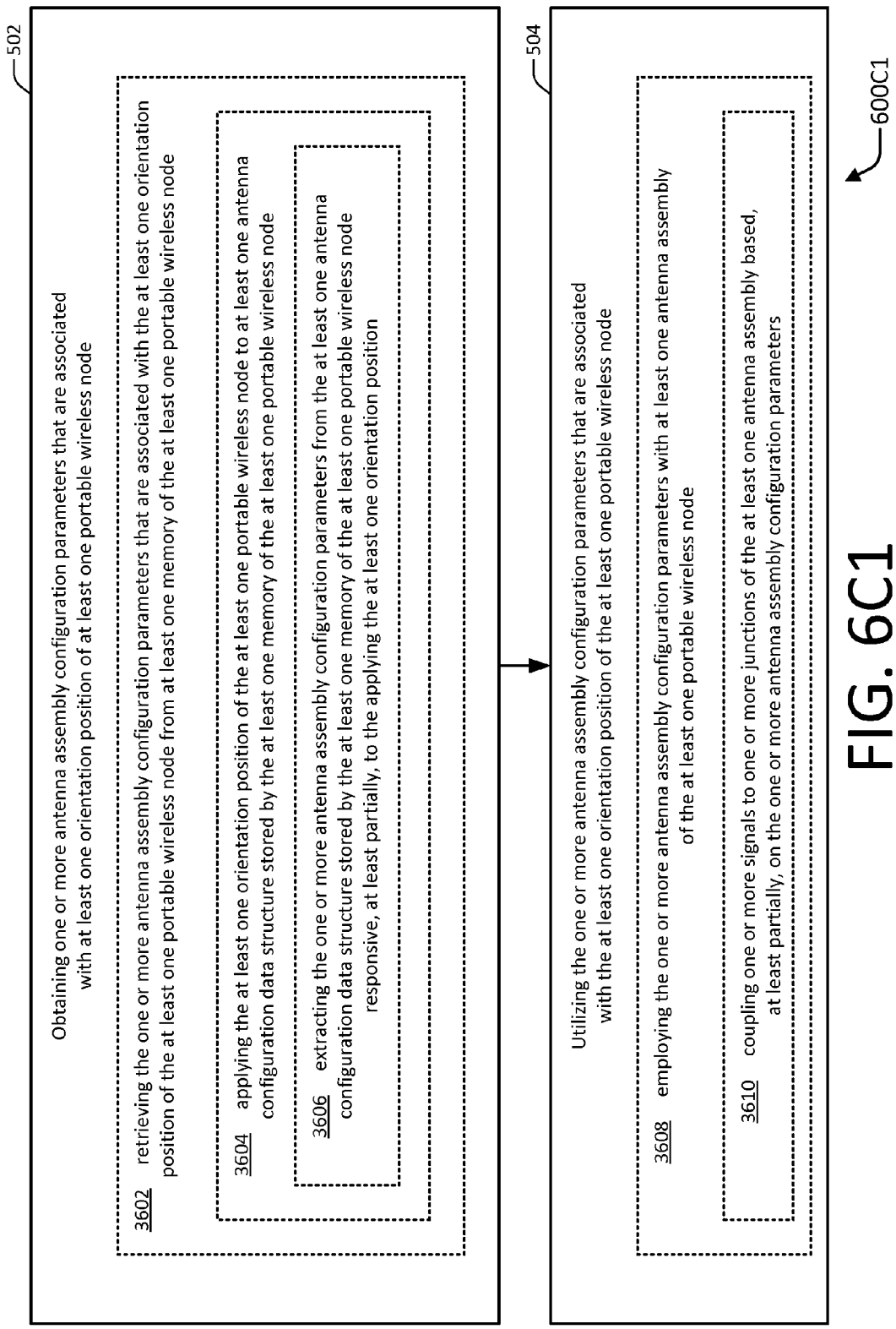
FIG. 6C1

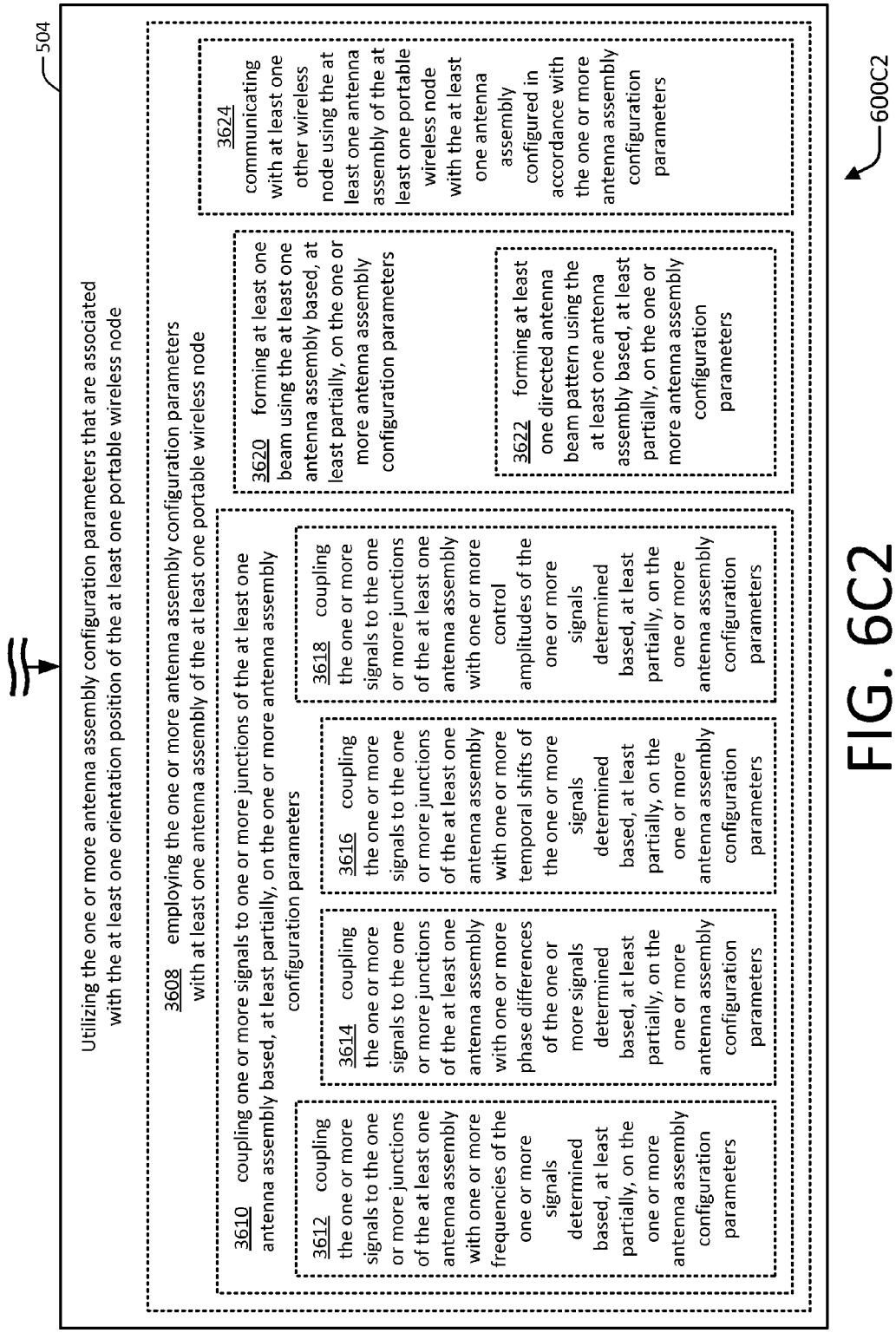
FIG. 6C2

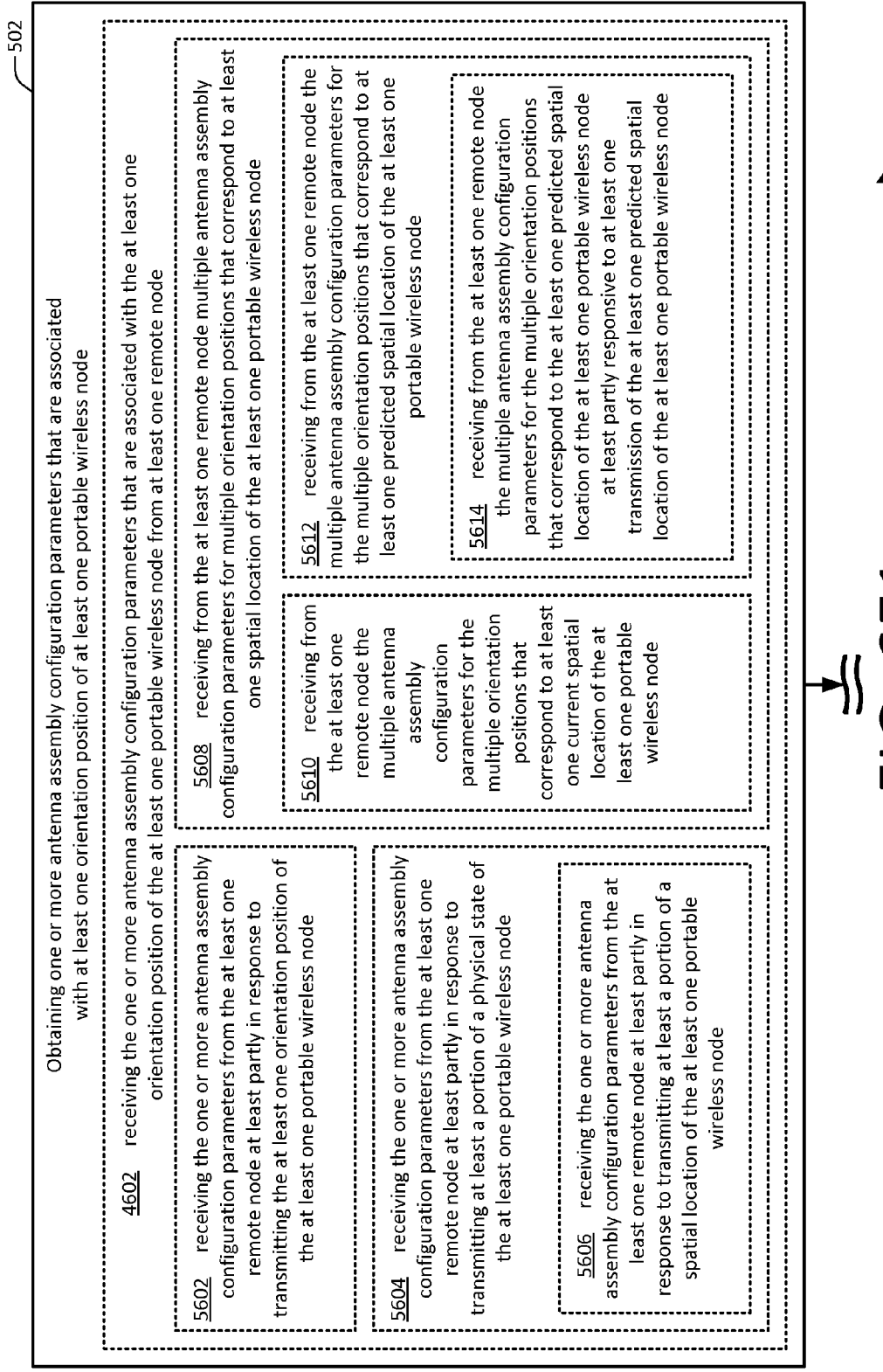
FIG. 6E1

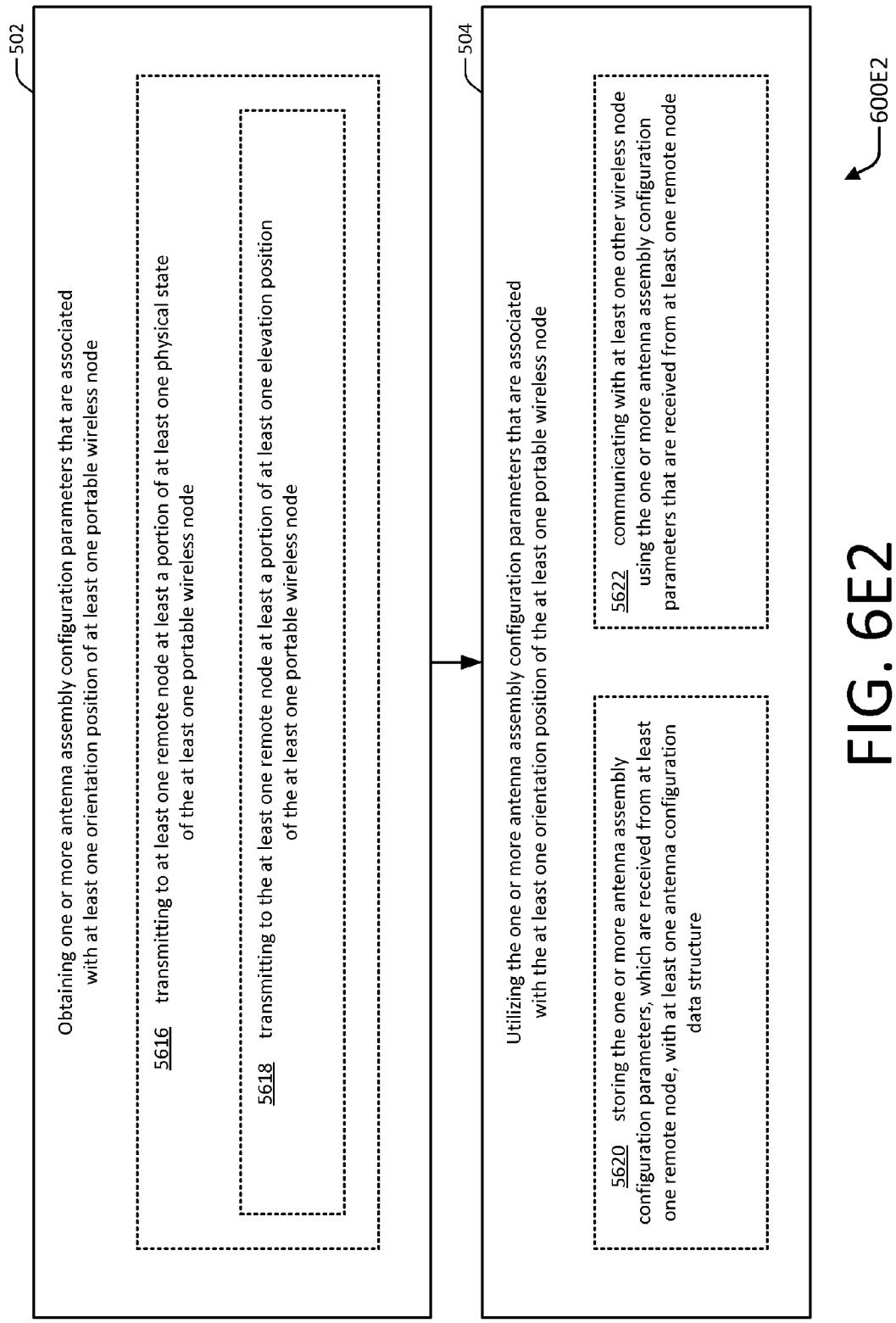
FIG. 6E2

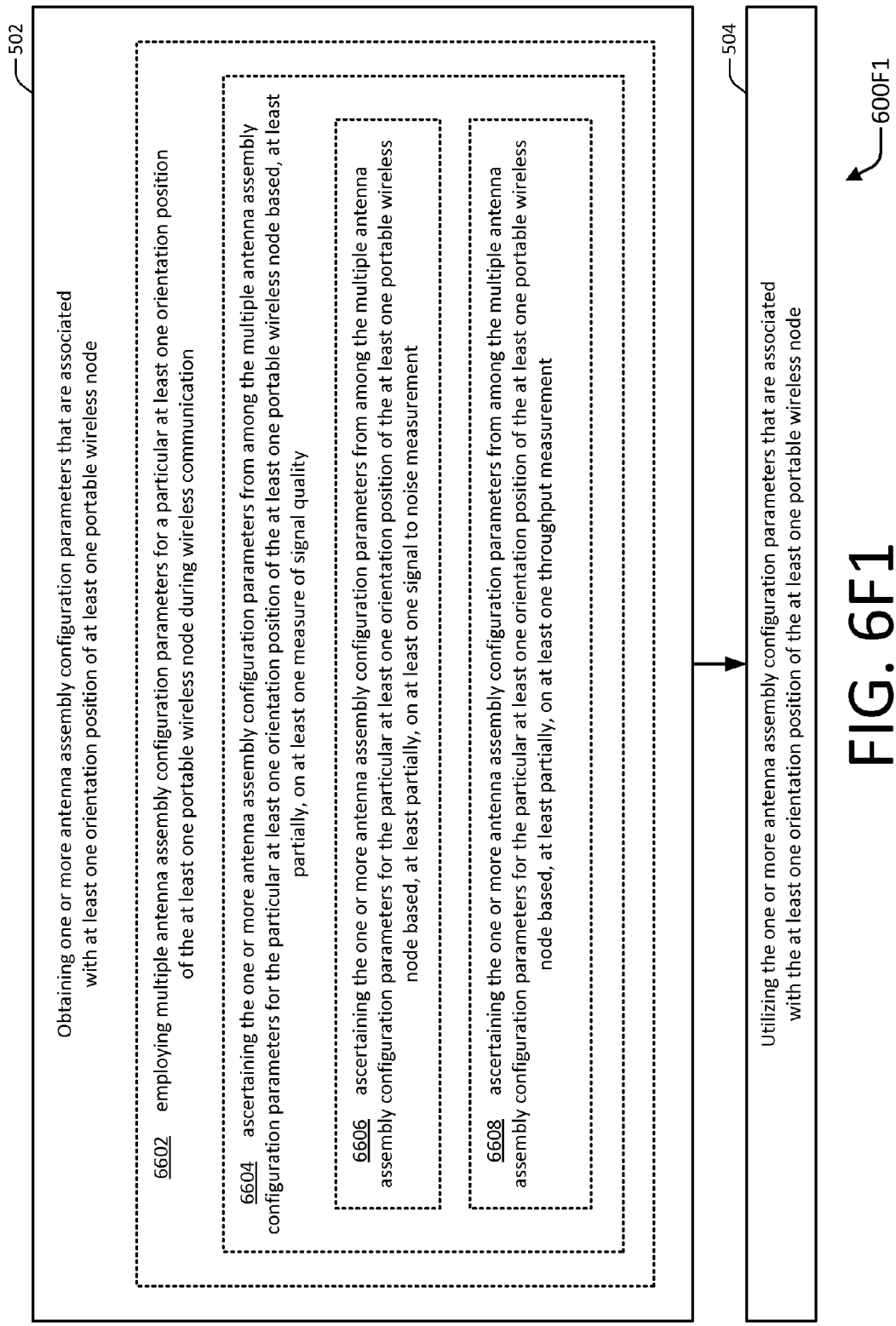

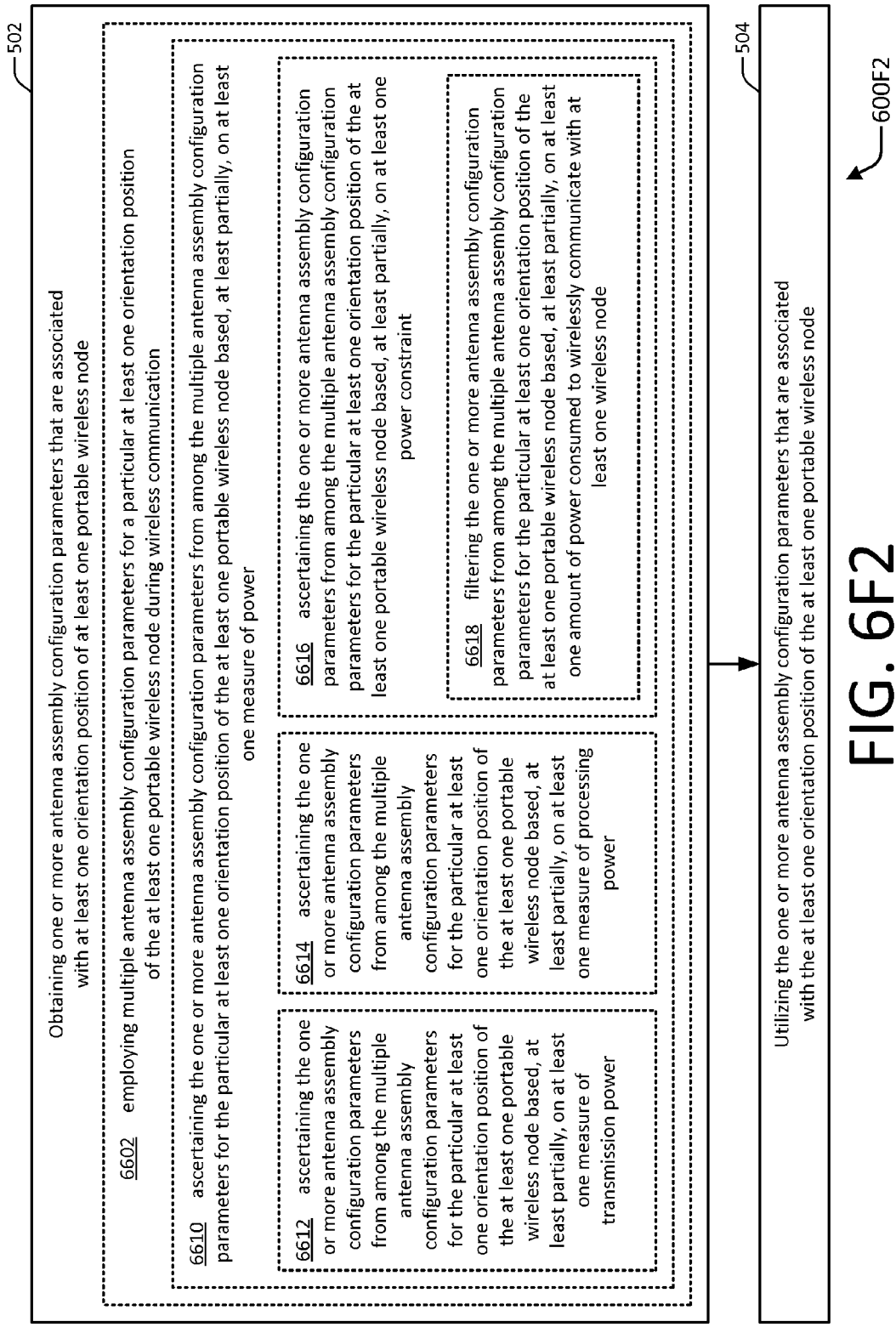
FIG. 6F2

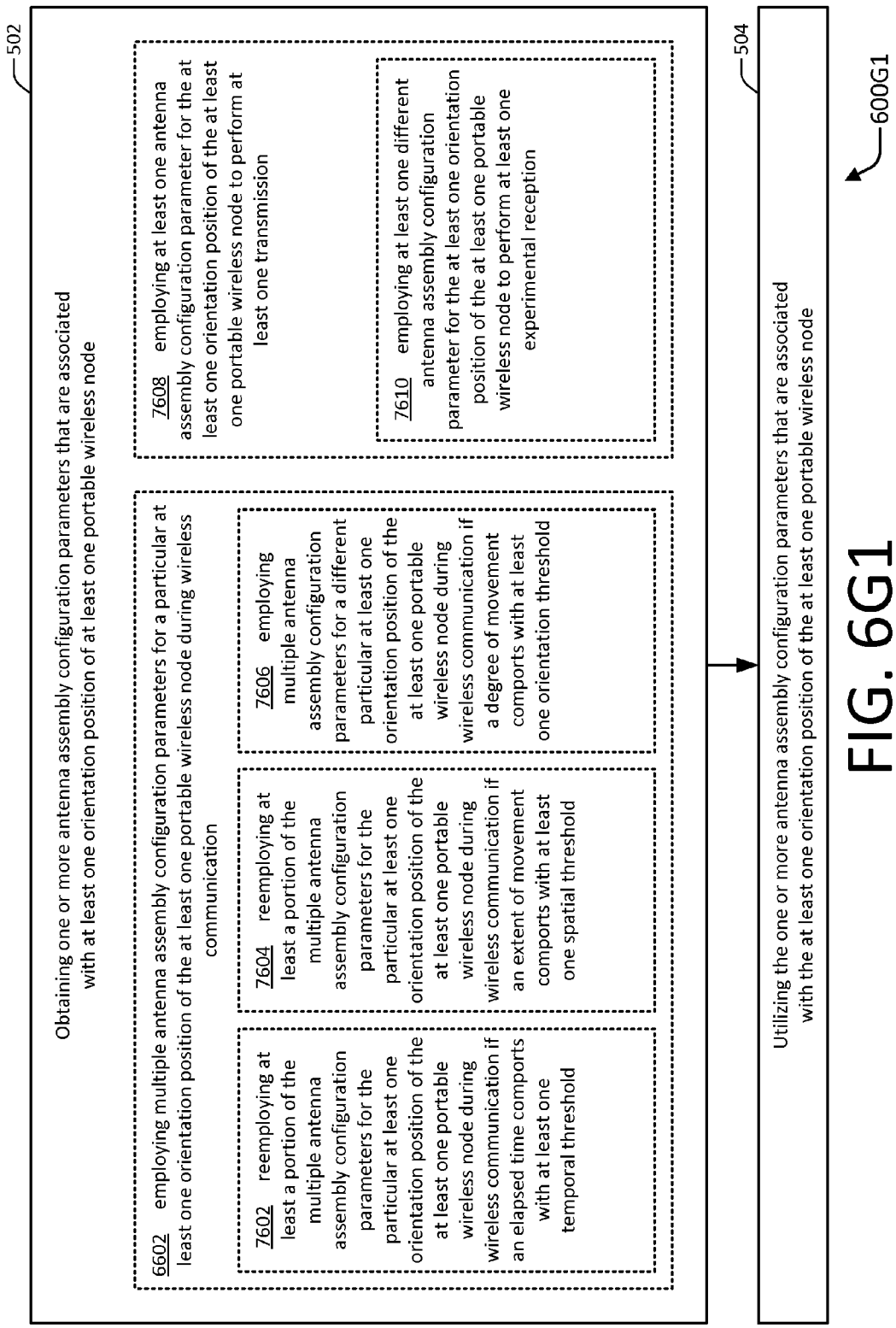

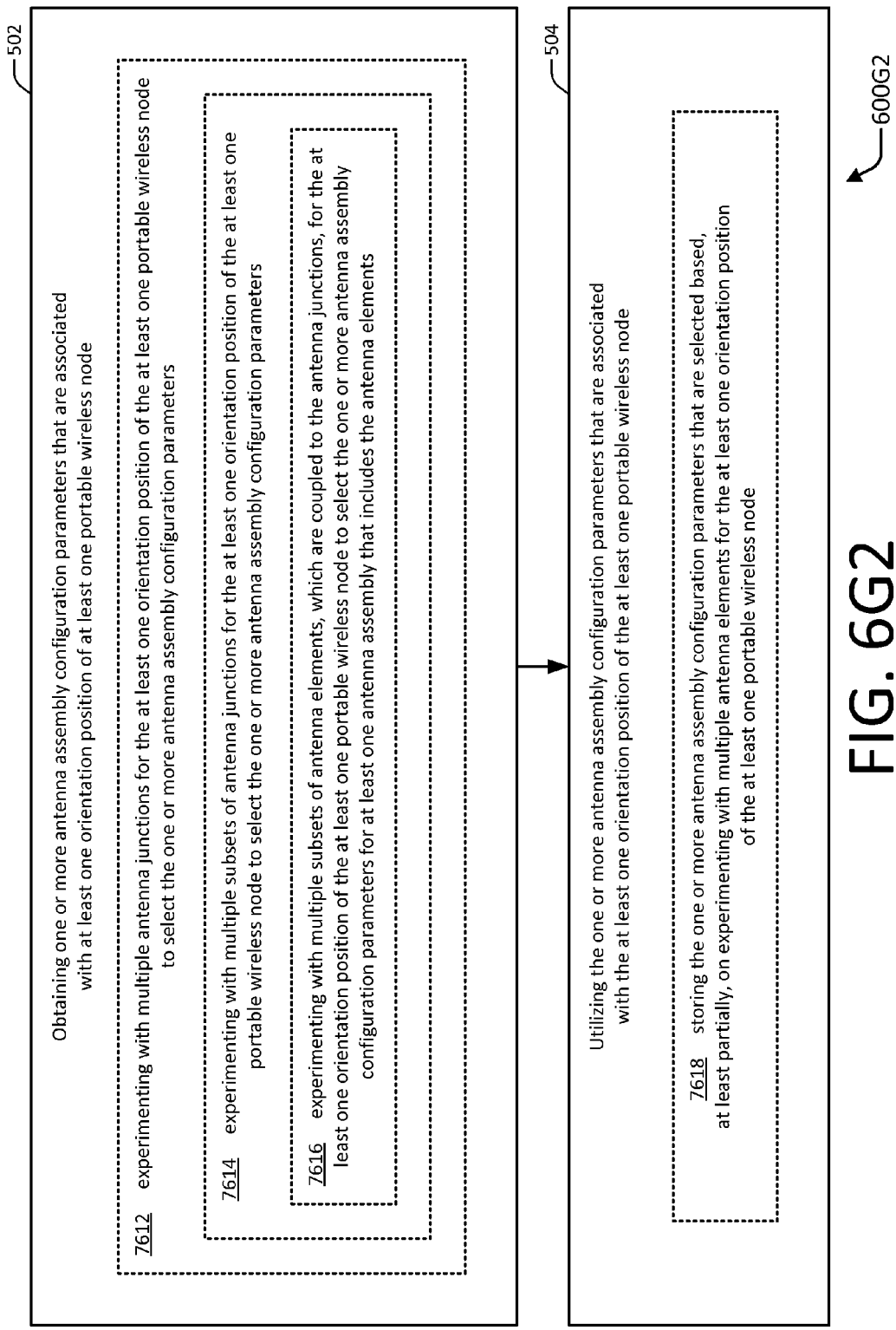

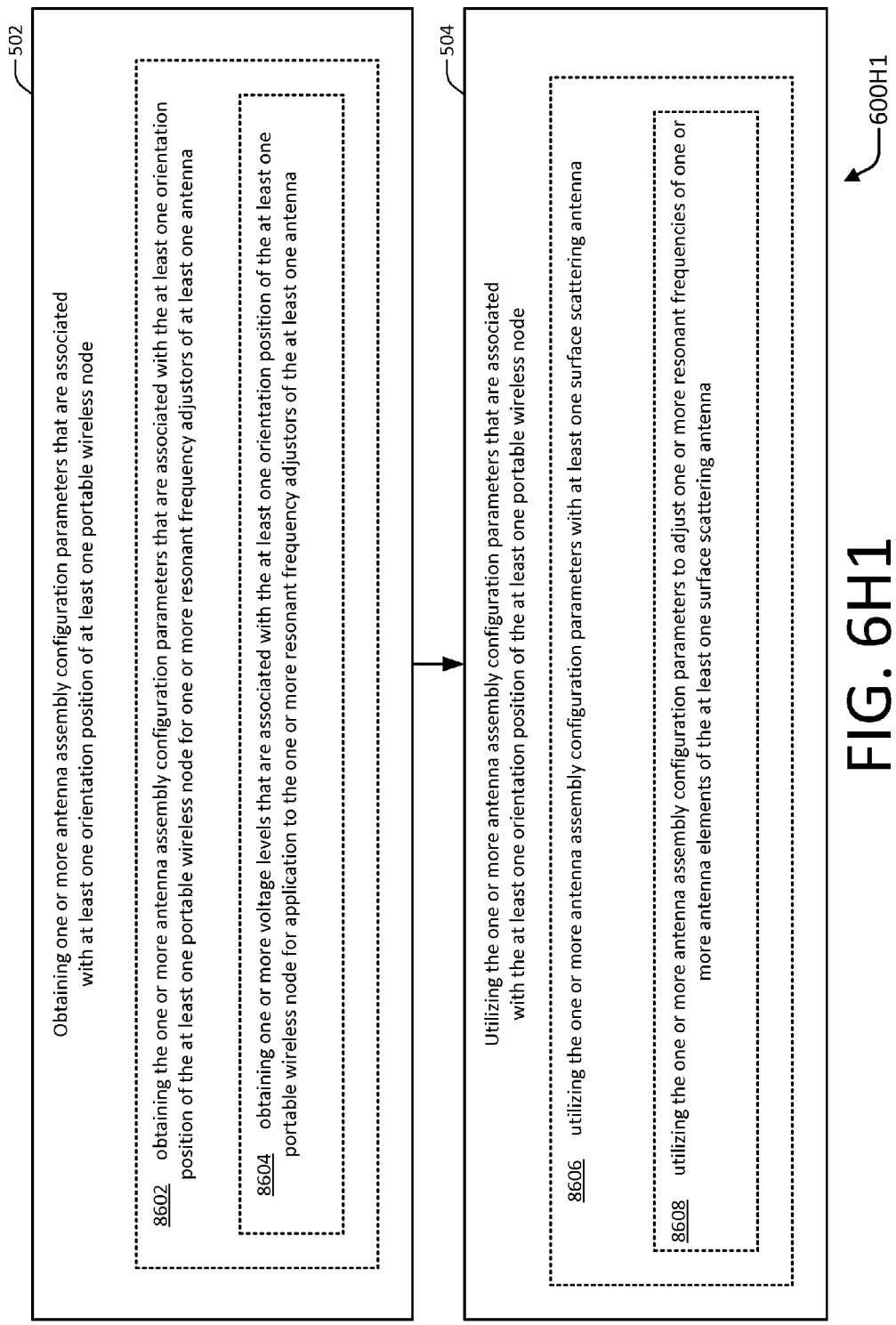
FIG. 6H1

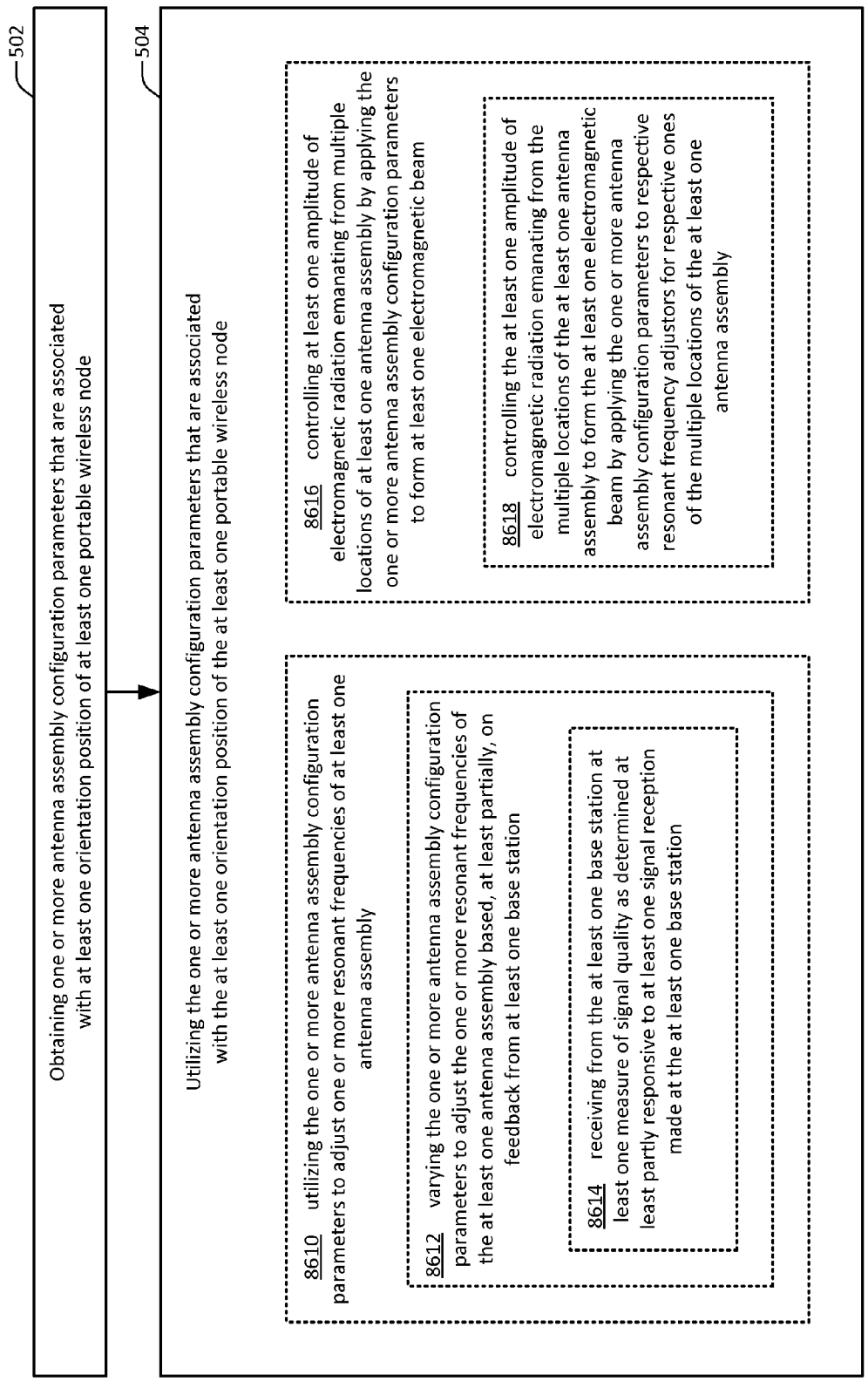
FIG. 6H2

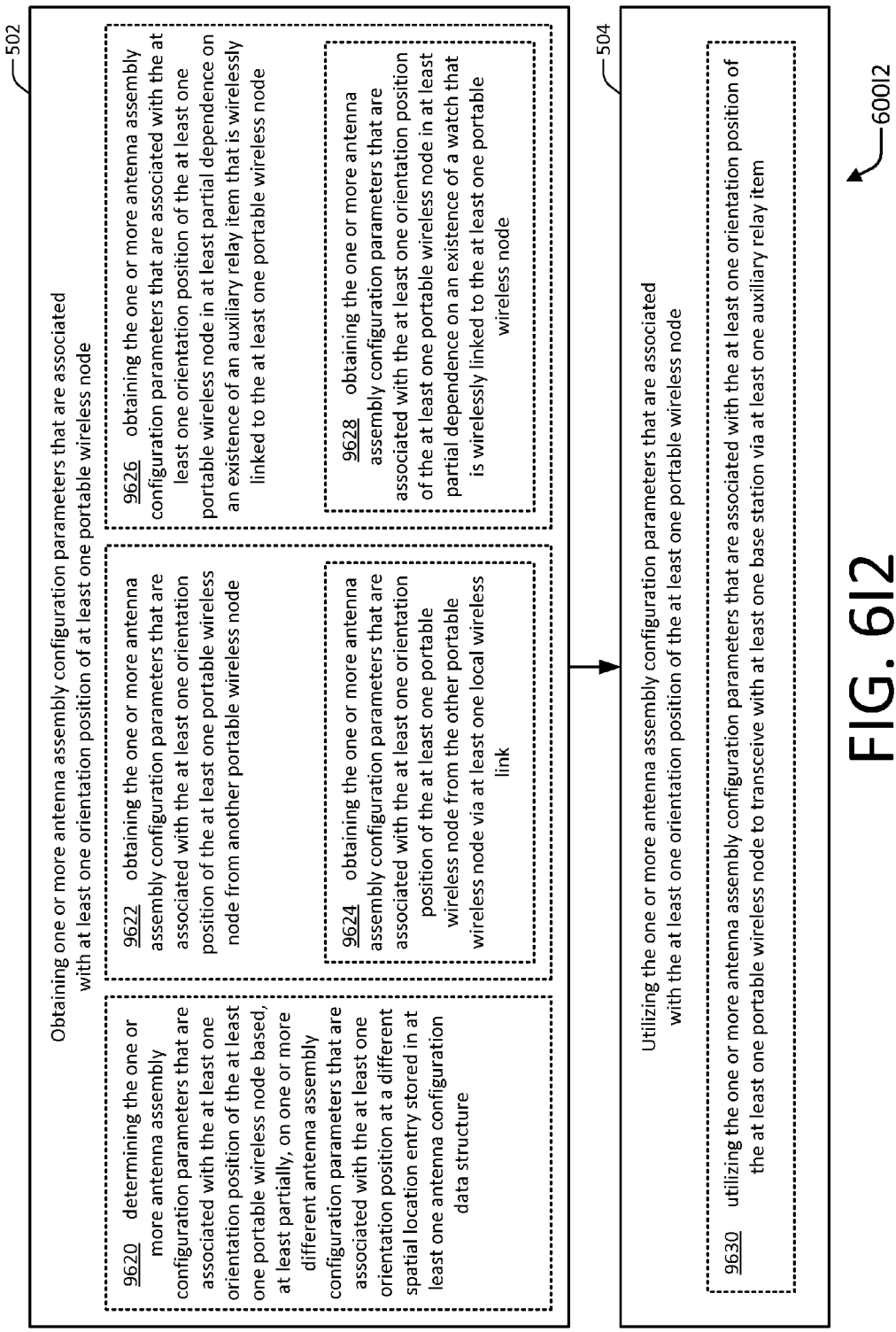

FACILITATING WIRELESS COMMUNICATION IN CONJUNCTION WITH ORIENTATION POSITION

PRIORITY APPLICATIONS (1) For purposes of the USPTO extra-statutory requirements, the present application constitutes a continuation-in-part of U.S. patent application Ser. No. 13/842,040, entitled "Frequency Accommodation", naming Roderick A. Hyde, Royce A. Levien, Richard T. Lord, Robert W. Lord, Mark A. Malamud, and Clarence T. Tegreene as inventors, filed 15 Mar. 2013, which is currently co-pending or is an application of which a currently co-pending application is entitled to the benefit of the filing date.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIGS. 6A-6I2 (e.g., 6A, 6B, 6C1, 6C2, 6D, 6E1, 6E2, 6F1, 6F2, 6G1, 6G2, 6H1, 6H2, 6I1, and 6I2) depict example additions or alternatives for a flow diagram of FIG. 5 in accordance with certain example embodiments.

DETAILED DESCRIPTION

Figures 1, 1A:
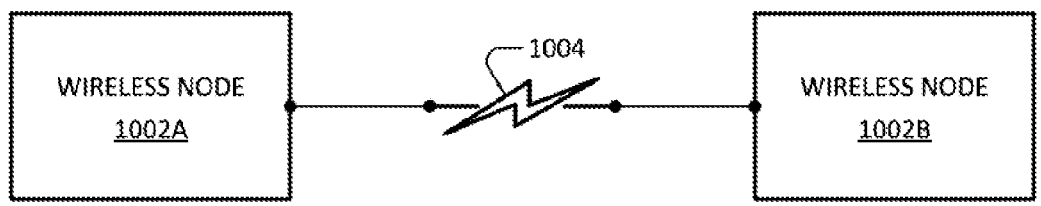
FIG. 1 is a block diagram indicative of a spatial relationship or interconnectedness of drawing sheets that respectively correspond to FIGS. 1A-1L, which together depict at least an example enviro-system related to certain example embodiments.
FIG. 1A is a schematic diagram of example wireless nodes in accordance with certain example embodiments.
Figure 1B:
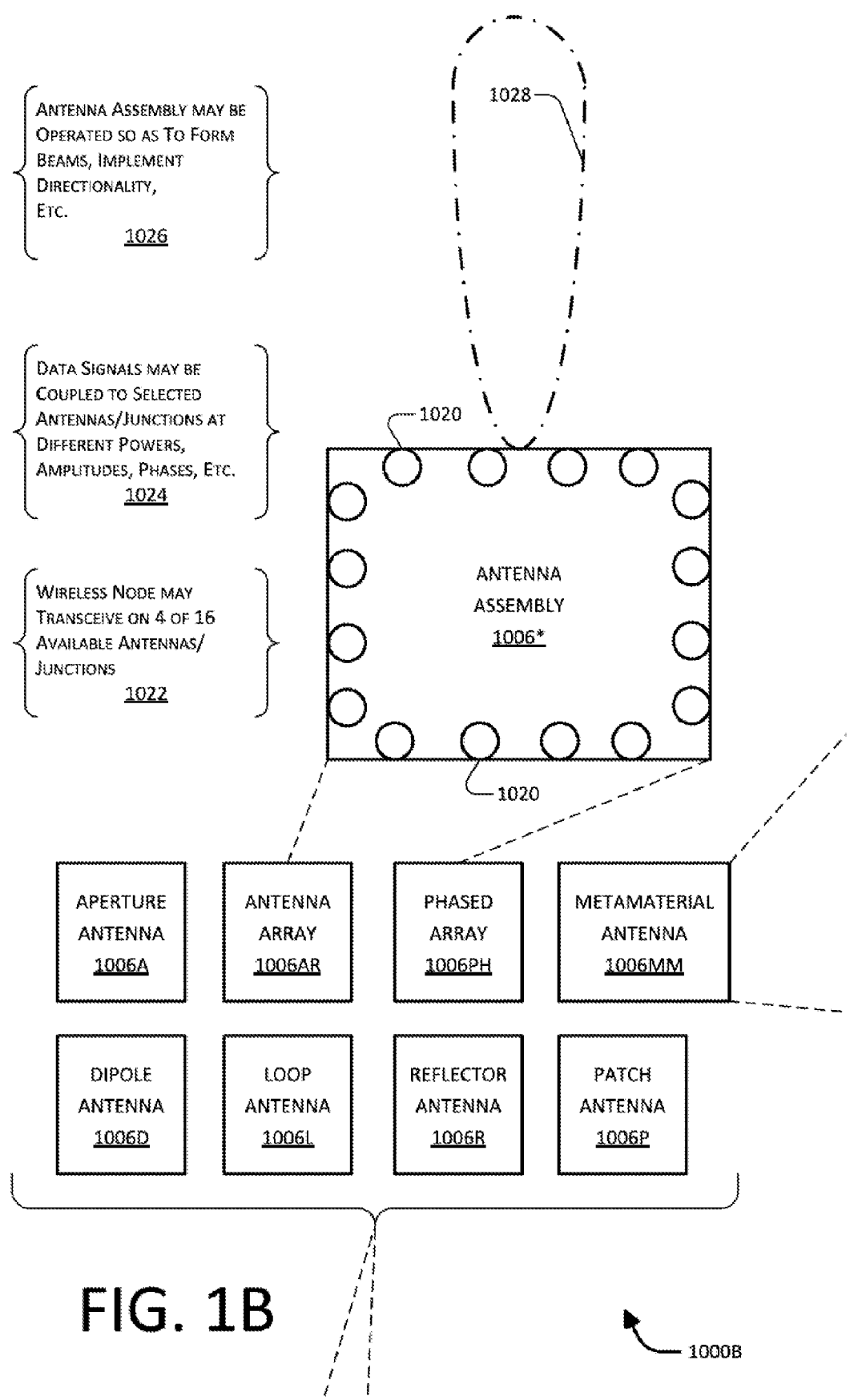
FIGS. 1B-1L are individual schematic diagrams that may be combined to form a joint schematic diagram illustrating example implementations for accommodating one or more different frequencies in a wireless environment in accordance with certain example embodiments.
Figure 1C:
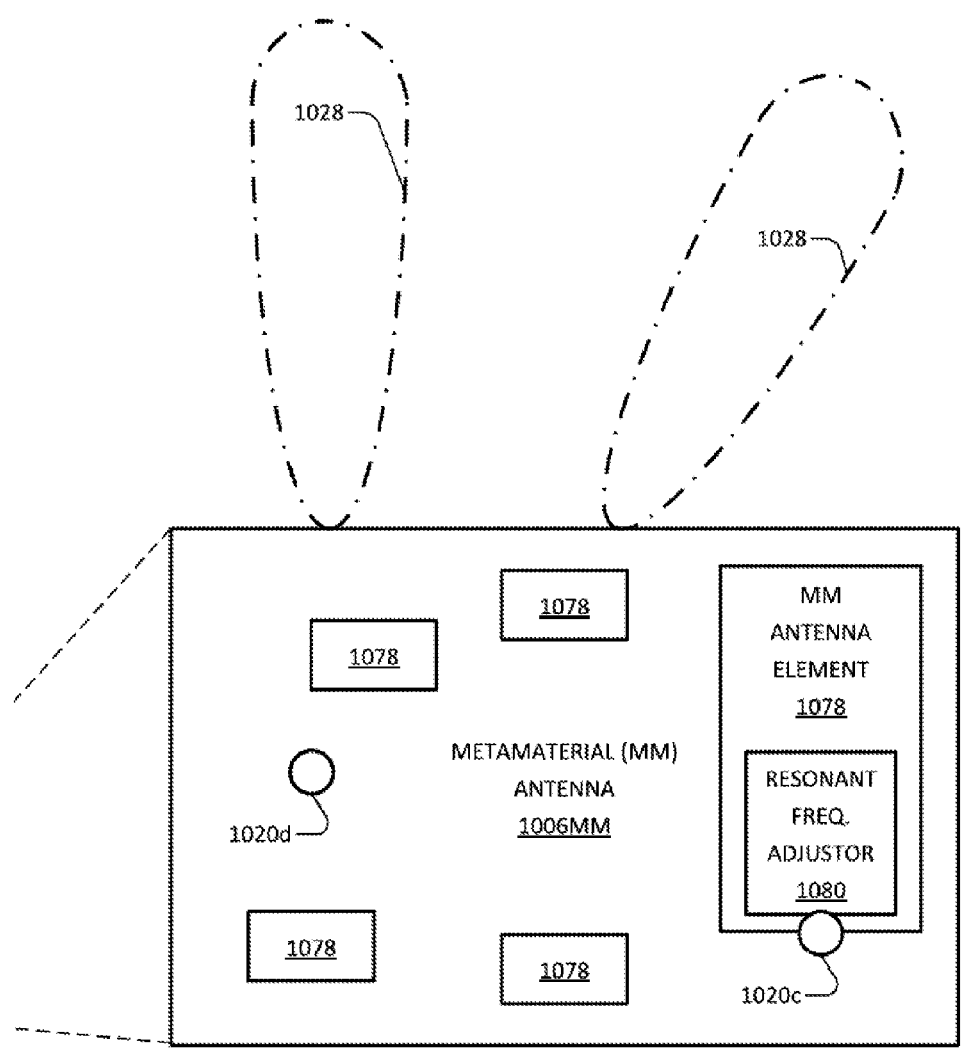
Figure 1D:
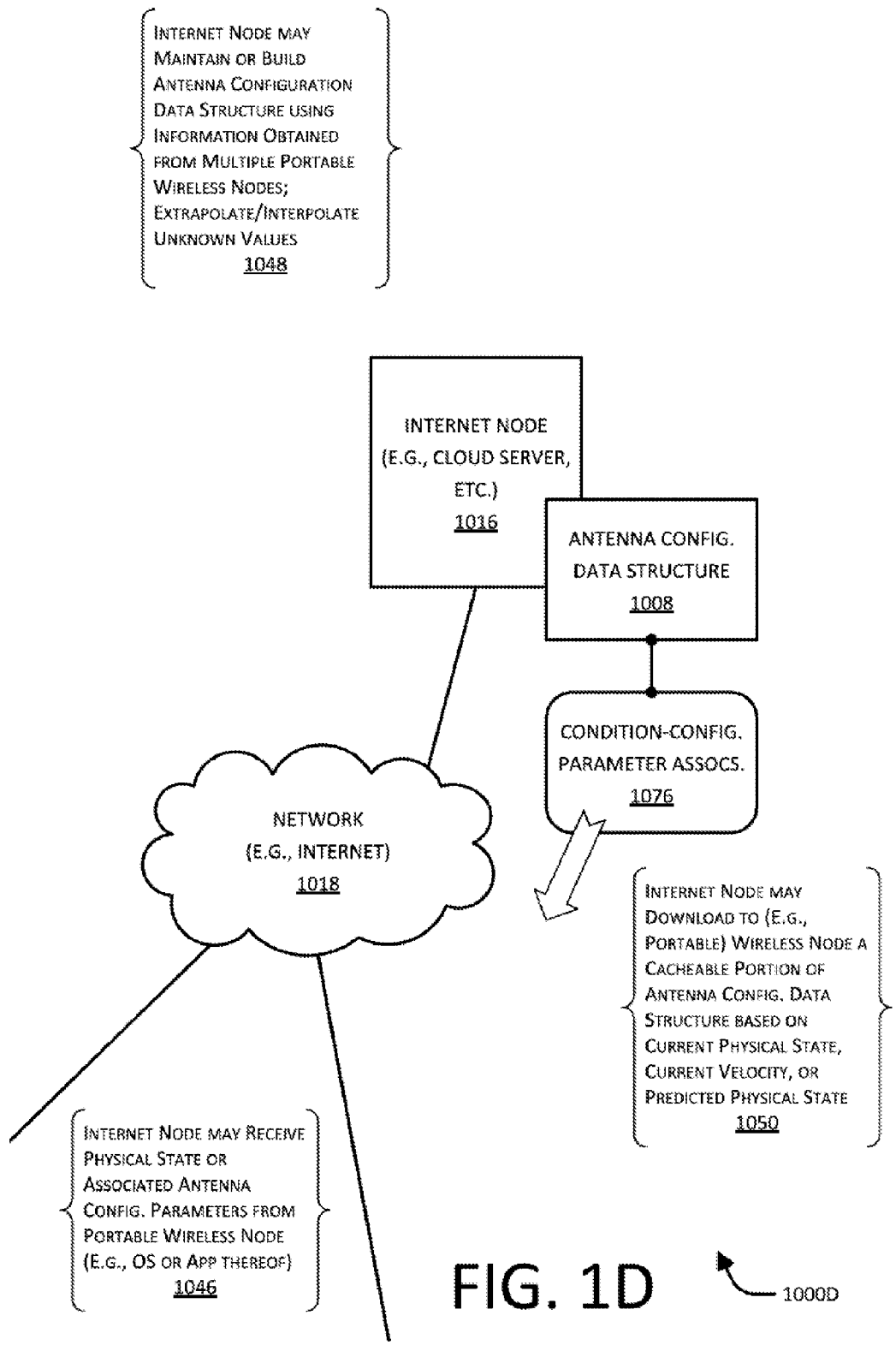
Figure 1E:
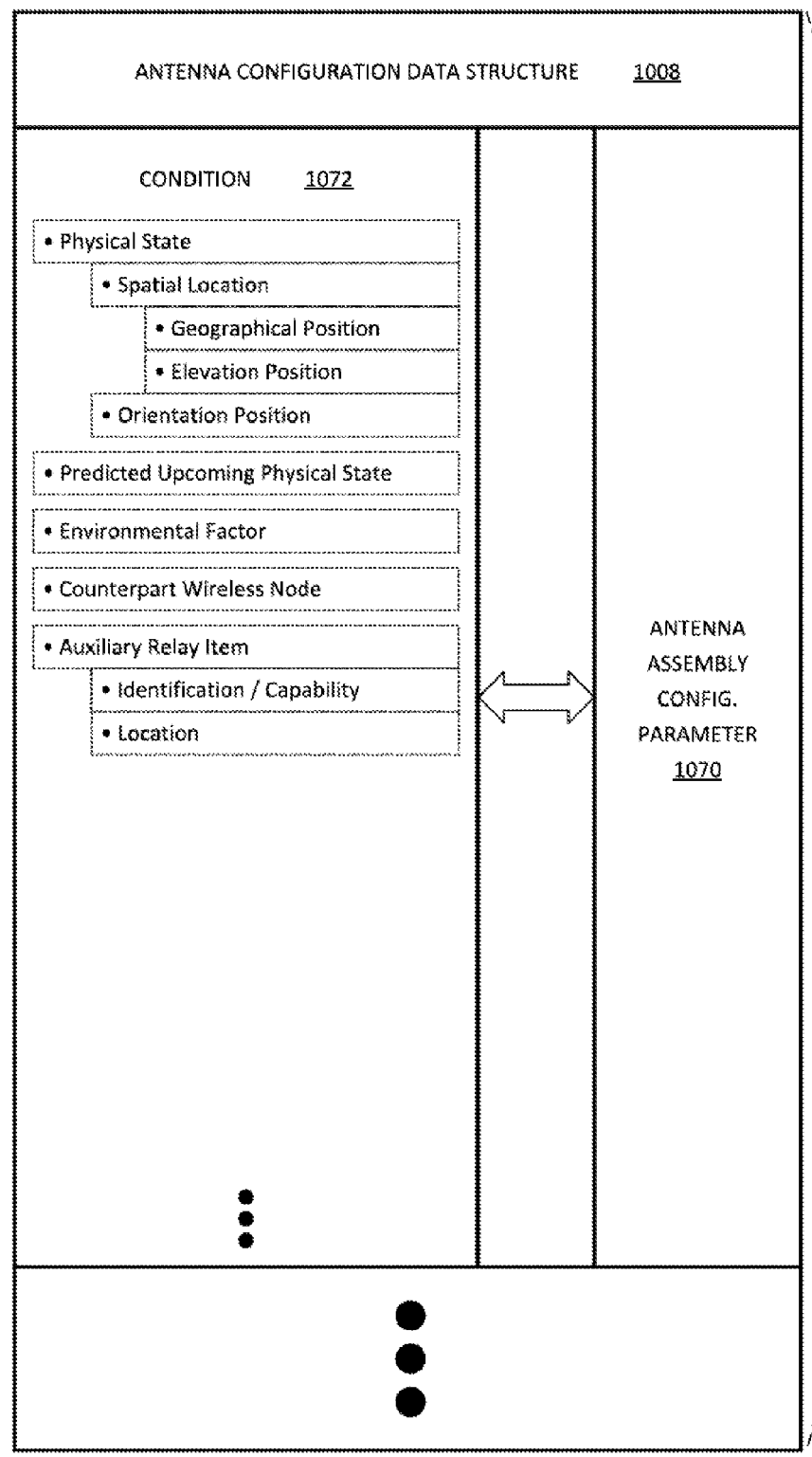
Figure 1F:
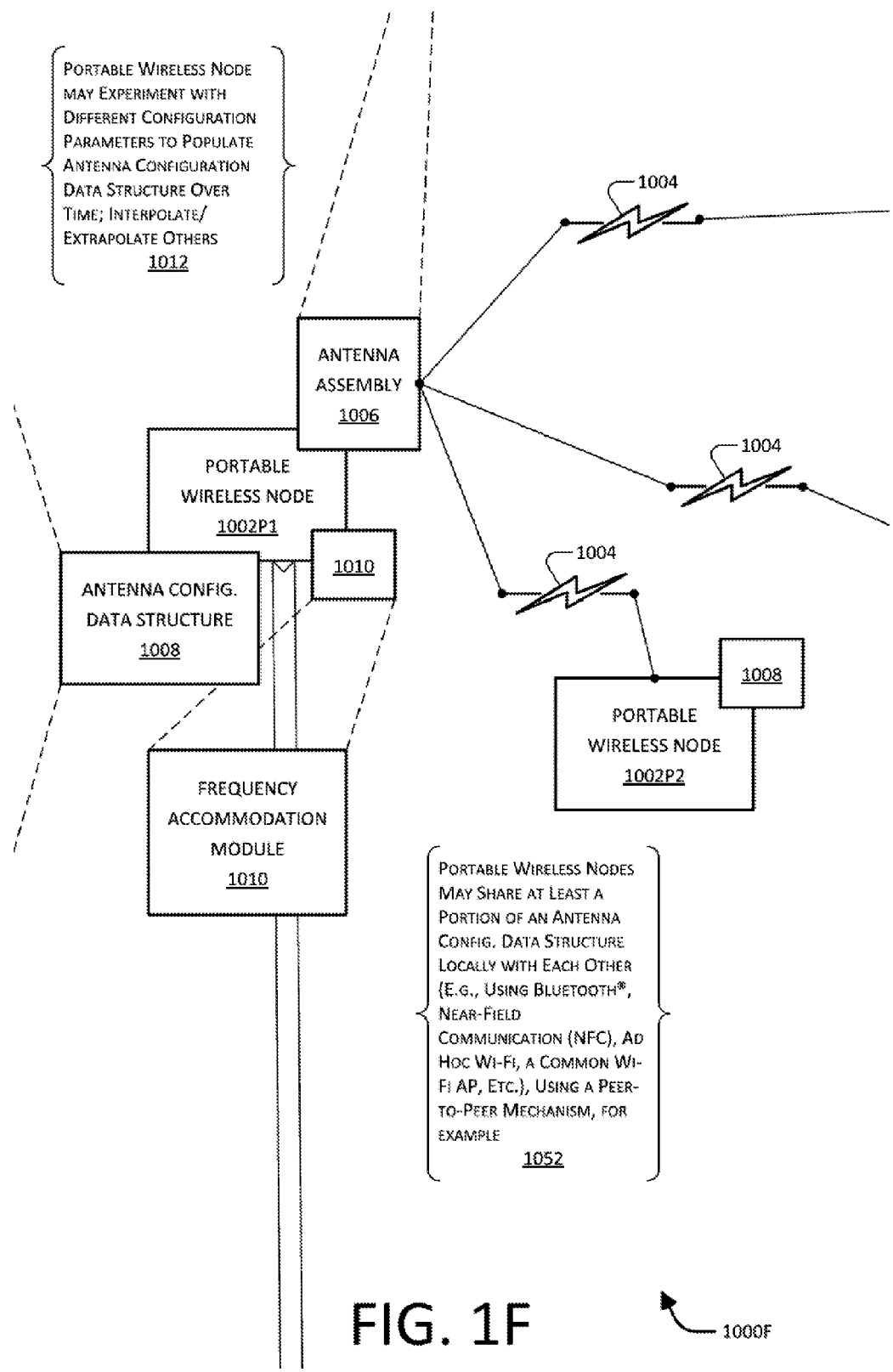
Figure 1G:
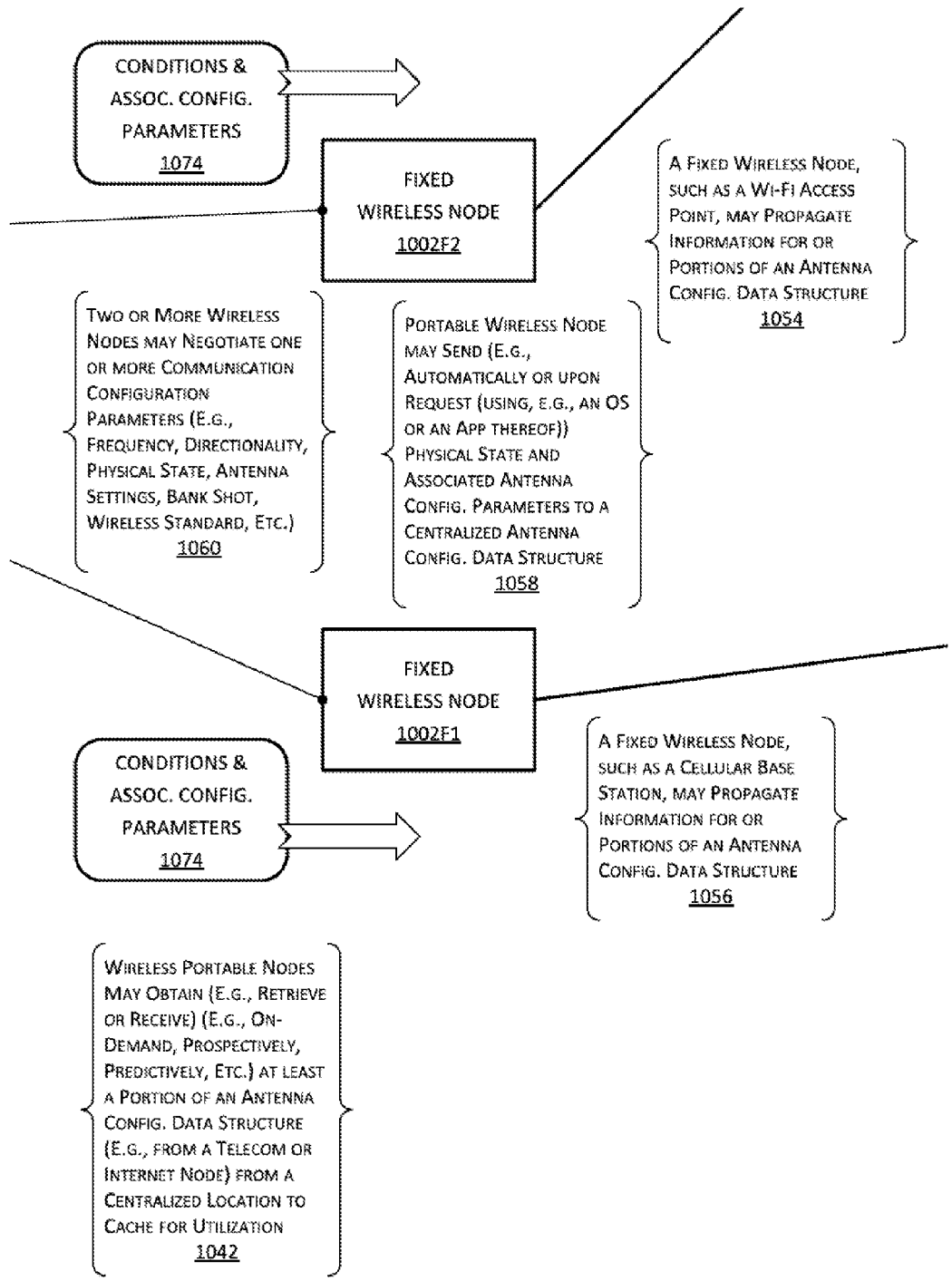
Figure 1H:
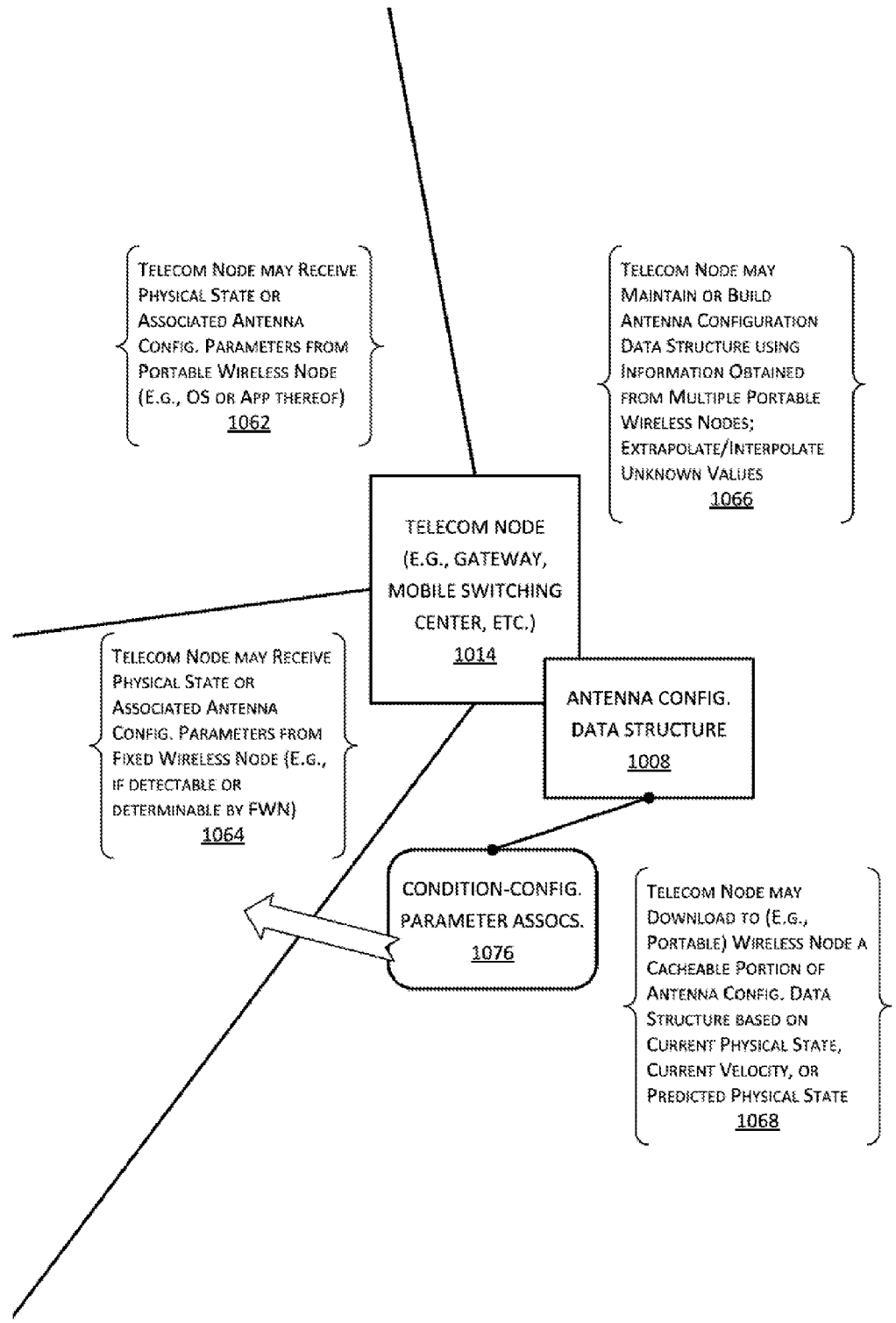
Figure 1I:
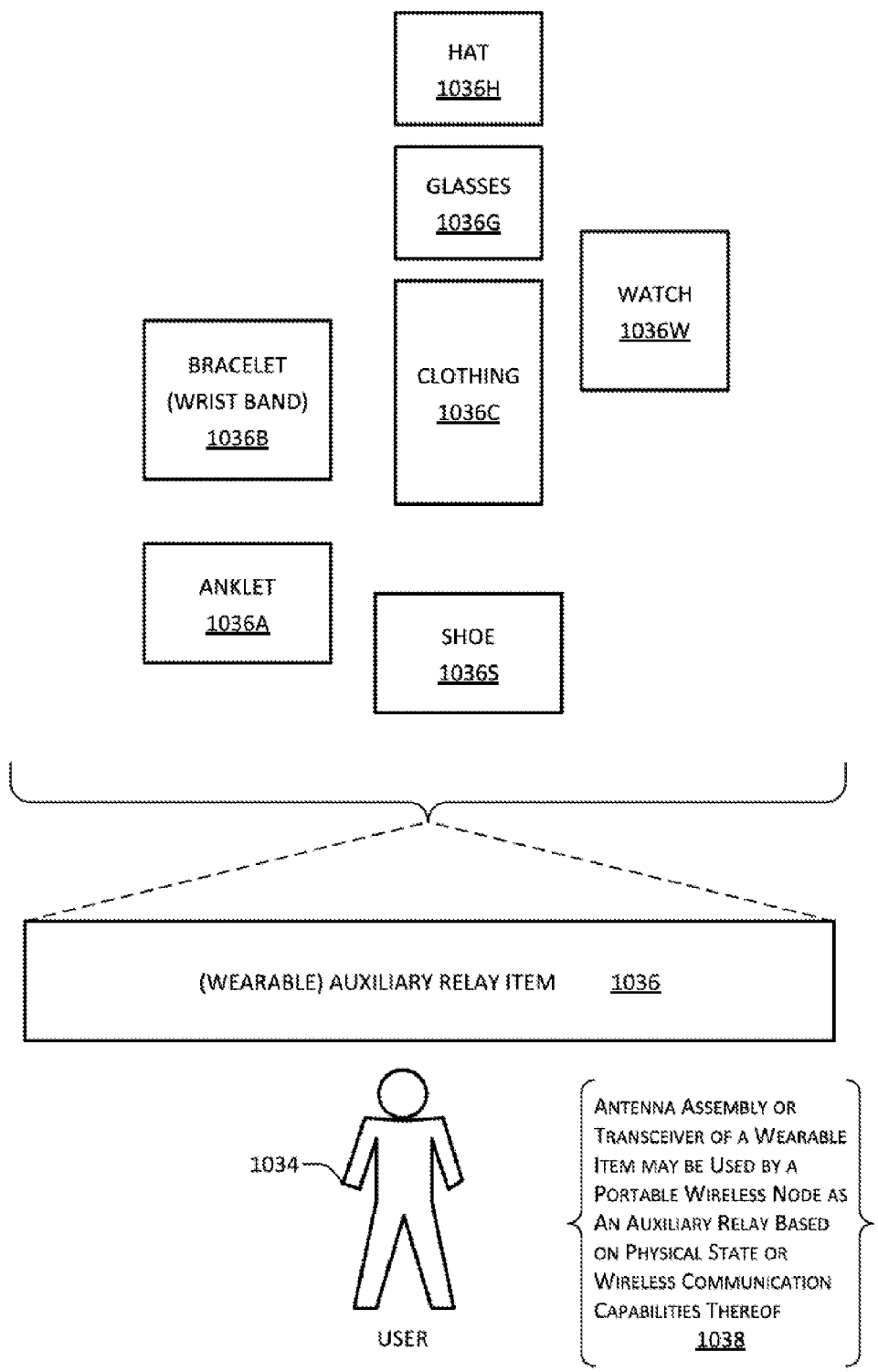
Figure 1J:
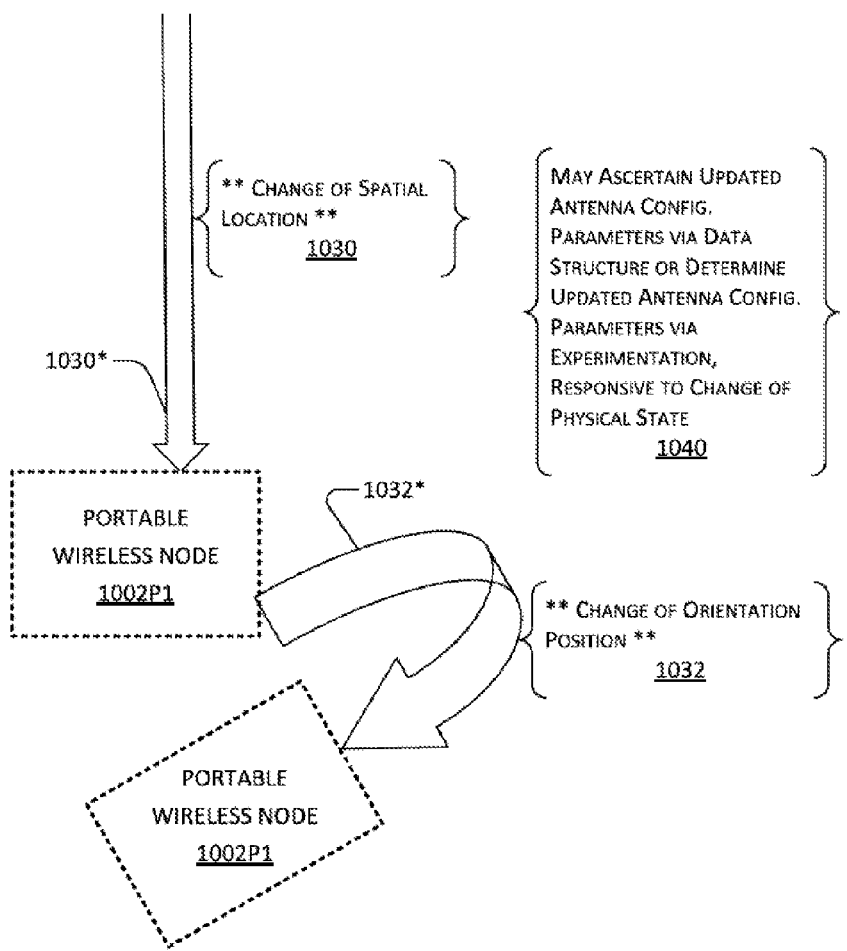
Figure 1K:
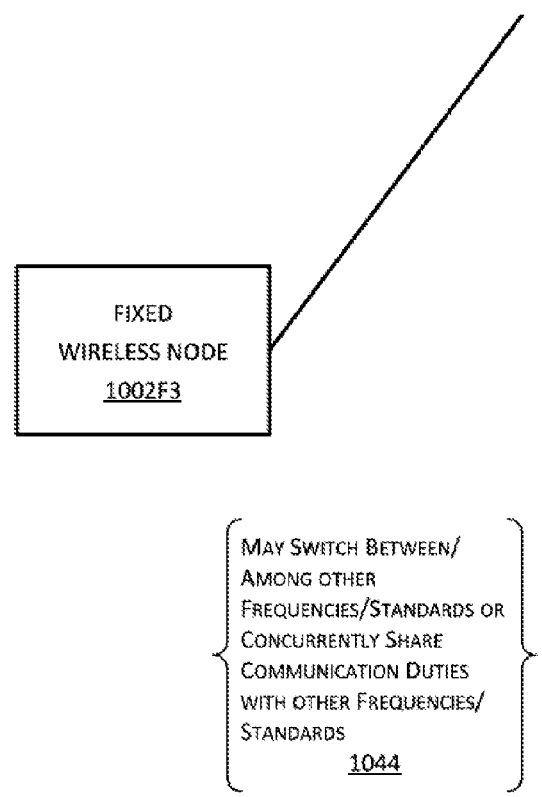
Figure 1L:
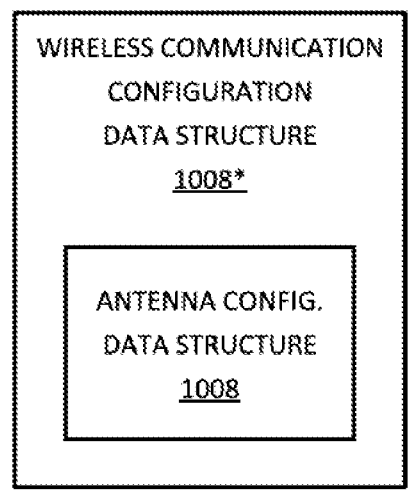

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

For certain example embodiments, one or more wireless communication parameters may be adopted by a mobile device based at least partially on a physical state of a mobile device to strengthen, enhance, improve, or a combination thereof, etc. a communication channel between a mobile device and another wireless device, such as a base station. Additionally or alternatively, a physical state of (e.g., a location of or an orientation of) a mobile device may be altered to strengthen, enhance, improve, or a combination thereof, etc. a communication channel between a mobile device and an another device, such as a base station (e.g., orientation of at least one communicating device may be altered to strengthen, enhance, improve, or a combination thereof, etc. a communication channel between/among one or more wireless devices). However, claimed subject matter is not limited to any particular described embodiments, implementations, examples, etc.

For certain example embodiments, a physical state of a mobile device may include a spatial location of the mobile device or an orientation of the mobile device. For certain example implementations, a spatial location (e.g., which may be merged with or incorporated into or linked to 3-D mapping data, including those of buildings) may be represented with a geographical position of a mobile device (e.g., with regard to a point on the earth) or an elevation of a mobile device (e.g., with regard to a height above the earth). For certain example implementations, an orientation may be represented with (1) Euler angles or rotations or (2) pitch, roll, or yaw in 3-D Euclidean space. However, claimed subject matter is not limited to any particular described embodiments, implementations, examples, etc.

For certain example embodiments, one or more wireless communication parameters, such as one or more antenna assembly configuration parameters, may include, but are not limited to any one or more of the following. First, an antenna element set may be selected from among multiple antenna elements of an antenna array. Second, a particular phase or delay may be applied to each antenna element of a selected set of antenna elements. Third, a particular power may be applied to each antenna element of a selected set of antenna elements. Fourth, a phased array antenna (e.g., which may be formed from multiple antenna elements comprising or including a single dipole) may include multiple antenna elements that are driven with particular signal values. For instance, different elements (e.g., if an element is covered/blocked), phases/delays, power, or a combination thereof, etc. may be applied to input/output connections of a phased array antenna (e.g., to establish or form a beam). Antennas, including but not limited to antenna arrays or phased arrays, may comprise or include or be formed or constructed using meta-materials. Fifth, a frequency of wireless signal(s) coupled to or from an antenna may be adjusted. Sixth, a frequency band or a wireless communication standard that is being employed may be altered, including but not limited to using a different antenna to support a different frequency band or wireless communication standard. However, claimed subject matter is not limited to any particular described embodiments, implementations, examples, etc.

Figure 2:
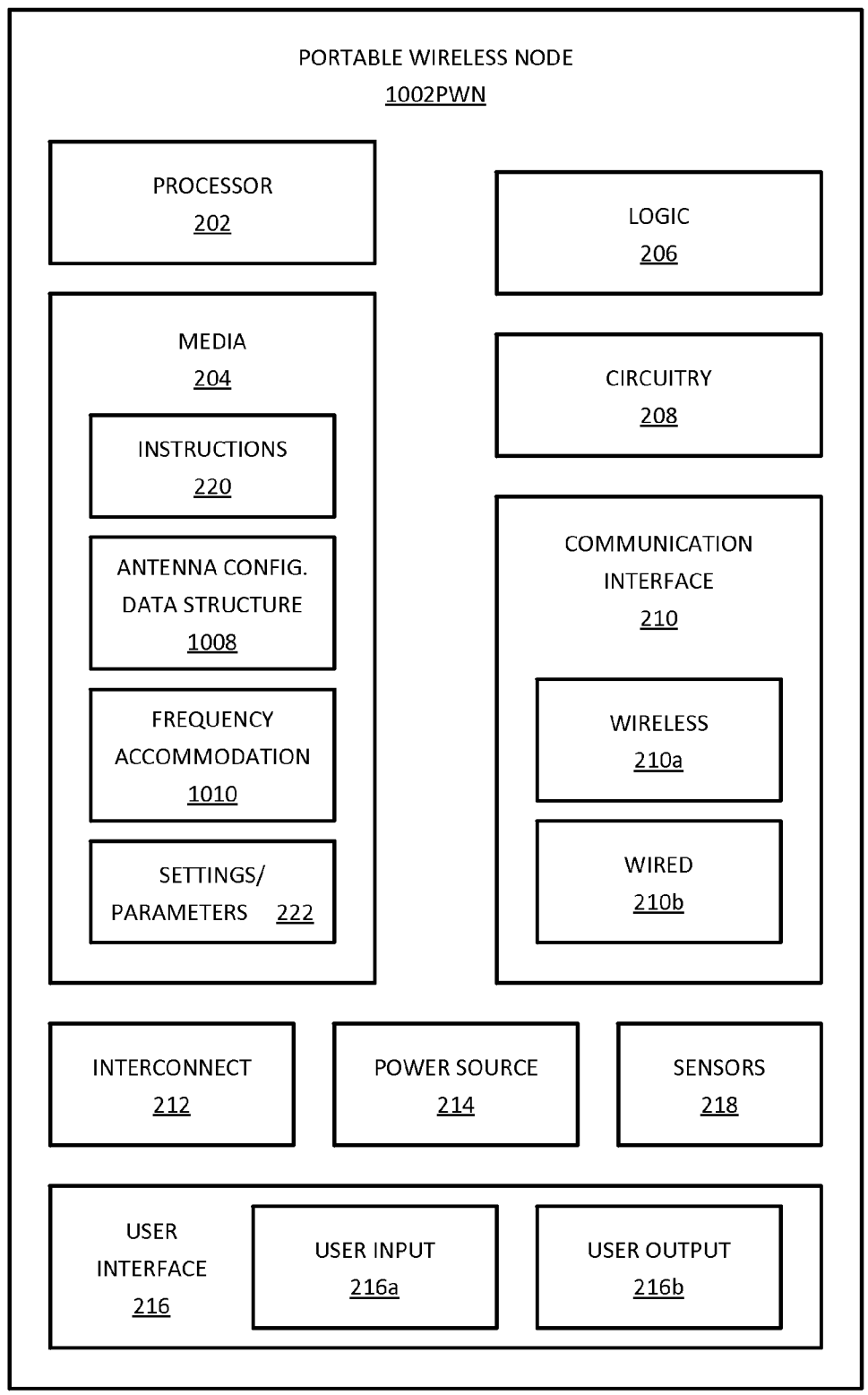
FIG. 2 is a schematic diagram of an example portable wireless node including one or more example components in accordance with certain example embodiments.
Figure 3:
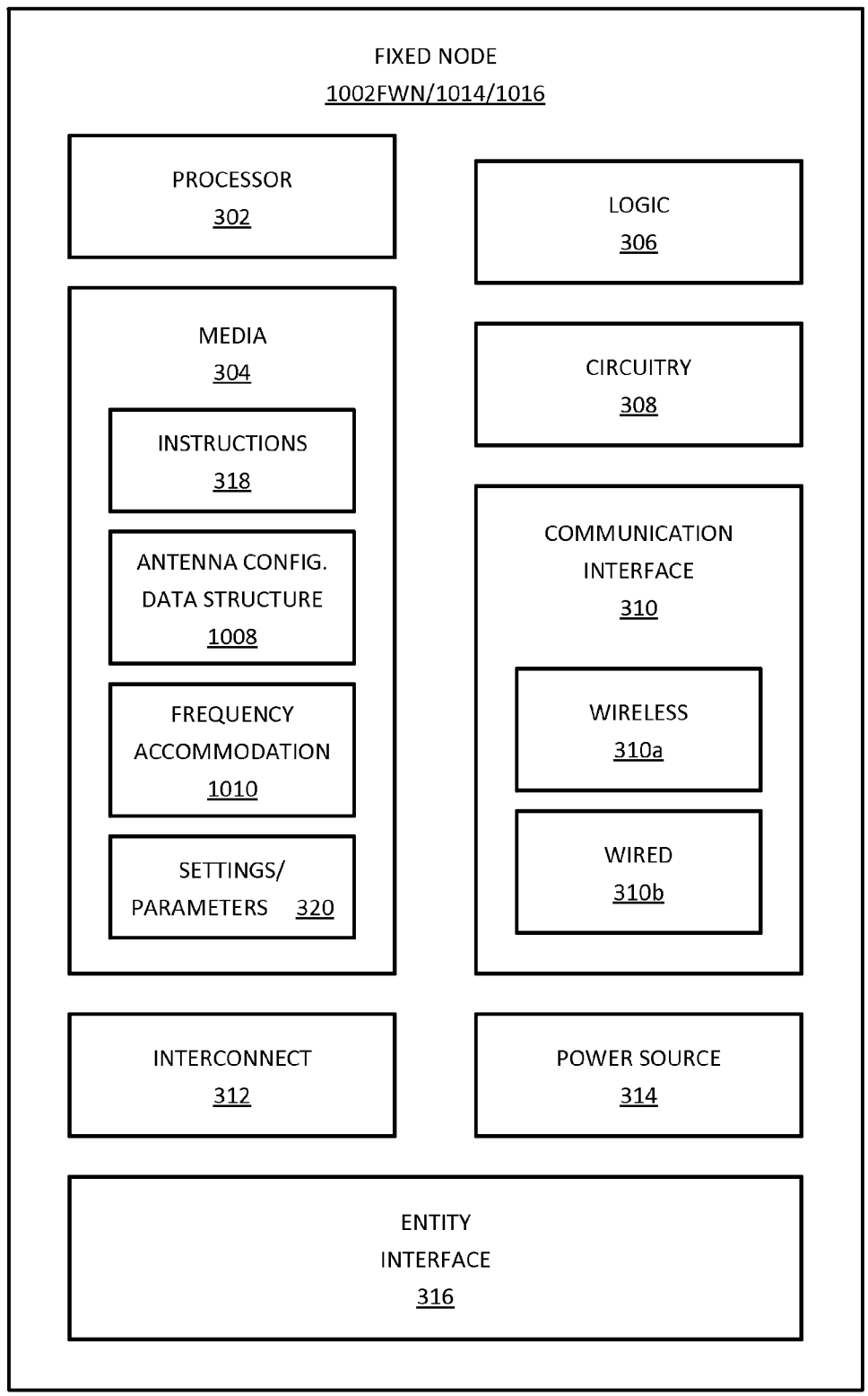
FIG. 3 is a schematic diagram of an example fixed node, such as a fixed wireless node or a fixed wired node, including one or more example components in accordance with certain example embodiments.

APPLICANT HEREBY INCORPORATES BY REFERENCE HEREIN DESCRIPTION OF AND TEXT ASSOCIATED WITH FIGS. 1-3 (E.G., FIGS. 1, 1A, 1B, 1C, 1D, 1E, 1F, 1G, 1H, 1I, 1J, 1K, 1L, 2, AND 3), INCLUDING BUT NOT LIMITED TO PARAGRAPHS [0017]-[0092] INCLUSIVE IN THEIR ENTIRETY, AT LEAST TO THE EXTENT SUCH SUBJECT MATTER IS NOT INCONSISTENT HEREWITH, OF United States patent application Ser. No. 13/842,040, entitled "Frequency Accommodation", naming Roderick A. Hyde et al. as inventors, filed 15 Mar. 2013.

Figure 4A:
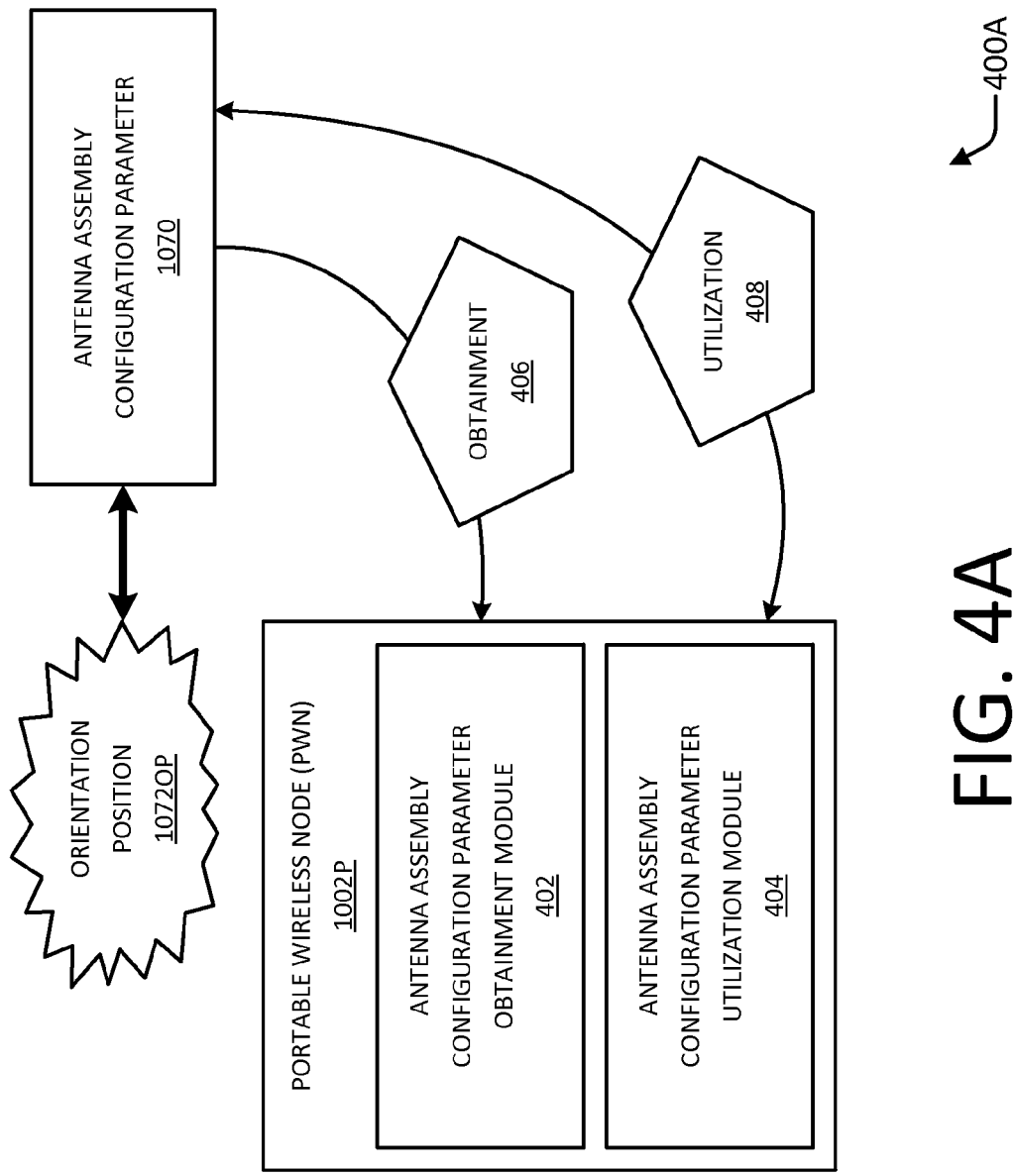
FIG. 4A is a schematic diagram that includes at least one example device, such as a portable wireless node, that is capable of handling scenarios for facilitating wireless communication in conjunction with orientation position in accordance with certain example embodiments.

FIG. 4A is a schematic diagram 400A that includes at least one example device, such as portable wireless node, that is capable of handling scenarios for facilitating wireless communication in conjunction with orientation position in accordance with certain example embodiments. As shown in FIG. 4A, by way of example but not limitation, schematic diagram 400A includes at least one device that may include at least one antenna assembly configuration parameter obtainment module 402 or at least one antenna assembly configuration parameter utilization module 404. Additionally or alternatively, schematic diagram 400A may include, by way of example but not limitation, at least one obtainment 406, at least one utilization 408, at least one antenna assembly configuration parameter 1070, or at least one orientation position 1072OP. More specifically, schematic diagram 400A may include a device that includes or comprises at least one portable wireless node (PWN) 1002P. By way of example but not limitation, an antenna assembly configuration parameter obtainment module 402 or an antenna assembly configuration parameter utilization module 404 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, an antenna assembly configuration parameter obtainment module 402 or an antenna assembly configuration parameter utilization module 404 may be implemented separately or at least partially jointly or in combination. For certain example implementations, an antenna assembly configuration parameter obtainment module 402 may be configured to obtain one or more antenna assembly configuration parameters that are associated with at least one orientation position of at least one portable wireless node. For certain example implementations, an antenna assembly configuration parameter utilization module 404 may be configured to utilize one or more antenna assembly configuration parameters that are associated with at least one orientation position of at least one portable wireless node. However, claimed subject matter is not limited to any particular described embodiments, implementations, examples, etc.

FIGS. 4B-4E are schematic diagrams 400B-400E that include at least one example device and that depict example scenarios for facilitating wireless communication in conjunction with orientation position in accordance with certain example embodiments. As shown in FIGS. 4B-4E, by way of example but not limitation, one or more of schematic diagrams 400B-400E may include at least one portable wireless node (PWN) 1002P, at least one antenna assembly configuration parameter obtainment module 402, at least one antenna assembly configuration parameter utilization module 404, at least one antenna assembly configuration parameter 1070, or at least one orientation position 1072OP. Each of schematic diagrams 400B-400E may include alternative or additional depictions, which may relate to facilitating wireless communication in conjunction with orientation position, as described herein. In addition to or in alternative to description herein below with specific reference to FIGS. 4B-4E, illustrated aspects of schematic diagrams 400B-400E may be relevant to example description with reference to any one or more of FIG. 5 or 6A-6I2. However, claimed subject matter is not limited to any particular described embodiments, implementations, examples, etc.

Figure 4B:
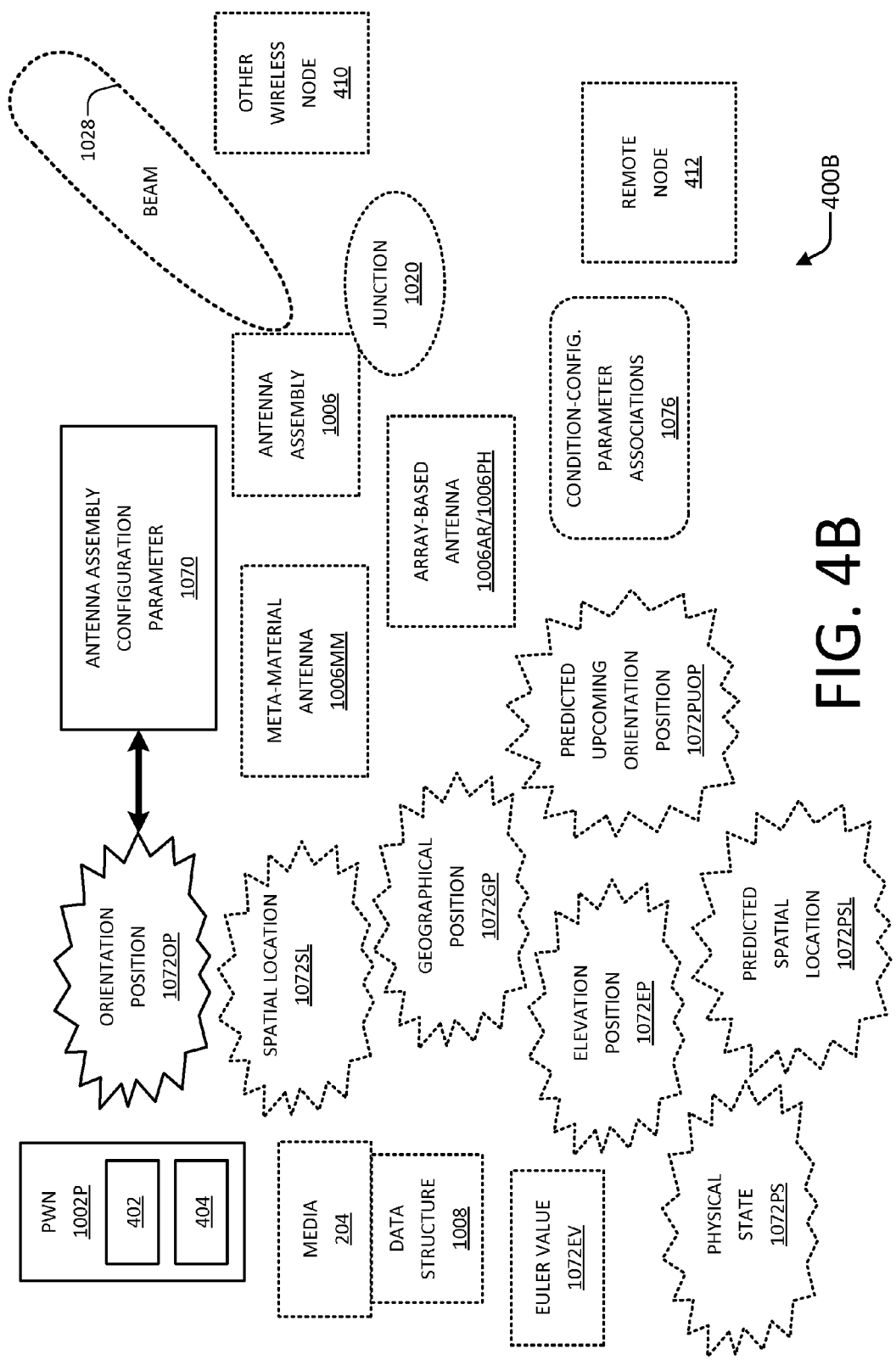
FIGS. 4B-4E are schematic diagrams that include at least one example device and that depict example scenarios for facilitating wireless communication in conjunction with orientation position in accordance with certain example embodiments.

As shown in FIG. 4B, by way of example but not limitation, schematic diagram 400B may include at least one portable wireless node (PWN) 1002P, at least one antenna assembly configuration parameter obtainment module 402, at least one antenna assembly configuration parameter utilization module 404, at least one antenna assembly configuration parameter 1070, at least one orientation position 1072OP, at least one spatial location 1072SL, at least one geographical position 1072GP, at least one elevation position 1072EP, at least one predicted upcoming orientation position 1072PUOP, at least one Euler value 1072EV, at least one meta-material antenna 1006MM, at least one array-based antenna 1006AR/1006PH, at least one media 204, at least one antenna configuration data structure 1008, at least one antenna assembly 1006, at least one antenna junction 1020, at least one antenna beam pattern 1028, at least one other wireless node 410, at least one remote node 412, at least one condition-configuration parameter association 1076, at least one physical state 1072PS, or at least one predicted spatial location 1072PSL. However, claimed subject matter is not limited to any particular described embodiments, implementations, examples, etc. Additional or alternative description that may be relevant to schematic diagram 400B is provided herein below with particular reference to one or more of any of FIGS. 6A-6I2.

Figure 4C:
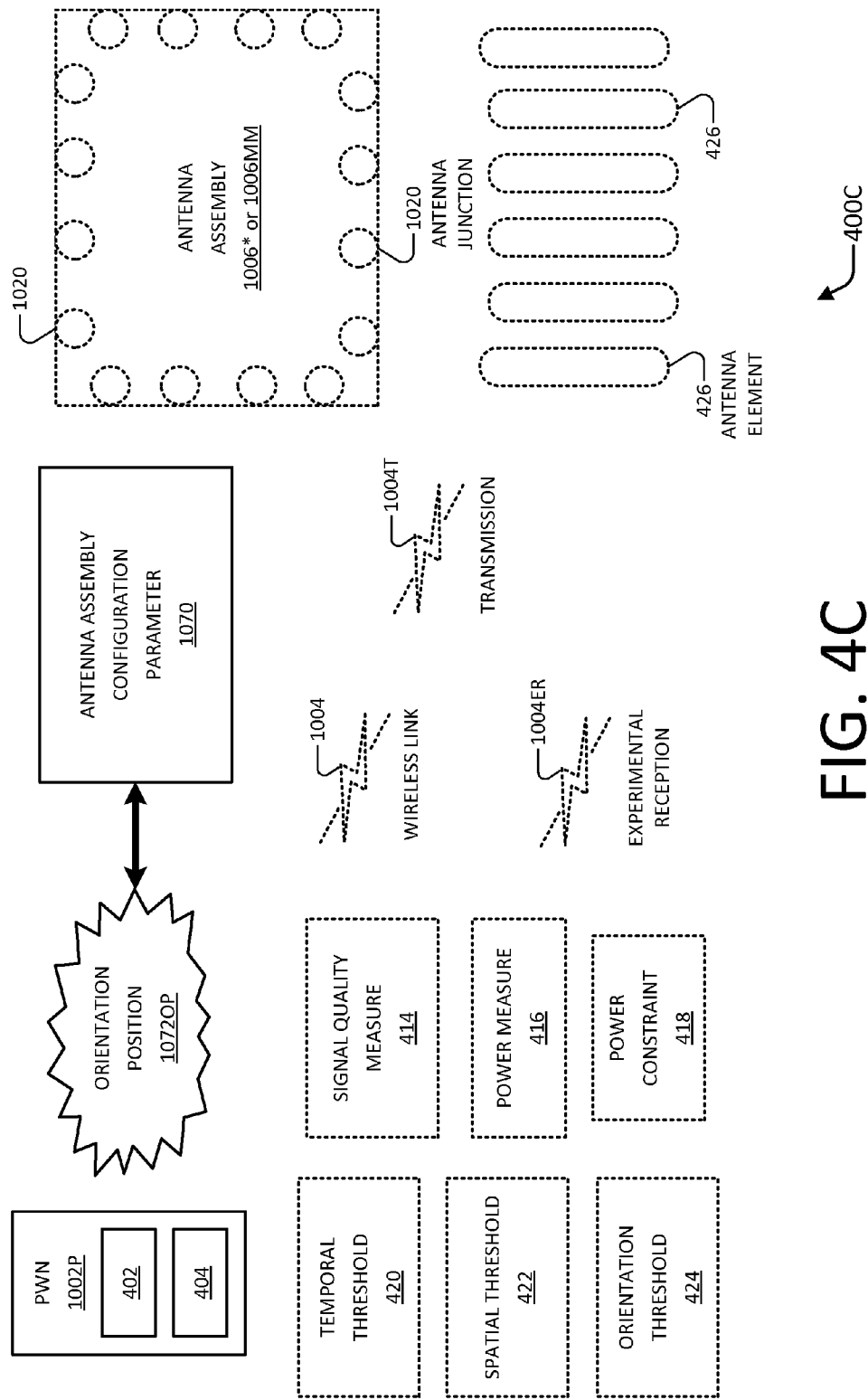

As shown in FIG. 4C, by way of example but not limitation, schematic diagram 400C may include at least one portable wireless node (PWN) 1002P, at least one antenna assembly configuration parameter obtainment module 402, at least one antenna assembly configuration parameter utilization module 404, at least one antenna assembly configuration parameter 1070, at least one orientation position 1072OP, at least one measure of signal quality 414, at least one power measure 416, at least one power constraint 418, at least one wireless link 1004, at least one temporal threshold 420, at least one spatial threshold 422, at least one orientation threshold 424, at least one transmission 1004T, at least one experimental reception 1004ER, at least one antenna assembly 1006* or 1006MM, at least one antenna junction 1020, or at least one antenna element 426. However, claimed subject matter is not limited to any particular described embodiments, implementations, examples, etc. Additional or alternative description that may be relevant to schematic diagram 400C is provided herein below with particular reference to one or more of any of FIGS. 6A-6I2.

Figure 4D:
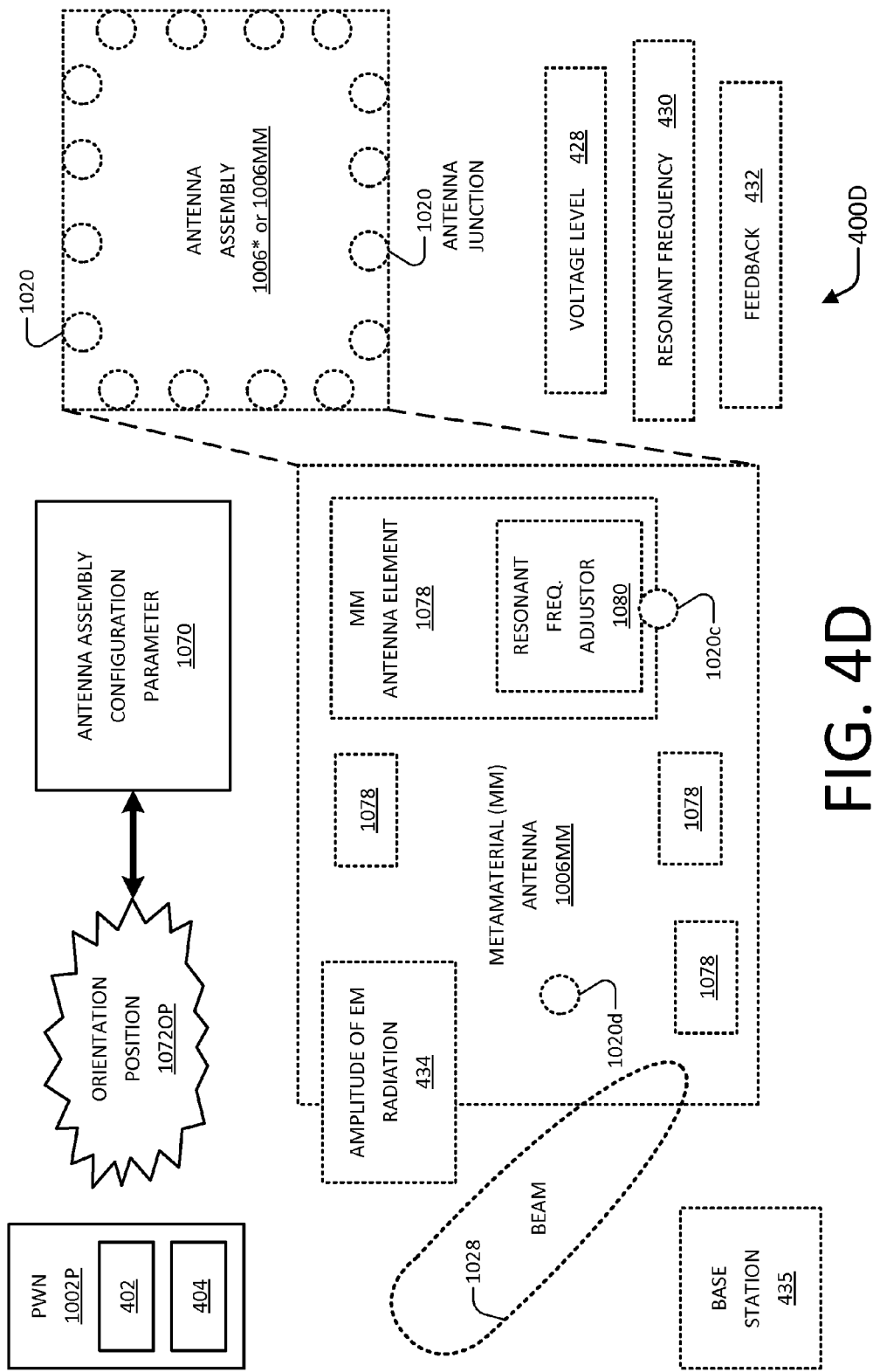

As shown in FIG. 4D, by way of example but not limitation, schematic diagram 400D may include at least one portable wireless node (PWN) 1002P, at least one antenna assembly configuration parameter obtainment module 402, at least one antenna assembly configuration parameter utilization module 404, at least one antenna assembly configuration parameter 1070, at least one orientation position 1072OP, at least one antenna assembly 1006 or 1006* or 1006MM, at least one antenna junction 1020, at least one meta-material antenna 1006MM, at least one meta-material antenna element 1078, at least one resonant frequency adjustor 1080, at least one data signal antenna junction 1020d, at least one control signal antenna junction 1020c, at least one voltage level 428, at least one resonant frequency 430, at least some feedback 432, at least one amplitude of electromagnetic radiation 434, or at least one base station 435. However, claimed subject matter is not limited to any particular described embodiments, implementations, examples, etc. Additional or alternative description that may be relevant to schematic diagram 400D is provided herein below with particular reference to one or more of any of FIGS. 6A-6I2.

Figure 4E:
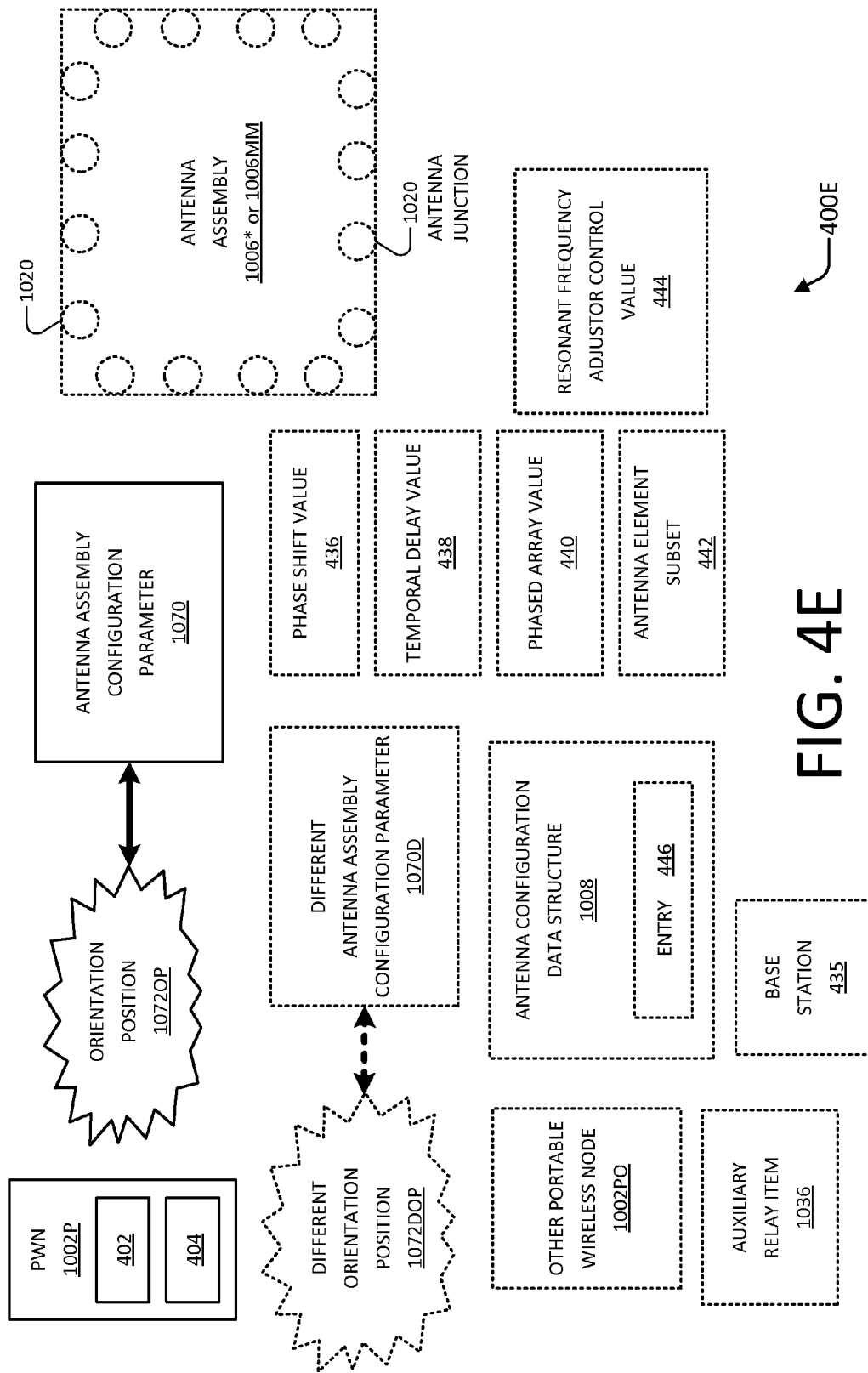

As shown in FIG. 4E, by way of example but not limitation, schematic diagram 400E may include at least one portable wireless node (PWN) 1002P, at least one antenna assembly configuration parameter obtainment module 402, at least one antenna assembly configuration parameter utilization module 404, at least one antenna assembly configuration parameter 1070, at least one orientation position 1072OP, at least one antenna assembly 1006 or 1006* or 1006MM, at least one antenna junction 1020, at least one phase shift value 436, at least one temporal delay value 438, at least one phased array value 440, at least one antenna element subset 442, at least one resonant frequency adjustor control value 444, at least one different antenna assembly configuration parameter 1070D, at least one different orientation position 1072DOP, at least one antenna configuration data structure 1008, at least one entry 446, at least one other portable wireless node 1002P0, at least one auxiliary relay item 1036, or at least one base station 435. However, claimed subject matter is not limited to any particular described embodiments, implementations, examples, etc. Additional or alternative description that may be relevant to schematic diagram 400E is provided herein below with particular reference to one or more of any of FIGS. 6A-6I2.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
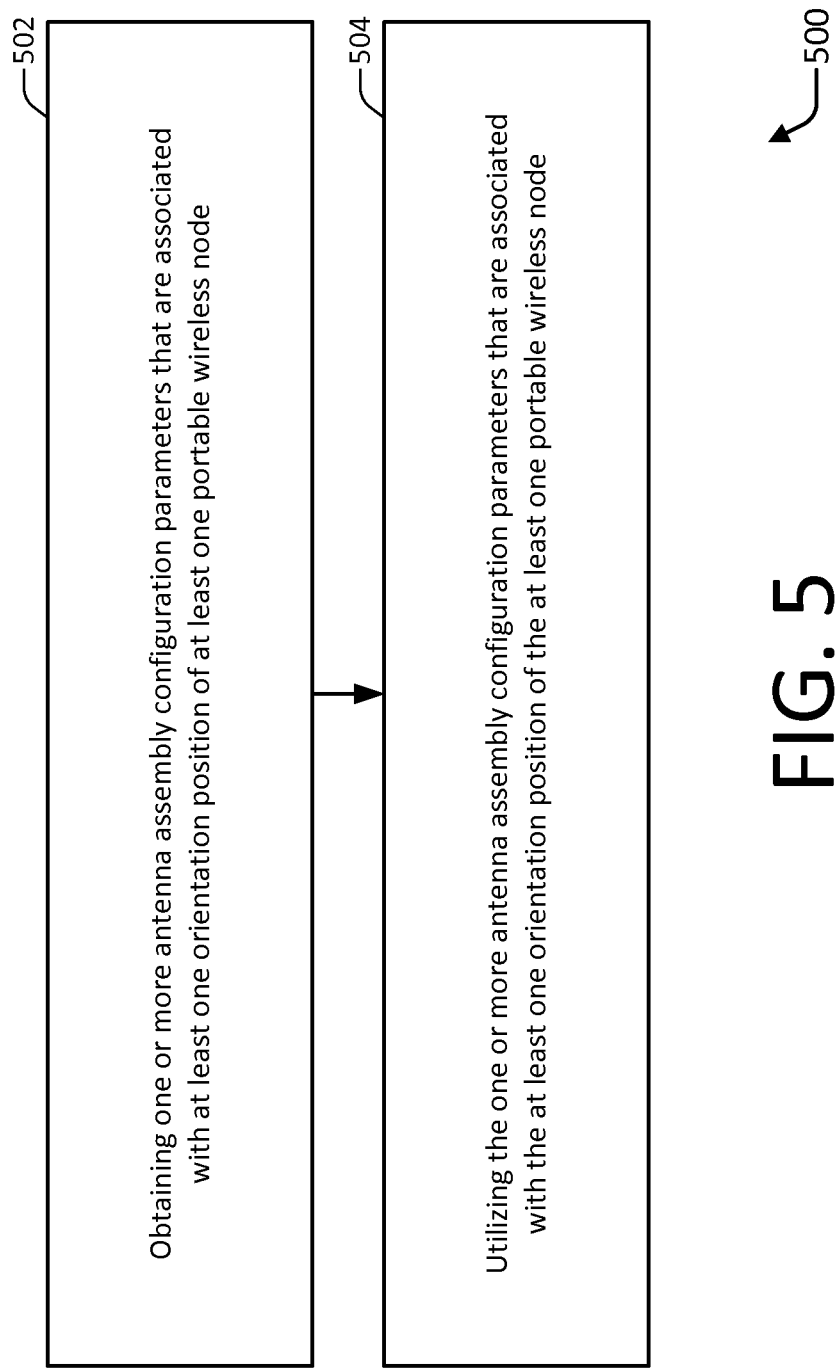
FIG. 5 is a flow diagram illustrating an example method for at least one device with regard to facilitating wireless communication in conjunction with orientation position in accordance with certain example embodiments.

FIG. 5 is a flow diagram 500 illustrating an example method for at least one device with regard to facilitating wireless communication in conjunction with orientation position in accordance with certain example embodiments. As illustrated, flow diagram 500 may include any of operations 502-504. Although operations 502-504 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 500 may be performed so as to be fully or partially overlapping with other operation(s). For certain example embodiments, one or more operations of flow diagram 500 may be performed by at least one device, such as a portable wireless node 1002P or at least a portion thereof. However, claimed subject matter is not limited to any particular described embodiments, implementations, examples, etc.

For certain example embodiments, a method for facilitating wireless communication in conjunction with orientation position (e.g., that may include, involve, address, react to, pertain to, or a combination thereof, etc. or other otherwise relate to frequency accommodation), which method may be at least partially implemented using hardware (e.g., circuitry, at least one processor, processor-accessible memory, at least one module, or a combination thereof, etc.) of a device such as a portable wireless node, may include an operation 502 or an operation 504. An operation 502 may be directed at least partially to obtaining one or more antenna assembly configuration parameters that are associated with at least one orientation position of at least one portable wireless node. For certain example implementations, at least one device may obtain (e.g., acquire, ascertain, determine, receive, retrieve, procure, or a combination thereof, etc. via at least one obtainment 406) one or more antenna assembly configuration parameters 1070 (e.g., at least one variable impacting functionality of an antenna assembly, at least one mechanism affecting antenna assembly performance, at least one value applied to an antenna assembly control or data input, at least one boundary or guideline for how electromagnetic fields interact with an adjustable antenna assembly, at least one manipulation of signals being forwarded to or accepted from an antenna assembly, or a combination thereof, etc.) that are associated with (e.g., that correspond to, that are linked to, that relate to, that are matched with, that are mated to, or a combination thereof, etc.) at least one orientation position 1072OP (e.g., a direction that is being faced or pointed to, a vector in space, an Euler value, a roll or pitch or yaw value, a rotational position, or a combination thereof, etc.) of at least one portable wireless node 1002P (e.g., a mobile device, a mobile phone, a tablet, a slate computer, a phablet, a portable gaming device, a smartphone, a notebook computer, a mobile repeater, a UE, a MS, a laptop computer, a hand-held radio, a walker-talkie, a roving transceiver, a wireless device that moves under its own power (e.g., a motorized robot or an unmanned aerial vehicle (UAV)), a wireless device that moves under the power of another entity (e.g., a human or a machine such as a vehicle), or a combination thereof, etc.). By way of example but not limitation, at least one portable wireless node may obtain one or more antenna assembly configuration parameters that are associated with at least one orientation position of at least one portable wireless node (e.g., a portable wireless node, such as a smart phone or tablet computer, may acquire one or more antenna-related settings that are associated with at least one angular position in space of the portable wireless node). However, claimed subject matter is not limited to any particular described embodiments, implementations, examples, etc.

For certain example embodiments, an operation 504 may be directed at least partially to utilizing the one or more antenna assembly configuration parameters that are associated with the at least one orientation position of the at least one portable wireless node. For certain example implementations, at least one device may utilize (e.g., employ, put to use, exploit, take advantage of, store, apply, share, implement, handle, practice, administer, or a combination thereof, etc. via at least one utilization 408) one or more antenna assembly configuration parameters 1070 (e.g., at least one variable impacting functionality of an antenna assembly, at least one mechanism affecting antenna assembly performance, at least one value applied to an antenna assembly control or data input, at least one boundary or guideline for how electromagnetic fields interact with an adjustable antenna assembly, at least one manipulation of signals being forwarded to or accepted from an antenna assembly, or a combination thereof, etc.) that are associated with (e.g., that correspond to, that are linked to, that relate to, that are matched with, that are mated to, or a combination thereof, etc.) at least one orientation position 1072OP (e.g., a direction that is being faced or pointed to, a vector in space, an Euler value, a roll or pitch or yaw value, a rotational position, or a combination thereof, etc.) of at least one portable wireless node 1002P (e.g., a mobile device, a mobile phone, a tablet, a slate computer, a phablet, a portable gaming device, a smartphone, a notebook computer, a mobile repeater, a UE, a MS, a laptop computer, a hand-held radio, a walker-talkie, a roving transceiver, or a combination thereof, etc.). By way of example but not limitation, at least one portable wireless node may utilize the one or more antenna assembly configuration parameters that are associated with the at least one orientation position of the at least one portable wireless node (e.g., a portable wireless node (i) may store into memory or (ii) may implement for a communication one or more antenna-related settings that are associated with at least one angular position in space of the portable wireless node). However, claimed subject matter is not limited to any particular described embodiments, implementations, examples, etc.

Figure 6A:
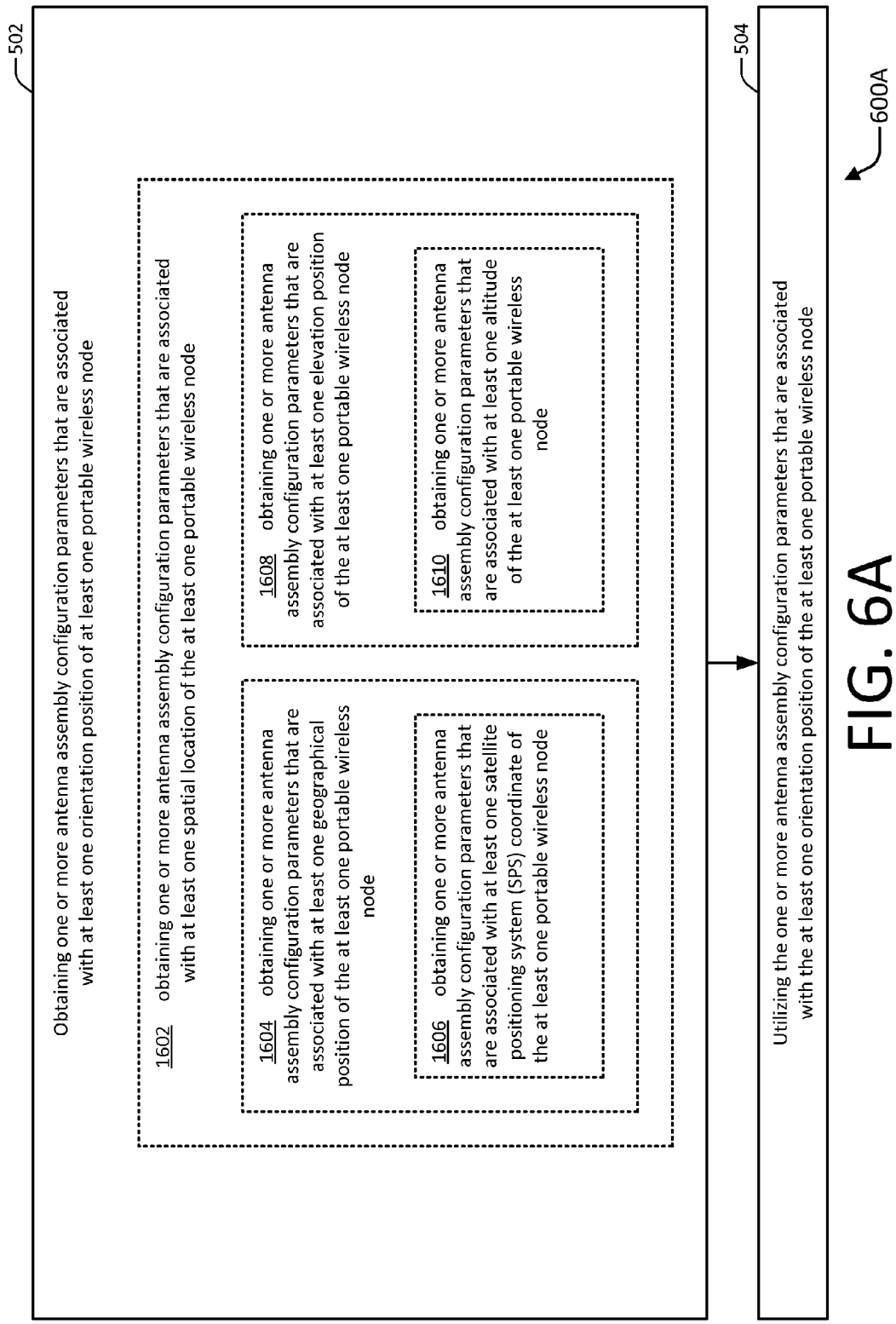

FIGS. 6A-6I2 (e.g., 6A, 6B, 6C1, 6C2, 6D, 6E1, 6E2, 6F1, 6F2, 6G1, 6G2, 6H1, 6H2, 6I1, and 6I2) depict example additions or alternatives for a flow diagram of FIG. 5 in accordance with certain example embodiments. As illustrated, flow diagrams of FIGS. 6A-6I2 may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 6A-6I2 may be performed so as to be fully or partially overlapping with other operation(s). For certain example embodiments, one or more operations of flow diagrams 600A-600I2 (of FIGS. 6A-6I2) may be performed by at least one device (e.g., a portable wireless node 1002P or at least a portion thereof).

FIG. 6A illustrates a flow diagram 600A having any one or more of example operations 1602-1610. For certain example embodiments, an operation 1602 may be directed at least partially to wherein the obtaining one or more antenna assembly configuration parameters that are associated with at least one orientation position of at least one portable wireless node (of operation 502) includes obtaining one or more antenna assembly configuration parameters that are associated with at least one spatial location of the at least one portable wireless node. For certain example implementations, at least one device may obtain (e.g., via at least one antenna assembly configuration parameter obtainment module 402) one or more antenna assembly configuration parameters 1070 that are associated with at least one spatial location 1072SL (e.g., a geographical position, an elevation position, or a combination thereof, etc.) of at least one portable wireless node 1002P. By way of example but not limitation, at least one portable wireless node may obtain one or more antenna assembly configuration parameters that are associated with at least one spatial location of the at least one portable wireless node (e.g., an operating system on a smartphone may acquire one or more phase delays for an outgoing signal that match a determined location on the earth for the smartphone). However, claimed subject matter is not limited to any particular described embodiments, implementations, examples, etc.

For certain example embodiments, an operation 1604 may be directed at least partially to wherein the obtaining one or more antenna assembly configuration parameters that are associated with at least one spatial location of the at least one portable wireless node (of operation 1602) includes obtaining one or more antenna assembly configuration parameters that are associated with at least one geographical position of the at least one portable wireless node. For certain example implementations, at least one device may obtain one or more antenna assembly configuration parameters 1070 that are associated with at least one geographical position 1072GP of at least one portable wireless node 1002P. By way of example but not limitation, at least one portable wireless node may obtain one or more antenna assembly configuration parameters that are associated with at least one geographical position of the at least one portable wireless node (e.g., a tablet computer may acquire one or more sets of antenna elements that are associated with an address corresponding to its own postal address location). However, claimed subject matter is not limited to any particular described embodiments, implementations, examples, etc.

For certain example embodiments, an operation 1606 may be directed at least partially to wherein the obtaining one or more antenna assembly configuration parameters that are associated with at least one geographical position of the at least one portable wireless node (of operation 1604) includes obtaining one or more antenna assembly configuration parameters that are associated with at least one satellite positioning system (SPS) coordinate of the at least one portable wireless node. By way of example but not limitation, at least one portable wireless node may obtain one or more antenna assembly configuration parameters that are associated with at least one SPS coordinate of the at least one portable wireless node (e.g., an Android smartphone may ascertain one or more phase delays that are linked to at least one global positioning system (GPS) coordinate corresponding to a location of the Android smartphone). However, claimed subject matter is not limited to any particular described embodiments, implementations, examples, etc.

For certain example embodiments, an operation 1608 may be directed at least partially to wherein the obtaining one or more antenna assembly configuration parameters that are associated with at least one spatial location of the at least one portable wireless node (of operation 1602) includes obtaining one or more antenna assembly configuration parameters that are associated with at least one elevation position of the at least one portable wireless node. For certain example implementations, at least one device may obtain one or more antenna assembly configuration parameters 1070 that are associated with at least one elevation position 1072EP of at least one portable wireless node 1002P. By way of example but not limitation, at least one portable wireless node may obtain one or more antenna assembly configuration parameters that are associated with at least one elevation position of the at least one portable wireless node (e.g., a tablet computer may acquire a set of antenna junctions to send signals to or receive signals from that correspond to a floor of a building that an owner of the tablet computer is on). However, claimed subject matter is not limited to any particular described embodiments, implementations, examples, etc.

For certain example embodiments, an operation 1610 may be directed at least partially to wherein the obtaining one or more antenna assembly configuration parameters that are associated with at least one elevation position of the at least one portable wireless node (of operation 1608) includes obtaining one or more antenna assembly configuration parameters that are associated with at least one altitude of the at least one portable wireless node. By way of example but not limitation, at least one portable wireless node may obtain one or more antenna assembly configuration parameters that are associated with at least one altitude of the at least one portable wireless node (e.g., an Apple iPad may retrieve from memory a number of control values to apply to an antenna assembly responsive to a height in meters above the earth at which the iPad is currently located). However, claimed subject matter is not limited to any particular described embodiments, implementations, examples, etc.

Figure 6B:
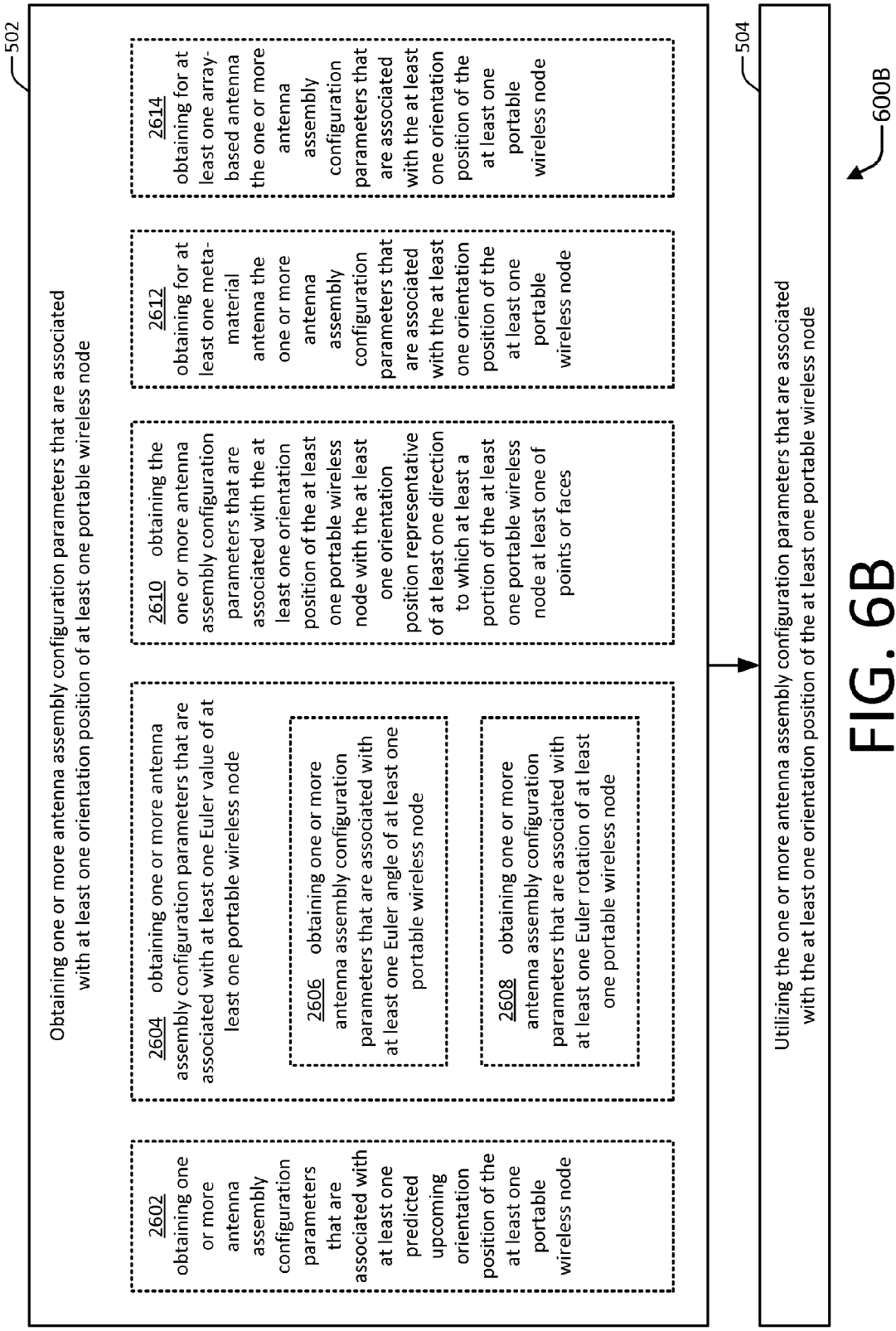

FIG. 6B illustrates a flow diagram 600B having any one or more of example operations 2602-2614. For certain example embodiments, an operation 2602 may be directed at least partially to wherein the obtaining one or more antenna assembly configuration parameters that are associated with at least one orientation position of at least one portable wireless node (of operation 502) includes obtaining one or more antenna assembly configuration parameters that are associated with at least one predicted upcoming orientation position of the at least one portable wireless node. For certain example implementations, at least one device may obtain one or more antenna assembly configuration parameters 1070 that are associated with at least one predicted upcoming (e.g., expected or planned, future or forthcoming) orientation position 1072PUOP of at least one portable wireless node 1002P. By way of example but not limitation, at least one portable wireless node may obtain one or more antenna assembly configuration parameters that are associated with at least one predicted upcoming orientation position of the at least one portable wireless node (e.g., a laptop may acquire a subset of antenna elements of an antenna assembly that are to be used for transceiving, with the subset of antenna elements corresponding to a predicted angle of a screen portion that also houses the antenna assembly if a user typically opens the screen portion to an angular range of 95 to 110 degrees). However, claimed subject matter is not limited to any particular described embodiments, implementations, examples, etc.

For certain example embodiments, an operation 2604 may be directed at least partially to wherein the obtaining one or more antenna assembly configuration parameters that are associated with at least one orientation position of at least one portable wireless node (of operation 502) includes obtaining one or more antenna assembly configuration parameters that are associated with at least one Euler value of at least one portable wireless node. For certain example implementations, at least one device may obtain one or more antenna assembly configuration parameters 1070 that are associated with at least one Euler value 1072EV (e.g., a rotational angle, a rotation about one or more axes of a coordinate system, at least one of three elemental rotations, or a combination thereof, etc.) of at least one portable wireless node 1002P. By way of example but not limitation, at least one portable wireless node may obtain one or more antenna assembly configuration parameters that are associated with at least one Euler value of at least one portable wireless node (e.g., a phablet may retrieve from memory at least one antenna signal processing mechanism that corresponds to three rotations at a current geographical position). However, claimed subject matter is not limited to any particular described embodiments, implementations, examples, etc.

For certain example embodiments, an operation 2606 may be directed at least partially to wherein the obtaining one or more antenna assembly configuration parameters that are associated with at least one Euler value of at least one portable wireless node (of operation 2604) includes obtaining one or more antenna assembly configuration parameters that are associated with at least one Euler angle of at least one portable wireless node. By way of example but not limitation, at least one portable wireless node may obtain one or more antenna assembly configuration parameters that are associated with at least one Euler angle of at least one portable wireless node (e.g., a Galaxy smartphone may receive from a Samsung internet server at least one direction to aim or form a beam that corresponds to a set of three measurement degrees relating to how the Galaxy smartphone is being held by a user). However, claimed subject matter is not limited to any particular described embodiments, implementations, examples, etc.

For certain example embodiments, an operation 2608 may be directed at least partially to wherein the obtaining one or more antenna assembly configuration parameters that are associated with at least one Euler value of at least one portable wireless node (of operation 2604) includes obtaining one or more antenna assembly configuration parameters that are associated with at least one Euler rotation of at least one portable wireless node. By way of example but not limitation, at least one portable wireless node may obtain one or more antenna assembly configuration parameters that are associated with at least one Euler rotation of at least one portable wireless node (e.g., a Galaxy smartphone may receive from a Google cloud server one or more phase shifts that correspond to at least one specified rotational position of the Galaxy smartphone as it is leaned against a Styrofoam container on a table). However, claimed subject matter is not limited to any particular described embodiments, implementations, examples, etc.

For certain example embodiments, an operation 2610 may be directed at least partially to wherein the obtaining one or more antenna assembly configuration parameters that are associated with at least one orientation position of at least one portable wireless node (of operation 502) includes obtaining the one or more antenna assembly configuration parameters that are associated with the at least one orientation position of the at least one portable wireless node with the at least one orientation position representative of at least one direction to which at least a portion of the at least one portable wireless node at least one of points or faces. For certain example implementations, at least one device may obtain one or more antenna assembly configuration parameters 1070 that are associated with at least one orientation position 1072OP of at least one portable wireless node 1002P with at least one orientation position 1072OP representative of at least one direction to which at least a portion of at least one portable wireless node 1002P at least one of points or faces (e.g., a direction of at least one edge, a direction of a screen, a direction of a camera lens, or a combination thereof, etc.). By way of example but not limitation, at least one portable wireless node may obtain the one or more antenna assembly configuration parameters that are associated with the at least one orientation position of the at least one portable wireless node with the at least one orientation position representative of at least one direction to which at least a portion of the at least one portable wireless node at least one of points or faces (e.g., a phone may receive from a tablet one or more phase delays corresponding to a direction in which a normal to a screen of the phone is pointing during media data reception). However, claimed subject matter is not limited to any particular described embodiments, implementations, examples, etc.

For certain example embodiments, an operation 2612 may be directed at least partially to wherein the obtaining one or more antenna assembly configuration parameters that are associated with at least one orientation position of at least one portable wireless node (of operation 502) includes obtaining for at least one meta-material antenna the one or more antenna assembly configuration parameters that are associated with the at least one orientation position of the at least one portable wireless node. For certain example implementations, at least one device may obtain for at least one meta-material antenna 1006MM one or more antenna assembly configuration parameters 1070 that are associated with at least one orientation position 1072OP of at least one portable wireless node 1002P. By way of example but not limitation, at least one portable wireless node may obtain for at least one meta-material antenna the one or more antenna assembly configuration parameters that are associated with the at least one orientation position of the at least one portable wireless node (e.g., a mobile device may experimentally determine voltage levels to be applied to control signal junctions of a meta-material antenna to facilitate wireless communication with a particular base station given a current or predicted rotational position of the mobile device). However, claimed subject matter is not limited to any particular described embodiments, implementations, examples, etc.

For certain example embodiments, an operation 2614 may be directed at least partially to wherein the obtaining one or more antenna assembly configuration parameters that are associated with at least one orientation position of at least one portable wireless node (of operation 502) includes obtaining for at least one array-based antenna the one or more antenna assembly configuration parameters that are associated with the at least one orientation position of the at least one portable wireless node. For certain example implementations, at least one device may obtain for at least one array-based antenna 1006AR/1006PH one or more antenna assembly configuration parameters 1070 that are associated with at least one orientation position 1072OP of at least one portable wireless node 1002P. By way of example but not limitation, at least one portable wireless node may obtain for at least one array-based antenna the one or more antenna assembly configuration parameters that are associated with the at least one orientation position of the at least one portable wireless node (e.g., a wireless entertainment appliance may retrieve from an internal data structure (i) one or more relative respective electromagnetic amplitudes for emanation from multiple respective elements of an array antenna or (ii) one or more respective phase delays for multiple respective elements of an array antenna that correspond to how a user is holding the wireless entertainment appliance at a given geographical position). However, claimed subject matter is not limited to any particular described embodiments, implementations, examples, etc.

FIG. 6C1 illustrates a flow diagram 600C1 having any one or more of example operations 3602-3610. For certain example embodiments, an operation 3602 may be directed at least partially to wherein the obtaining one or more antenna assembly configuration parameters that are associated with at least one orientation position of at least one portable wireless node (of operation 502) includes retrieving the one or more antenna assembly configuration parameters that are associated with the at least one orientation position of the at least one portable wireless node from at least one memory of the at least one portable wireless node. For certain example implementations, at least one device may retrieve (e.g., read, load, pull out, or a combination thereof, etc.) one or more antenna assembly configuration parameters 1070 that are associated with at least one orientation position 1072OP of at least one portable wireless node 1002P from at least one memory (e.g., media 204, such as RAM, flash memory, or a combination thereof, etc.) of at least one portable wireless node 1002P. By way of example but not limitation, at least one portable wireless node may retrieve the one or more antenna assembly configuration parameters that are associated with the at least one orientation position of the at least one portable wireless node from at least one memory of the at least one portable wireless node (e.g., a smartphone may read from its flash memory a subset of available antenna junctions with the subset corresponding to a number of degrees from vertical at which the smartphone is being held). However, claimed subject matter is not limited to any particular described embodiments, implementations, examples, etc.

For certain example embodiments, an operation 3604 may be directed at least partially to wherein the retrieving the one or more antenna assembly configuration parameters that are associated with the at least one orientation position of the at least one portable wireless node from at least one memory of the at least one portable wireless node (of operation 3602) includes applying the at least one orientation position of the at least one portable wireless node to at least one antenna configuration data structure stored by the at least one memory of the at least one portable wireless node. For certain example implementations, at least one device may apply (e.g., provide as input, use as search term(s), factor into for a look up, or a combination thereof, etc.) at least one orientation position 1072OP of at least one portable wireless node 1002P to at least one antenna configuration data structure 1008 (e.g., a database, a table, one or more linking records, an associative memory mechanism such as a cache, or a combination thereof, etc.) stored (e.g., saved, retained, made accessible by, or a combination thereof, etc.) by at least one memory (e.g., media 204) of at least one portable wireless node 1002P. By way of example but not limitation, at least one portable wireless node may apply the at least one orientation position of the at least one portable wireless node to at least one antenna configuration data structure stored by the at least one memory of the at least one portable wireless node (e.g., an HTC Android phone may use at least two of three Euler angles representing a rotational position of the phone to access a multi-dimensional table saved in a flash memory card of the HTC Android phone). However, claimed subject matter is not limited to any particular described embodiments, implementations, examples, etc.

For certain example embodiments, an operation 3606 may be directed at least partially to wherein the applying the at least one orientation position of the at least one portable wireless node to at least one antenna configuration data structure stored by the at least one memory of the at least one portable wireless node (of operation 3604) includes extracting the one or more antenna assembly configuration parameters from the at least one antenna configuration data structure stored by the at least one memory of the at least one portable wireless node responsive, at least partially, to the applying the at least one orientation position. By way of example but not limitation, at least one portable wireless node may extract the one or more antenna assembly configuration parameters from the at least one antenna configuration data structure stored by the at least one memory of the at least one portable wireless node responsive, at least partially, to the applying the at least one orientation position (e.g., an HTC Android phone may locate and read out multiple temporal shifts for signal inputs to or outputs from an antenna assembly from a number of cached configuration parameters that are respectively associated with a number of cached sets of Euler angles at least partly responsive to searching for at least two of three corresponding Euler angles in cached data). However, claimed subject matter is not limited to any particular described embodiments, implementations, examples, etc.

For certain example embodiments, an operation 3608 may be directed at least partially to wherein the utilizing the one or more antenna assembly configuration parameters that are associated with the at least one orientation position of the at least one portable wireless node (of operation 504) includes employing the one or more antenna assembly configuration parameters with at least one antenna assembly of the at least one portable wireless node. For certain example implementations, at least one device may employ (e.g., operate using, function in conjunction with, manipulate in response to, or a combination thereof, etc.) one or more antenna assembly configuration parameters 1070 with at least one antenna assembly 1006 of at least one portable wireless node 1002P. By way of example but not limitation, at least one portable wireless node may employ the one or more antenna assembly configuration parameters with at least one antenna assembly of the at least one portable wireless node (e.g., a wearable computing device may transmit or receive electromagnetic signals in conjunction with operating an antenna assembly using four of sixteen potential antenna junctions in accordance with configuration parameters identifying the four antenna junctions). However, claimed subject matter is not limited to any particular described embodiments, implementations, examples, etc.

For certain example embodiments, an operation 3610 may be directed at least partially to wherein the employing the one or more antenna assembly configuration parameters with at least one antenna assembly of the at least one portable wireless node (of operation 3608) includes coupling one or more signals to one or more junctions of the at least one antenna assembly based, at least partially, on the one or more antenna assembly configuration parameters. For certain example implementations, at least one device may couple (e.g., connect, provide, propagate, pair, enable exchange of electromagnetic energy of, or a combination thereof, etc.) one or more signals (e.g., electromagnetic energy, current or voltage having information, amplitude or frequency carrying data, digital or analog information that may be propagated, a quantifiable electric indication, or a combination thereof, etc.) to one or more junctions 1020 of at least one antenna assembly 1006 based, at least partially, on one or more antenna assembly configuration parameters 1070. By way of example but not limitation, at least one portable wireless node may couple one or more signals to one or more junctions of the at least one antenna assembly based, at least partially, on the one or more antenna assembly configuration parameters (e.g., a smartphone may provide baseband or frequency-upconverted signals carrying voice data to one or more connectors of an antenna apparatus in a manner comporting with or implementing multiple phase shifts or temporal delays for an array-based antenna). However, claimed subject matter is not limited to any particular described embodiments, implementations, examples, etc.

FIG. 6C2 illustrates a flow diagram 600C2 having any one or more of example operations 3612-3624 (plus 3608 or 3610). For certain example embodiments, an operation 3612 may be directed at least partially to wherein the coupling one or more signals to one or more junctions of the at least one antenna assembly based, at least partially, on the one or more antenna assembly configuration parameters (of operation 3610) includes coupling the one or more signals to the one or more junctions of the at least one antenna assembly with one or more frequencies of the one or more signals determined based, at least partially, on the one or more antenna assembly configuration parameters. By way of example but not limitation, at least one portable wireless node may couple the one or more signals to the one or more junctions of the at least one antenna assembly with one or more frequencies of the one or more signals determined based, at least partially, on the one or more antenna assembly configuration parameters (e.g., a Nokia Lumia phone may forward respective signals carrying picture data to respective connectors of an antenna apparatus with the respective signals oscillating at respective frequencies that are established or affected by a configuration parameter). However, claimed subject matter is not limited to any particular described embodiments, implementations, examples, etc.

For certain example embodiments, an operation 3614 may be directed at least partially to wherein the coupling one or more signals to one or more junctions of the at least one antenna assembly based, at least partially, on the one or more antenna assembly configuration parameters (of operation 3610) includes coupling the one or more signals to the one or more junctions of the at least one antenna assembly with one or more phase differences of the one or more signals determined based, at least partially, on the one or more antenna assembly configuration parameters. By way of example but not limitation, at least one portable wireless node may couple the one or more signals to the one or more junctions of the at least one antenna assembly with one or more phase differences of the one or more signals determined based, at least partially, on the one or more antenna assembly configuration parameters (e.g., an Apple iPhone may link multiple signals representing video to antenna pads with the multiple signals having multiple phase shifts that are established or affected by one or more antenna configuration parameters received from an Apple iCloud server). However, claimed subject matter is not limited to any particular described embodiments, implementations, examples, etc.

For certain example embodiments, an operation 3616 may be directed at least partially to wherein the coupling one or more signals to one or more junctions of the at least one antenna assembly based, at least partially, on the one or more antenna assembly configuration parameters (of operation 3610) includes coupling the one or more signals to the one or more junctions of the at least one antenna assembly with one or more temporal shifts of the one or more signals determined based, at least partially, on the one or more antenna assembly configuration parameters. By way of example but not limitation, at least one portable wireless node may couple the one or more signals to the one or more junctions of the at least one antenna assembly with one or more temporal shifts of the one or more signals determined based, at least partially, on the one or more antenna assembly configuration parameters (e.g., an Apple iPad may receive multiple signals representing video via antenna pads with the multiple signals being processed using various temporal delays that are established or impacted by one or more antenna configuration parameters received from an Apple iCloud server). However, claimed subject matter is not limited to any particular described embodiments, implementations, examples, etc.

For certain example embodiments, an operation 3618 may be directed at least partially to wherein the coupling one or more signals to one or more junctions of the at least one antenna assembly based, at least partially, on the one or more antenna assembly configuration parameters (of operation 3610) includes coupling the one or more signals to the one or more junctions of the at least one antenna assembly with one or more control amplitudes of the one or more signals determined based, at least partially, on the one or more antenna assembly configuration parameters. By way of example but not limitation, at least one portable wireless node may couple the one or more signals to the one or more junctions of the at least one antenna assembly with one or more control amplitudes of the one or more signals determined based, at least partially, on the one or more antenna assembly configuration parameters (e.g., an Android-powered mobile communication device may apply voltage control signals to control junctions of a surface scattering antenna with amplitudes of the voltage control signals established or tuned responsive to beamforming parameters retrieved from a user-specific data structure that is stored in the cloud). However, claimed subject matter is not limited to any particular described embodiments, implementations, examples, etc.

For certain example embodiments, an operation 3620 may be directed at least partially to wherein the employing the one or more antenna assembly configuration parameters with at least one antenna assembly of the at least one portable wireless node (of operation 3608) includes forming at least one beam using the at least one antenna assembly based, at least partially, on the one or more antenna assembly configuration parameters. For certain example implementations, at least one device may form (e.g., create, receive via, transmit via, emanate, interact with, transceive using a spatial pattern defined by, or a combination thereof, etc.) at least one beam 1028 using at least one antenna assembly 1006 based, at least partially, on one or more antenna assembly configuration parameters 1070. By way of example but not limitation, at least one portable wireless node may form at least one beam using the at least one antenna assembly based, at least partially, on the one or more antenna assembly configuration parameters (e.g., a vehicle may transmit or receive electromagnetic radiation using an antenna apparatus by focusing on a particular spatial pattern in accordance with one or more values that shape the particular spatial pattern). However, claimed subject matter is not limited to any particular described embodiments, implementations, examples, etc.

For certain example embodiments, an operation 3622 may be directed at least partially to wherein the forming at least one beam using the at least one antenna assembly based, at least partially, on the one or more antenna assembly configuration parameters (of operation 3620) includes forming at least one directed antenna beam pattern using the at least one antenna assembly based, at least partially, on the one or more antenna assembly configuration parameters. By way of example but not limitation, at least one portable wireless node may form at least one directed antenna beam pattern using the at least one antenna assembly based, at least partially, on the one or more antenna assembly configuration parameters (e.g., a laptop may produce or absorb for processing electromagnetic radiation using an antenna apparatus by focusing on a particular spatial pattern that is aimed in accordance with one or more values that are retrieved from a local data structure). However, claimed subject matter is not limited to any particular described embodiments, implementations, examples, etc.

For certain example embodiments, an operation 3624 may be directed at least partially to wherein the employing the one or more antenna assembly configuration parameters with at least one antenna assembly of the at least one portable wireless node (of operation 3608) includes communicating with at least one other wireless node using the at least one antenna assembly of the at least one portable wireless node with the at least one antenna assembly configured in accordance with the one or more antenna assembly configuration parameters. For certain example implementations, at least one device may communicate with (e.g., establish protocols with, send data to, receive information from, transceive electromagnetic signals with, or a combination thereof, etc.) at least one other wireless node 410 (e.g., another portable wireless node, a fixed wireless node, or a combination thereof, etc.) using at least one antenna assembly 1006 of at least one portable wireless node 1002P with at least one antenna assembly 1006 configured in accordance with one or more antenna assembly configuration parameters 1070. By way of example but not limitation, at least one portable wireless node may communicate with at least one other wireless node using the at least one antenna assembly of the at least one portable wireless node with the at least one antenna assembly configured in accordance with the one or more antenna assembly configuration parameters (e.g., a mobile handset may exchange signals with a base station or a tablet computer using an antenna apparatus of the mobile handset that is being operated by applying a set of phase shifts to one or more signals to be transceived via the antenna apparatus so as to direct at least one beam toward the base station or tablet computer). However, claimed subject matter is not limited to any particular described embodiments, implementations, examples, etc.

Figure 6D:
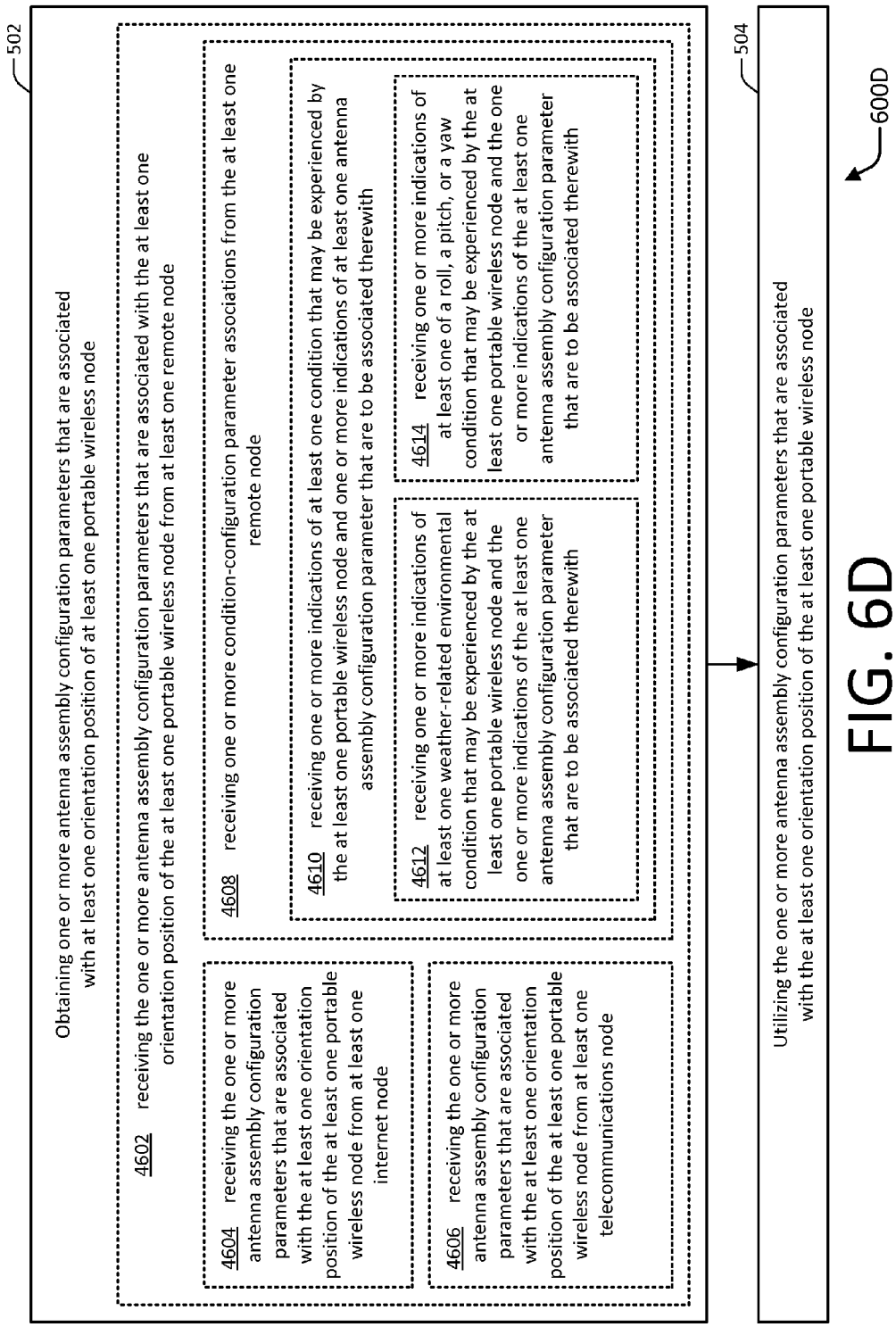
Figure 611:
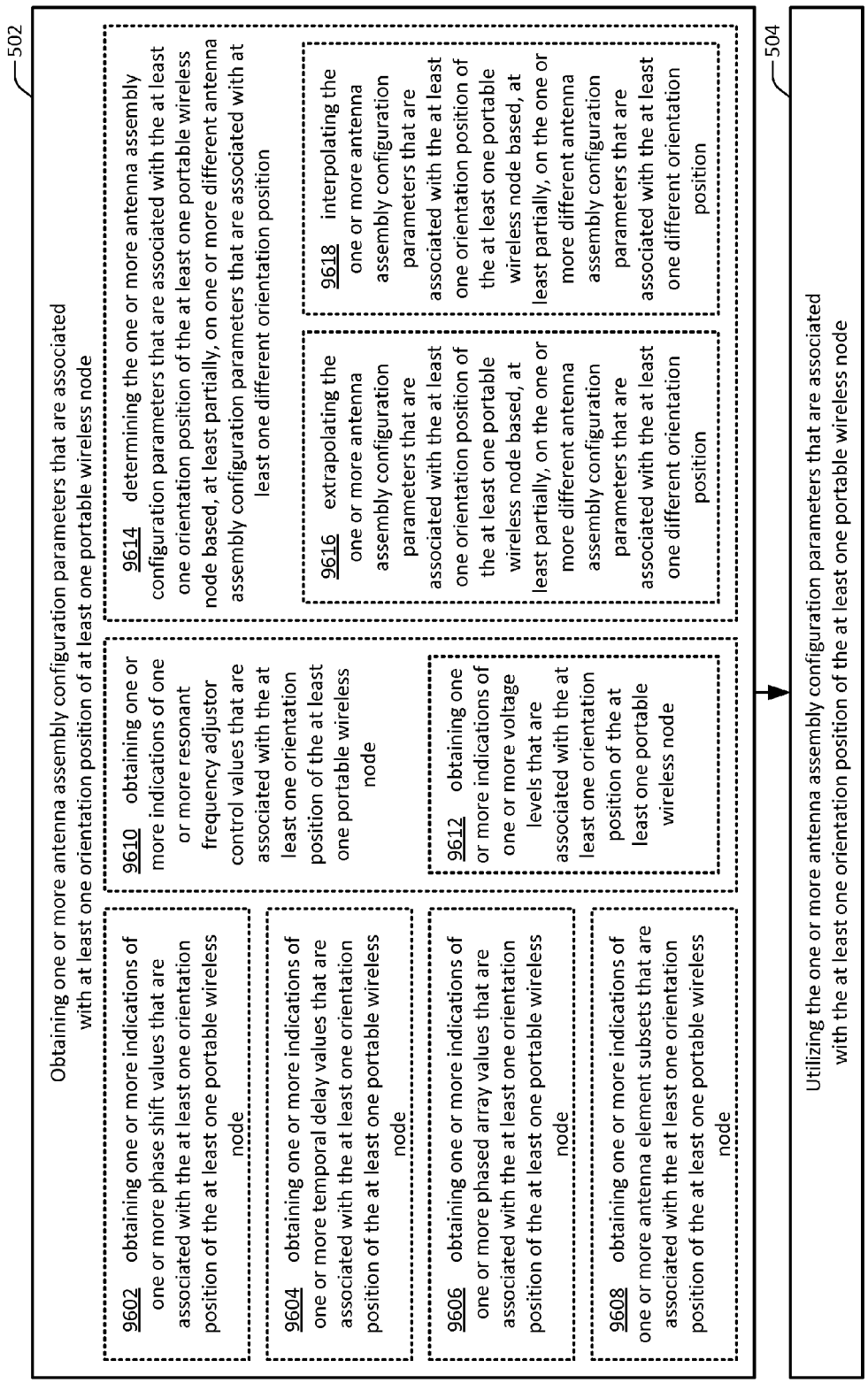

FIG. 6D illustrates a flow diagram 600D having any one or more of example operations 4602-4614. For certain example embodiments, an operation 4602 may be directed at least partially to wherein the obtaining one or more antenna assembly configuration parameters that are associated with at least one orientation position of at least one portable wireless node (of operation 502) includes receiving the one or more antenna assembly configuration parameters that are associated with the at least one orientation position of the at least one portable wireless node from at least one remote node. For certain example implementations, at least one device may receive (e.g., accept, decode, demodulate, downconvert, detect, obtain from or via a communication or transmission from another, route from an antenna or antenna element, acquire via an electromagnetic signal propagating in the air, take into possession wirelessly, or a combination thereof, etc.) one or more antenna assembly configuration parameters 1070 that are associated with at least one orientation position 1072OP of at least one portable wireless node 1002P from at least one remote node 412 (e.g., a telecom node 1014 (e.g., of FIG. 1H), an internet node 1016 (e.g., of FIG. 1D), a server device, or a combination thereof, etc.). By way of example but not limitation, at least one portable wireless node may receive the one or more antenna assembly configuration parameters that are associated with the at least one orientation position of the at least one portable wireless node from at least one remote node (e.g., a smartphone that is being held sideways while a user sits on a bench in an airport may receive a set of phase shifts that are associated with that sideways position and that airport bench from a server device located at least partially across a network). However, claimed subject matter is not limited to any particular described embodiments, implementations, examples, etc.

For certain example embodiments, an operation 4604 may be directed at least partially to wherein the receiving the one or more antenna assembly configuration parameters that are associated with the at least one orientation position of the at least one portable wireless node from at least one remote node (of operation 4602) includes receiving the one or more antenna assembly configuration parameters that are associated with the at least one orientation position of the at least one portable wireless node from at least one internet node. By way of example but not limitation, at least one portable wireless node may receive the one or more antenna assembly configuration parameters that are associated with the at least one orientation position of the at least one portable wireless node from at least one internet node (e.g., an Android-based tablet from Samsung may receive from a Google cloud server a subset of antenna junctions to use to form a beam that is directed to a proximate fixed wireless node based on a position of the tablet in which a screen is facing toward the earth). However, claimed subject matter is not limited to any particular described embodiments, implementations, examples, etc.

For certain example embodiments, an operation 4606 may be directed at least partially to wherein the receiving the one or more antenna assembly configuration parameters that are associated with the at least one orientation position of the at least one portable wireless node from at least one remote node (of operation 4602) includes receiving the one or more antenna assembly configuration parameters that are associated with the at least one orientation position of the at least one portable wireless node from at least one telecommunications node. By way of example but not limitation, at least one portable wireless node may receive the one or more antenna assembly configuration parameters that are associated with the at least one orientation position of the at least one portable wireless node from at least one telecommunications node (e.g., a feature phone may receive from a Verizon telecommunications switch or gateway one or more phase shifts for antenna inputs/outputs that facilitate communicating with a base station located in a ceiling rafter of a mall food court in partial dependence on at least an angular position of the feature phone against a user's head while they eat and talk). However, claimed subject matter is not limited to any particular described embodiments, implementations, examples, etc.

For certain example embodiments, an operation 4608 may be directed at least partially to wherein the receiving the one or more antenna assembly configuration parameters that are associated with the at least one orientation position of the at least one portable wireless node from at least one remote node (of operation 4602) includes receiving one or more condition-configuration parameter associations from the at least one remote node. For certain example implementations, at least one device may receive one or more condition-configuration parameter associations 1076 (e.g., a correspondence, a linkage, a relation, or a combination thereof, etc. of at least one orientation position 1072OP or other condition 1072 (e.g., of FIG. 1E) and at least one antenna assembly configuration parameter 1070) from at least one remote node 412. By way of example but not limitation, at least one portable wireless node may receive one or more condition-configuration parameter associations from the at least one remote node (e.g., a Samsung tablet-laptop hybrid may receive multiple respective pairs of (i) respective orientation positions and (ii) corresponding signal amplitudes from a Samsung cloud server if a user takes the hybrid tablet-laptop to a new city via an airline flight). However, claimed subject matter is not limited to any particular described embodiments, implementations, examples, etc.

For certain example embodiments, an operation 4610 may be directed at least partially to wherein the receiving one or more condition-configuration parameter associations from the at least one remote node (of operation 4608) includes receiving one or more indications of at least one condition that may be experienced by the at least one portable wireless node and one or more indications of at least one antenna assembly configuration parameter that are to be associated therewith. For certain example implementations, at least one device may receive one or more indications (e.g., description, explanation, code, numerical value, signifier, identification, or a combination thereof, etc.) of at least one condition 1072 that may be experienced by at least one portable wireless node 1002P and one or more indications of at least one antenna assembly configuration parameter 1070 that are to be associated therewith. By way of example but not limitation, at least one portable wireless node may receive one or more indications of at least one condition that may be experienced by the at least one portable wireless node and one or more indications of at least one antenna assembly configuration parameter that are to be associated therewith (e.g., an Amazon tablet may receive from an Amazon server a description of a physical state in which the Amazon tablet may be placed and an identification of a subset of total available antenna elements that are to be used for communication if the Amazon tablet is placed in that physical state). However, claimed subject matter is not limited to any particular described embodiments, implementations, examples, etc.

For certain example embodiments, an operation 4612 may be directed at least partially to wherein the receiving one or more indications of at least one condition that may be experienced by the at least one portable wireless node and one or more indications of at least one antenna assembly configuration parameter that are to be associated therewith (of operation 4610) includes receiving one or more indications of at least one weather-related environmental condition that may be experienced by the at least one portable wireless node and the one or more indications of the at least one antenna assembly configuration parameter that are to be associated therewith. By way of example but not limitation, at least one portable wireless node may receive one or more indications of at least one weather-related environmental condition that may be experienced by the at least one portable wireless node and the one or more indications of the at least one antenna assembly configuration parameter that are to be associated therewith (e.g., an Apple iPhone may receive from an Apple iCloud server a range of humidity values and an associated antenna from among multiple possible antennas of the iPhone that is to be selected for wireless communication if the ambient humidity falls within the received range of humidity values). However, claimed subject matter is not limited to any particular described embodiments, implementations, examples, etc.

For certain example embodiments, an operation 4614 may be directed at least partially to wherein the receiving the one or more antenna assembly configuration parameters that are associated with the at least one orientation position of the at least one portable wireless node from at least one remote node (of operation 4610) includes receiving one or more indications of at least one of a roll, a pitch, or a yaw condition that may be experienced by the at least one portable wireless node and the one or more indications of the at least one antenna assembly configuration parameter that are to be associated therewith. By way of example but not limitation, at least one portable wireless node may receive one or more indications of at least one of a roll, a pitch, or a yaw condition that may be experienced by the at least one portable wireless node and the one or more indications of the at least one antenna assembly configuration parameter that are to be associated therewith (e.g., a RIM Blackberry may receive one or more degrees corresponding to up to three dimensions of rotations about a center of mass or another point or axis with respect to the Rim Blackberry that are linked to at least one code indicating which patch antenna of the RIM Blackberry is to be used given a determined dimensional rotation). However, claimed subject matter is not limited to any particular described embodiments, implementations, examples, etc.

FIG. 6E1 illustrates a flow diagram 600E1 having any one or more of example operations 5602-5614 (plus 4602). For certain example embodiments, an operation 5602 may be directed at least partially to wherein the receiving the one or more antenna assembly configuration parameters that are associated with the at least one orientation position of the at least one portable wireless node from at least one remote node (of operation 4602) includes receiving the one or more antenna assembly configuration parameters from the at least one remote node at least partly in response to transmitting the at least one orientation position of the at least one portable wireless node. For certain example implementations, at least one device may receive one or more antenna assembly configuration parameters 1070 from at least one remote node 412 at least partly in response to transmitting (e.g., sending, propagating an electromagnetic signal containing, emanating, or a combination thereof, etc.) at least one orientation position 1072OP of at least one portable wireless node 1002P. By way of example but not limitation, at least one portable wireless node may receive the one or more antenna assembly configuration parameters from the at least one remote node at least partly in response to transmitting the at least one orientation position of the at least one portable wireless node. (e.g., a mobile station may receive from an at&t telecommunications node one or more frequencies to be adopted for signal transceiving by the mobile station partly in response to a transmission by the mobile station—such as to a corresponding at&t network—of one or more Euler angles representing a rotational position of the mobile station). However, claimed subject matter is not limited to any particular described embodiments, implementations, examples, etc.

For certain example embodiments, an operation 5604 may be directed at least partially to wherein the receiving the one or more antenna assembly configuration parameters that are associated with the at least one orientation position of the at least one portable wireless node from at least one remote node (of operation 4602) includes receiving the one or more antenna assembly configuration parameters from the at least one remote node at least partly in response to transmitting at least a portion of a physical state of the at least one portable wireless node. For certain example implementations, at least one device may receive one or more antenna assembly configuration parameters 1070 from at least one remote node 412 at least partly in response to transmitting at least a portion of a physical state 1072PS of at least one portable wireless node 1002P. By way of example but not limitation, at least one portable wireless node may receive the one or more antenna assembly configuration parameters from the at least one remote node at least partly in response to transmitting at least a portion of a physical state of the at least one portable wireless node (e.g., an Apple iPod may receive temporal shifts for one or more antenna signals from an Apple server responsive to sending to an Apple server a geographical position, an elevation position, or an orientation position corresponding to the Apple iPod). However, claimed subject matter is not limited to any particular described embodiments, implementations, examples, etc.

For certain example embodiments, an operation 5606 may be directed at least partially to wherein the receiving the one or more antenna assembly configuration parameters from the at least one remote node at least partly in response to transmitting at least a portion of a physical state of the at least one portable wireless node (of operation 5604) includes receiving the one or more antenna assembly configuration parameters from the at least one remote node at least partly in response to transmitting at least a portion of a spatial location of the at least one portable wireless node. By way of example but not limitation, at least one portable wireless node may receive the one or more antenna assembly configuration parameters from the at least one remote node at least partly in response to transmitting at least a portion of a spatial location of the at least one portable wireless node (e.g., an Android-based tablet may receive control signal amplitudes for a surface scattering antenna from a Google server responsive at least partly to a sending wirelessly of a geographical position or an elevation position of the Android-based tablet). However, claimed subject matter is not limited to any particular described embodiments, implementations, examples, etc.

For certain example embodiments, an operation 5608 may be directed at least partially to wherein the receiving the one or more antenna assembly configuration parameters that are associated with the at least one orientation position of the at least one portable wireless node from at least one remote node (of operation 4602) includes receiving from the at least one remote node multiple antenna assembly configuration parameters for multiple orientation positions that correspond to at least one spatial location of the at least one portable wireless node. For certain example implementations, at least one device may receive from at least one remote node 412 multiple antenna assembly configuration parameters 1070 for multiple orientation positions 1072OP that correspond to at least one spatial location 1072SL of at least one portable wireless node 1002P. By way of example but not limitation, at least one portable wireless node may receive from the at least one remote node multiple antenna assembly configuration parameters for multiple orientation positions that correspond to at least one spatial location of the at least one portable wireless node (e.g., an HTC One smartphone may receive from a Sprint server multiple respective phase shifts that correspond to multiple respective orientation positions for a given spatial location of the HTC One smartphone). However, claimed subject matter is not limited to any particular described embodiments, implementations, examples, etc.

For certain example embodiments, an operation 5610 may be directed at least partially to wherein the receiving from the at least one remote node multiple antenna assembly configuration parameters for multiple orientation positions that correspond to at least one spatial location of the at least one portable wireless node (of operation 5608) includes receiving from the at least one remote node the multiple antenna assembly configuration parameters for the multiple orientation positions that correspond to at least one current spatial location of the at least one portable wireless node. By way of example but not limitation, at least one portable wireless node may receive from the at least one remote node the multiple antenna assembly configuration parameters for the multiple orientation positions that correspond to at least one current spatial location of the at least one portable wireless node (e.g., a Kyocera smartphone may receive from a Google server multiple respective phase shifts that correspond to multiple respective orientation positions applicable to current GPS coordinates of the Kyocera smartphone). However, claimed subject matter is not limited to any particular described embodiments, implementations, examples, etc.

For certain example embodiments, an operation 5612 may be directed at least partially to wherein the receiving from the at least one remote node multiple antenna assembly configuration parameters for multiple orientation positions that correspond to at least one spatial location of the at least one portable wireless node (of operation 5608) includes receiving from the at least one remote node the multiple antenna assembly configuration parameters for the multiple orientation positions that correspond to at least one predicted spatial location of the at least one portable wireless node. For certain example implementations, at least one device may receive from at least one remote node 412 multiple antenna assembly configuration parameters 1070 for multiple orientation positions 1072OP that correspond to at least one predicted spatial location 1072PSL of at least one portable wireless node 1002P. By way of example but not limitation, at least one portable wireless node may receive from the at least one remote node the multiple antenna assembly configuration parameters for the multiple orientation positions that correspond to at least one predicted spatial location of the at least one portable wireless node (e.g., a Nexus phone may receive from a Google server farm multiple subsets of antenna junctions to utilize from among a total set of available antenna junctions of the Nexus phone to establish different transceiving directionalities for different degrees from a vertical orientation for the Nexus phone for a potential upcoming geographical position of the Nexus phone which potential geographical position is predicted based at least partly on a current velocity or trajectory of travel). However, claimed subject matter is not limited to any particular described embodiments, implementations, examples, etc.

For certain example embodiments, an operation 5614 may be directed at least partially to wherein the receiving from the at least one remote node the multiple antenna assembly configuration parameters for the multiple orientation positions that correspond to at least one predicted spatial location of the at least one portable wireless node (of operation 5612) includes receiving from the at least one remote node the multiple antenna assembly configuration parameters for the multiple orientation positions that correspond to the at least one predicted spatial location of the at least one portable wireless node at least partly responsive to at least one transmission of the at least one predicted spatial location of the at least one portable wireless node. By way of example but not limitation, at least one portable wireless node may receive from the at least one remote node the multiple antenna assembly configuration parameters for the multiple orientation positions that correspond to the at least one predicted spatial location of the at least one portable wireless node at least partly responsive to at least one transmission of the at least one predicted spatial location of the at least one portable wireless node (e.g., a Samsung Galaxy phone may receive from a Samsung server multiple subsets of antenna junctions to utilize from among a total set of available antenna junctions of the Galaxy phone to establish different transceiving directionalities for different angular positions of the Galaxy phone for a potential upcoming elevation position of the Galaxy phone which potential elevation position is predicted based at least partly on calendar scheduled meeting on the 18$^{th}$ floor of a building, responsive at least partly to a transmission of the predicted 18th floor level of the building to the Samsung server). However, claimed subject matter is not limited to any particular described embodiments, implementations, examples, etc.

FIG. 6E2 illustrates a flow diagram 600E2 having any one or more of example operations 5616-5622. For certain example embodiments, an operation 5616 may be directed at least partially to wherein the obtaining one or more antenna assembly configuration parameters that are associated with at least one orientation position of at least one portable wireless node (of operation 502) includes transmitting to at least one remote node at least a portion of at least one physical state of the at least one portable wireless node. For certain example implementations, at least one device may transmit (e.g., send, communicate wirelessly, convey, frequency up-convert, modulate, encode, propagate, dispatch, emanate from an emitter or antenna or at least one element of an antenna, forward, broadcast, disseminate, transfer, cause to travel through or over a medium, impart, or a combination thereof, etc.) to at least one remote node 412 at least a portion of at least one physical state 1072PS of at least one portable wireless node 1002P. By way of example but not limitation, at least one portable wireless node may transmit to at least one remote node at least a portion of at least one physical state of the at least one portable wireless node (e.g., an Apple iPad may transmit to an Apple iCloud server via at least one wireless link (i) one or more GPS coordinates representing a geographical position or (ii) one or more degree measurements representing Euler angles of the Apple iPad). However, claimed subject matter is not limited to any particular described embodiments, implementations, examples, etc.

For certain example embodiments, an operation 5618 may be directed at least partially to wherein the transmitting to at least one remote node at least a portion of at least one physical state of the at least one portable wireless node (of operation 5616) includes transmitting to the at least one remote node at least a portion of at least one elevation position of the at least one portable wireless node. By way of example but not limitation, at least one portable wireless node may transmit to the at least one remote node at least a portion of at least one elevation position of the at least one portable wireless node (e.g., a Nokia Lumia phone may transmit to a Nokia navigational server or a Nokia wireless quality enhancement server an altitude value derived from or included as part of GPS data). However, claimed subject matter is not limited to any particular described embodiments, implementations, examples, etc.

For certain example embodiments, an operation 5620 may be directed at least partially to wherein the utilizing the one or more antenna assembly configuration parameters that are associated with the at least one orientation position of the at least one portable wireless node (of operation 504) includes storing the one or more antenna assembly configuration parameters, which are received from at least one remote node, with at least one antenna configuration data structure. For certain example implementations, at least one device may store (e.g., save, record, memorialize, write, or a combination thereof, etc.) one or more antenna assembly configuration parameters 1070, which are received from at least one remote node 412, with at least one antenna configuration data structure 1008. By way of example but not limitation, at least one portable wireless node may store the one or more antenna assembly configuration parameters, which are received from at least one remote node, with at least one antenna configuration data structure (e.g., a personal, portable Wi-Fi device—such as a MiFi device—may save antenna signal phase shifts, which were received from a base transceiver station of a cellular service provider's network, in a cached table of wireless communication enhancement values). However, claimed subject matter is not limited to any particular described embodiments, implementations, examples, etc.

For certain example embodiments, an operation 5622 may be directed at least partially to wherein the utilizing the one or more antenna assembly configuration parameters that are associated with the at least one orientation position of the at least one portable wireless node (of operation 504) includes communicating with at least one other wireless node using the one or more antenna assembly configuration parameters that are received from at least one remote node. For certain example implementations, at least one device may communicate (e.g., transmit, receive, or a combination thereof, etc.) with at least one other wireless node 410 using one or more antenna assembly configuration parameters 1070 that are received from at least one remote node 412. By way of example but not limitation, at least one portable wireless node may communicate with at least one other wireless node using the one or more antenna assembly configuration parameters that are received from at least one remote node (e.g., a tablet may receive from a Wi-Fi access point using a beam pattern that is shaped or directed in accordance with one or more indications received from server over the internet). However, claimed subject matter is not limited to any particular described embodiments, implementations, examples, etc.

FIG. 6F1 illustrates a flow diagram 600F1 having any one or more of example operations 6602-6608. For certain example embodiments, an operation 6602 may be directed at least partially to wherein the obtaining one or more antenna assembly configuration parameters that are associated with at least one orientation position of at least one portable wireless node (of operation 502) includes employing multiple antenna assembly configuration parameters for a particular at least one orientation position of the at least one portable wireless node during wireless communication. For certain example implementations, at least one device may employ (e.g., operate in accordance with, experiment with, implement at least partially sequentially or simultaneously, transmit or receive using, or a combination thereof, etc.) multiple antenna assembly configuration parameters 1070 for a particular at least one orientation position 1072OP of at least one portable wireless node 1002P during wireless communication. By way of example but not limitation, at least one portable wireless node may employ multiple antenna assembly configuration parameters for a particular at least one orientation position of the at least one portable wireless node during wireless communication (e.g., a smartphone may test during transmission or reception multiple different subsets of antenna elements or junctions from among a set of available antenna elements or junctions of an antenna assembly for a given angular orientation of the smartphone). However, claimed subject matter is not limited to any particular described embodiments, implementations, examples, etc.

For certain example embodiments, an operation 6604 may be directed at least partially to wherein the employing multiple antenna assembly configuration parameters for a particular at least one orientation position of the at least one portable wireless node during wireless communication (of operation 6602) includes ascertaining the one or more antenna assembly configuration parameters from among the multiple antenna assembly configuration parameters for the particular at least one orientation position of the at least one portable wireless node based, at least partially, on at least one measure of signal quality. For certain example implementations, at least one device may ascertain (e.g., determine, acquire, calculate, settle on, discover, or a combination thereof, etc.) one or more antenna assembly configuration parameters 1070 from among multiple antenna assembly configuration parameters 1070 for a particular at least one orientation position 1072OP of at least one portable wireless node 1002P based, at least partially, on at least one measure of signal quality 414 (e.g., indicator of signal quality, representation of ability to communicate data, signal strength, error rate, signal-to-noise (SNR) value, bit error rate (BER), throughput bandwidth, energy expenditure-to-bandwidth ratio, statistical value, ability to reduce power and maintain communication capability, or a combination thereof, etc.). By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one measure of signal quality (e.g., a slate computer may select a particular patch antenna from among multiple available patch antennas for a current orientation at which the slate computer is being held by comparing respective signal quality measures for respective ones of the multiple available patch antennas). However, claimed subject matter is not limited to any particular described embodiments, implementations, examples, etc.

For certain example embodiments, an operation 6606 may be directed at least partially to wherein the ascertaining the one or more antenna assembly configuration parameters from among the multiple antenna assembly configuration parameters for the particular at least one orientation position of the at least one portable wireless node based, at least partially, on at least one measure of signal quality (of operation 6604) includes ascertaining the one or more antenna assembly configuration parameters from among the multiple antenna assembly configuration parameters for the particular at least one orientation position of the at least one portable wireless node based, at least partially, on at least one signal to noise measurement. By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one signal to noise measurement (e.g., a watch with wireless capabilities may discover via experimentation a subset of antenna elements or junctions that provide at least a better signal-to-noise ratio (SNR) value (as compared to other subsets of antenna elements or junctions) for signals exchanged with another wireless node given a particular angular position of the wrist on which the watch is being worn). However, claimed subject matter is not limited to any particular described embodiments, implementations, examples, etc.

For certain example embodiments, an operation 6608 may be directed at least partially to wherein the ascertaining the one or more antenna assembly configuration parameters from among the multiple antenna assembly configuration parameters for the particular at least one orientation position of the at least one portable wireless node based, at least partially, on at least one measure of signal quality (of operation 6604) includes ascertaining the one or more antenna assembly configuration parameters from among the multiple antenna assembly configuration parameters for the particular at least one orientation position of the at least one portable wireless node based, at least partially, on at least one throughput measurement. By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one throughput measurement (e.g., a tablet computer may identify via experimentation a number of phase shifts or time delays for antenna signals given a particular angular position at which the tablet is being propped up based at least partly on a comparison of different values of bits per second (BPS) for different tested phase shifts or time delays for the antenna signals). However, claimed subject matter is not limited to any particular described embodiments, implementations, examples, etc.

FIG. 6F2 illustrates a flow diagram 600F2 having any one or more of example operations 6610-6618 (plus 6602). For certain example embodiments, an operation 6610 may be directed at least partially to wherein the employing multiple antenna assembly configuration parameters for a particular at least one orientation position of the at least one portable wireless node during wireless communication (of operation 6602) includes ascertaining the one or more antenna assembly configuration parameters from among the multiple antenna assembly configuration parameters for the particular at least one orientation position of the at least one portable wireless node based, at least partially, on at least one measure of power. For certain example implementations, at least one device may ascertain (e.g., determine, acquire, calculate, settle on, discover, or a combination thereof, etc.) one or more antenna assembly configuration parameters 1070 from among multiple antenna assembly configuration parameters 1070 for a particular at least one orientation position 1072OP of at least one portable wireless node 1002P based, at least partially, on at least one measure of power 416 (e.g., instantaneous power, continuous power, power consumption, power reserves, transmitting power, processing power, or a combination thereof, etc.). By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one measure of power (e.g., a mobile phone may identify a subset of antenna junctions from among a total set of antenna junctions of an onboard antenna given a vertical orientation of the mobile phone and based at least partially on an amount power consumed using that subset of antenna junctions). However, claimed subject matter is not limited to any particular described embodiments, implementations, examples, etc.

For certain example embodiments, an operation 6612 may be directed at least partially to wherein the ascertaining the one or more antenna assembly configuration parameters from among the multiple antenna assembly configuration parameters for the particular at least one orientation position of the at least one portable wireless node based, at least partially, on at least one measure of power (of operation 6610) includes ascertaining the one or more antenna assembly configuration parameters from among the multiple antenna assembly configuration parameters for the particular at least one orientation position of the at least one portable wireless node based, at least partially, on at least one measure of transmission power. By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one measure of transmission power (e.g., a Motorola smart phone may determine one or more phase shifts applicable to one or more antenna signals given a detected direction of gravitational force experienced by the Motorola smart phone and based at least partially on how much power is used to a particular counterpart wireless node with those one or more phase shifts). However, claimed subject matter is not limited to any particular described embodiments, implementations, examples, etc.

For certain example embodiments, an operation 6614 may be directed at least partially to wherein the ascertaining the one or more antenna assembly configuration parameters from among the multiple antenna assembly configuration parameters for the particular at least one orientation position of the at least one portable wireless node based, at least partially, on at least one measure of power (of operation 6610) includes ascertaining the one or more antenna assembly configuration parameters from among the multiple antenna assembly configuration parameters for the particular at least one orientation position of the at least one portable wireless node based, at least partially, on at least one measure of processing power. By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one measure of processing power (e.g., a Samsung Galaxy Tab may determine one or more temporal delays applicable to one or more antenna signals given a detected direction of gravitational force experienced by the Samsung Galaxy Tab and based at least partially on how much power is used to encode/decode or otherwise process signals to which those one or more phase shifts are applicable). However, claimed subject matter is not limited to any particular described embodiments, implementations, examples, etc.

For certain example embodiments, an operation 6616 may be directed at least partially to wherein the ascertaining the one or more antenna assembly configuration parameters from among the multiple antenna assembly configuration parameters for the particular at least one orientation position of the at least one portable wireless node based, at least partially, on at least one measure of power (of operation 6610) includes ascertaining the one or more antenna assembly configuration parameters from among the multiple antenna assembly configuration parameters for the particular at least one orientation position of the at least one portable wireless node based, at least partially, on at least one power constraint. For certain example implementations, at least one device may ascertain one or more antenna assembly configuration parameters 1070 from among multiple antenna assembly configuration parameters 1070 for a particular at least one orientation position 1072OP of at least one portable wireless node 1002P based, at least partially, on at least one power constraint 418. By way of example but not limitation, at least one portable wireless node may ascertain the one or more antenna assembly configuration parameters from among the multiple antenna assembly configuration parameters for the particular at least one orientation position of the at least one portable wireless node based, at least partially, on at least one power constraint (e.g., a laptop may select between one or more array-based antenna configuration parameters versus one or more meta-material antenna configuration parameters given a rotational angle opening of a screen of the laptop and based at least partially on at least one power-based factor, such as (i) whether a laptop is running on a battery or is plugged in or (ii) an amount of remaining charge of at least one battery of the laptop). However, claimed subject matter is not limited to any particular described embodiments, implementations, examples, etc.

For certain example embodiments, an operation 6618 may be directed at least partially to wherein the ascertaining the one or more antenna assembly configuration parameters from among the multiple antenna assembly configuration parameters for the particular at least one orientation position of the at least one portable wireless node based, at least partially, on at least one power constraint (of operation 6616) includes filtering the one or more antenna assembly configuration parameters from among the multiple antenna assembly configuration parameters for the particular at least one orientation position of the at least one portable wireless node based, at least partially, on at least one amount of power consumed to wirelessly communicate with at least one wireless node. By way of example but not limitation, at least one portable wireless node may filter the one or more antenna assembly configuration parameters from among the multiple antenna assembly configuration parameters for the particular at least one orientation position of the at least one portable wireless node based, at least partially, on at least one amount of power consumed to wirelessly communicate with at least one wireless node (e.g., an Acer Windows 8-based tablet may select from among a number of potential antenna junction subsets or phase shifts of antenna signals coupled to an antenna given an angle at which the Acer tablet is being held and a direction that the screen is facing using at least one criterion that considers a number of watts consumed to wirelessly communicate with a counterpart wireless node at or about a minimum bandwidth threshold). However, claimed subject matter is not limited to any particular described embodiments, implementations, examples, etc.

FIG. 6G1 illustrates a flow diagram 600G1 having any one or more of example operations 7602-7610 (plus 6602). For certain example embodiments, an operation 7602 may be directed at least partially to wherein the employing multiple antenna assembly configuration parameters for a particular at least one orientation position of the at least one portable wireless node during wireless communication (of operation 6602) includes reemploying at least a portion of the multiple antenna assembly configuration parameters for the particular at least one orientation position of the at least one portable wireless node during wireless communication if an elapsed time comports with at least one temporal threshold. For certain example implementations, at least one device may reemploy (e.g., operate in accordance with, experiment with, implement at least partially sequentially or simultaneously, transmit or receive using, or a combination thereof, etc.) at least a portion of (e.g., previously employed) multiple antenna assembly configuration parameters 1070 for a particular at least one orientation position 1072OP of at least one portable wireless node 1002P during wireless communication (e.g., with a transmission or reception of at least one wireless link 1004) if an elapsed time comports with (e.g., matches, meets, exceeds, equals, or a combination thereof, etc.) at least one temporal threshold 420 (e.g., period of time, number of seconds or minutes, number of transmission or receptions, or a combination thereof, etc.).

By way of example but not limitation, at least one portable wireless node may reemploy at least a portion of the multiple antenna assembly configuration parameters for the particular at least one orientation position of the at least one portable wireless node during wireless communication if an elapsed time comports with at least one temporal threshold (e.g., a smartphone may retry a number of different potential phase shifts for antenna signals, even if no movement has been detected, if 360 seconds have elapsed since the smartphone last tested different phase shifts). However, claimed subject matter is not limited to any particular described embodiments, implementations, examples, etc.

For certain example embodiments, an operation 7604 may be directed at least partially to wherein the employing multiple antenna assembly configuration parameters for a particular at least one orientation position of the at least one portable wireless node during wireless communication (of operation 6602) includes reemploying at least a portion of the multiple antenna assembly configuration parameters for the particular at least one orientation position of the at least one portable wireless node during wireless communication if an extent of movement comports with at least one spatial threshold. For certain example implementations, at least one device may reemploy (e.g., operate in accordance with, experiment with, implement at least partially sequentially or simultaneously, transmit or receive using, or a combination thereof, etc.) at least a portion of (e.g., previously employed) multiple antenna assembly configuration parameters 1070 for a particular at least one orientation position 1072OP of at least one portable wireless node 1002P during wireless communication (e.g., with a transmission or reception of at least one wireless link 1004) if an extent of movement (e.g., an amount of translational movement, a length of lateral movement, a delta of two different SPS coordinates, a size of change of spatial location, an amount of altitude difference, or a combination thereof, etc.) comports with (e.g., matches, meets, exceeds, equals, or a combination thereof, etc.) at least one spatial threshold 422 (e.g., a distance, a linear measurement, a length, a defined area, a volumetric indication, an SPS boundary, or a combination thereof, etc.). By way of example but not limitation, at least one portable wireless node may reemploy at least a portion of the multiple antenna assembly configuration parameters for the particular at least one orientation position of the at least one portable wireless node during wireless communication if an extent of movement comports with at least one spatial threshold (e.g., a smartphone may re-experiment with at least some previously-used temporal delays if a person walks more than a threshold distance even while holding their phone to their ear at the same angle as determined by an IMU or a GPS unit). However, claimed subject matter is not limited to any particular described embodiments, implementations, examples, etc.

For certain example embodiments, an operation 7606 may be directed at least partially to wherein the employing multiple antenna assembly configuration parameters for a particular at least one orientation position of the at least one portable wireless node during wireless communication (of operation 6602) includes employing multiple antenna assembly configuration parameters for a different particular at least one orientation position of the at least one portable wireless node during wireless communication if a degree of movement comports with at least one orientation threshold. For certain example implementations, at least one device may employ (e.g., operate in accordance with, experiment with, implement at least partially sequentially or simultaneously, transmit or receive using, or a combination thereof, etc.) multiple antenna assembly configuration parameters 1070 for a different particular at least one orientation position 1072OP of at least one portable wireless node 1002P during wireless communication (e.g., with a transmission or reception of at least one wireless link 1004) if a degree of movement (e.g., an amount of rotational movement, an amount of change in a gravitational force direction, a size of an absolute value of a difference in IMU measurements, a declination, an inclination, a spin, or a combination thereof, etc.) comports with (e.g., matches, meets, exceeds, equals, or a combination thereof, etc.) at least one orientation threshold 424 (e.g., a number of degrees, a number of radians, a change to an Euler angle, a percentage alteration to a yaw/pitch/roll, a size of declination or inclination, or a combination thereof, etc.). By way of example but not limitation, at least one portable wireless node may employ multiple antenna assembly configuration parameters for a different particular at least one orientation position of the at least one portable wireless node during wireless communication if a degree of movement comports with at least one orientation threshold (e.g., a tablet may try or retry different patch antennas from among six on-board patch antennas if an orientation position is changed by at least a threshold degree, such as if a screen is rotated from facing south to facing north, which is greater than 90 degrees, even if the spatial location is unchanged). However, claimed subject matter is not limited to any particular described embodiments, implementations, examples, etc.

For certain example embodiments, an operation 7608 may be directed at least partially to wherein the obtaining one or more antenna assembly configuration parameters that are associated with at least one orientation position of at least one portable wireless node (of operation 502) includes employing at least one antenna assembly configuration parameter for the at least one orientation position of the at least one portable wireless node to perform at least one transmission. For certain example implementations, at least one device may employ (e.g., operate in accordance with, experiment with, implement at least partially sequentially or simultaneously, transmit or receive using, or a combination thereof, etc.) at least one antenna assembly configuration parameter 1070 for at least one orientation position 1072OP of at least one portable wireless node 1002P to perform at least one transmission 1004T. By way of example but not limitation, at least one portable wireless node may employ at least one antenna assembly configuration parameter for the at least one orientation position of the at least one portable wireless node to perform at least one transmission (e.g., a tablet computer may transmit information to a counterpart wireless node using a first subset of a total set of available antenna elements or antenna junctions of an antenna assembly). However, claimed subject matter is not limited to any particular described embodiments, implementations, examples, etc.

For certain example embodiments, an operation 7610 may be directed at least partially to wherein the employing at least one antenna assembly configuration parameter for the at least one orientation position of the at least one portable wireless node to perform at least one transmission (of operation 7608) includes employing at least one different antenna assembly configuration parameter for the at least one orientation position of the at least one portable wireless node to perform at least one experimental reception. For certain example implementations, at least one device may employ at least one different antenna assembly configuration parameter 1070 for at least one orientation position 1072OP of at least one portable wireless node 1002P to perform at least one experimental reception 1004ER (e.g., a reception on which neither a user device nor a user is necessarily counting on decoding and using any of the received information for a purpose other than antenna or communication tuning). By way of example but not limitation, at least one portable wireless node may employ at least one different antenna assembly configuration parameter for the at least one orientation position of the at least one portable wireless node to perform at least one experimental reception (e.g., a tablet computer may transmit information to a counterpart wireless node using a first subset of a total set of available antenna elements or antenna junctions of an antenna assembly and receive data from a same or a different counterpart wireless node using a second subset of the total set of available antenna elements or antenna junctions of the antenna assembly, with at least one of the first and second subsets having at least one antenna element or antenna junction that is not present in the other—for instance, a tablet computer may engage in substantially simultaneous transmission and experimental reception, or vice versa). However, claimed subject matter is not limited to any particular described embodiments, implementations, examples, etc.

FIG. 6G2 illustrates a flow diagram 600G2 having any one or more of example operations 7612-7618. For certain example embodiments, an operation 7612 may be directed at least partially to wherein the obtaining one or more antenna assembly configuration parameters that are associated with at least one orientation position of at least one portable wireless node (of operation 502) includes experimenting with multiple antenna junctions for the at least one orientation position of the at least one portable wireless node to select the one or more antenna assembly configuration parameters. For certain example implementations, at least one device may experiment with (e.g., test, try, wirelessly communicate using, compare efficacy of different ones of, or a combination thereof, etc.) multiple antenna junctions 1020 (e.g., signal inputs, data inputs, control inputs, signal outputs, data outputs, control outputs, antenna connectors, antenna leads, antenna pads, or a combination thereof, etc.) for at least one orientation position 1072OP of at least one portable wireless node 1002P to select one or more antenna assembly configuration parameters 1070. By way of example but not limitation, at least one portable wireless node may experiment with multiple antenna junctions for the at least one orientation position of the at least one portable wireless node to select the one or more antenna assembly configuration parameters (e.g., a user equipment may try sending signals via different antenna leads to attempt to identify one or more antenna leads that provide a suitable link quality given a direction that the user equipment is currently facing). However, claimed subject matter is not limited to any particular described embodiments, implementations, examples, etc.

For certain example embodiments, an operation 7614 may be directed at least partially to wherein the experimenting with multiple antenna junctions for the at least one orientation position of the at least one portable wireless node to select the one or more antenna assembly configuration parameters (of operation 7612) includes experimenting with multiple subsets of antenna junctions for the at least one orientation position of the at least one portable wireless node to select the one or more antenna assembly configuration parameters. For certain example implementations, at least one device may experiment with multiple subsets (e.g., groups, collections, aggregations, a number of items having some common aspect, or a combination thereof, etc.) of antenna junctions 1020 for at least one orientation position 1072OP of at least one portable wireless node 1002P to select one or more antenna assembly configuration parameters 1070. By way of example but not limitation, at least one portable wireless node may experiment with multiple subsets of antenna junctions for the at least one orientation position of the at least one portable wireless node to select the one or more antenna assembly configuration parameters (e.g., a phablet may try sending signals via different groups of signal inputs/outputs of an antenna apparatus at different times or at different frequencies to attempt to identify at least one group of signal inputs/outputs that provide at least a satisfactory, if not a superior, link quality given a direction of a normal vector of a screen of the phablet). However, claimed subject matter is not limited to any particular described embodiments, implementations, examples, etc.

For certain example embodiments, an operation 7616 may be directed at least partially to wherein the experimenting with multiple subsets of antenna junctions for the at least one orientation position of the at least one portable wireless node to select the one or more antenna assembly configuration parameters (of operation 7614) includes experimenting with multiple subsets of antenna elements, which are coupled to the antenna junctions, for the at least one orientation position of the at least one portable wireless node to select the one or more antenna assembly configuration parameters for at least one antenna assembly that includes the antenna elements. For certain example implementations, at least one device may experiment with multiple sets of antenna elements 426 (e.g., a conducting structure, a receiving structure, a conducting slot or void, a receiving slot or void, radiating material, electromagnetically-excitable material, a metallic implement, a meta-material antenna element, an antenna patch, a transducing part, or a combination thereof, etc.), which are coupled to antenna junctions 1020, for at least one orientation position 1072OP of at least one portable wireless node 1002P to select one or more antenna assembly configuration parameters 1070 for at least one antenna assembly 1006* or 1006MM that includes antenna elements 426. By way of example but not limitation, at least one portable wireless node may experiment with multiple sets of antenna elements, which are coupled to the antenna junctions, for the at least one orientation position of the at least one portable wireless node to select the one or more antenna assembly configuration parameters for at least one antenna assembly that includes the antenna elements (e.g., a Samsung Galaxy device may test different groups of transducing structures, which are distributed around an outer portion of a housing and which are coupled to groups of antenna connectors, for a given rotation at which the device is being held to select a group of transducing structures of an antenna assembly). However, claimed subject matter is not limited to any particular described embodiments, implementations, examples, etc.

For certain example embodiments, an operation 7618 may be directed at least partially to wherein the utilizing the one or more antenna assembly configuration parameters that are associated with the at least one orientation position of the at least one portable wireless node (of operation 504) includes storing the one or more antenna assembly configuration parameters that are selected based, at least partially, on experimenting with multiple antenna elements for the at least one orientation position of the at least one portable wireless node. For certain example implementations, at least one device may store (e.g., save, record, memorialize, write, or a combination thereof, etc.) one or more antenna assembly configuration parameters 1070 that are selected based, at least partially, on experimenting with multiple antenna elements 426 (e.g., a conducting structure, a receiving structure, a conducting slot or void, a receiving slot or void, radiating material, electromagnetically-excitable material, a metallic implement, a meta-material antenna element, an antenna patch, a transducing part, or a combination thereof, etc.) for at least one orientation position 1072OP of at least one portable wireless node 1002P. By way of example but not limitation, at least one portable wireless node may store the one or more antenna assembly configuration parameters that are selected based, at least partially, on experimenting with multiple antenna elements for the at least one orientation position of the at least one portable wireless node (e.g., a hand-held media-consumption device may save to built-in or removal memory thereof an identification of one or more antenna apparatus inputs/outputs that are respectively coupled to one or more radiating structures given a current nearly-vertical orientation and based at least partially on a comparison of other tested antenna apparatus inputs/outputs). However, claimed subject matter is not limited to any particular described embodiments, implementations, examples, etc.

FIG. 6H1 illustrates a flow diagram 600H1 having any one or more of example operations 8602-8608. For certain example embodiments, an operation 8602 may be directed at least partially to wherein the obtaining one or more antenna assembly configuration parameters that are associated with at least one orientation position of at least one portable wireless node (of operation 502) includes obtaining the one or more antenna assembly configuration parameters that are associated with the at least one orientation position of the at least one portable wireless node for one or more resonant frequency adjustors of at least one antenna. For certain example implementations, at least one device may obtain one or more antenna assembly configuration parameters 1070 that are associated with at least one orientation position 1072OP of at least one portable wireless node 1002P for one or more resonant frequency adjustors 1080 of at least one antenna 1006. By way of example but not limitation, at least one portable wireless node may obtain the one or more antenna assembly configuration parameters that are associated with the at least one orientation position of the at least one portable wireless node for one or more resonant frequency adjustors of at least one antenna (e.g., an LTE or EHF-capable phone may obtain one or more values that are associated with an angle at which the phone is currently being held with the one or more values capable of controlling one or more resonant frequency adjustors of at least one meta-material antenna). However, claimed subject matter is not limited to any particular described embodiments, implementations, examples, etc.

For certain example embodiments, an operation 8604 may be directed at least partially to wherein the obtaining the one or more antenna assembly configuration parameters that are associated with the at least one orientation position of the at least one portable wireless node for one or more resonant frequency adjustors of at least one antenna (of operation 8602) includes obtaining one or more voltage levels that are associated with the at least one orientation position of the at least one portable wireless node for application to the one or more resonant frequency adjustors of the at least one antenna. For certain example implementations, at least one device may obtain one or more voltage levels 428 that are associated with at least one orientation position 1072OP of at least one portable wireless node 1002P for application to (e.g., for coupling to, for utilization with, for control of, for setting of, or a combination thereof, etc.) one or more resonant frequency adjustors 1080 of at least one antenna 1006. By way of example but not limitation, at least one portable wireless node may obtain one or more voltage levels that are associated with the at least one orientation position of the at least one portable wireless node for application to the one or more resonant frequency adjustors of the at least one antenna (e.g., an Apple iPad may retrieve from memory one or more voltage values that are associated with a position at which an iPad stand is holding the iPad and that are for coupling to liquid crystal materials proximate to multi-media antenna elements to set a resonant frequency thereof for different locations on a meta-material antenna surface). However, claimed subject matter is not limited to any particular described embodiments, implementations, examples, etc.

For certain example embodiments, an operation 8606 may be directed at least partially to wherein the utilizing the one or more antenna assembly configuration parameters that are associated with the at least one orientation position of the at least one portable wireless node (of operation 504) includes utilizing the one or more antenna assembly configuration parameters with at least one surface scattering antenna. For certain example implementations, at least one device may utilize one or more antenna assembly configuration parameters 1070 with at least one surface scattering antenna, such as a meta-material antenna 1006MM. By way of example but not limitation, at least one portable wireless node may utilize the one or more antenna assembly configuration parameters with at least one surface scattering antenna (e.g., a multi-purpose electronic communication device may operate an antenna that is capable of scattering electromagnetic waves from different locations of a surface of the antenna at different amplitudes of the electromagnetic waves responsive to one or more antenna configuration control signal values). However, claimed subject matter is not limited to any particular described embodiments, implementations, examples, etc.

For certain example embodiments, an operation 8608 may be directed at least partially to wherein the utilizing the one or more antenna assembly configuration parameters with at least one surface scattering antenna (of operation 8606) includes utilizing the one or more antenna assembly configuration parameters to adjust one or more resonant frequencies of one or more antenna elements of the at least one surface scattering antenna. For certain example implementations, at least one device may utilize one or more antenna assembly configuration parameters 1070 to adjust one or more resonant frequencies 430 of (e.g., a frequency matching, a frequency tuned to, a frequency providing a higher amplitude response than one or more other frequencies, or a combination thereof, etc.) one or more antenna elements, such as one or more meta-material antenna elements 1078, of at least one surface scattering antenna, such as a meta-material antenna 1006MM. By way of example but not limitation, at least one portable wireless node may utilize the one or more antenna assembly configuration parameters to adjust one or more resonant frequencies of one or more antenna elements of the at least one surface scattering antenna (e.g., an Android-based communication unit of a vehicle may configure an antenna that is capable of scattering electromagnetic waves from different locations of a surface of the antenna at different amplitudes of the electromagnetic waves responsive to at least one setting of one or more resonant frequencies of transducing elements at the different locations responsive to resonant-frequency-setting control signals). However, claimed subject matter is not limited to any particular described embodiments, implementations, examples, etc.

FIG. 6H2 illustrates a flow diagram 600H2 having any one or more of example operations 8610-8618. For certain example embodiments, an operation 8610 may be directed at least partially to wherein the utilizing the one or more antenna assembly configuration parameters that are associated with the at least one orientation position of the at least one portable wireless node (of operation 504) includes utilizing the one or more antenna assembly configuration parameters to adjust one or more resonant frequencies of at least one antenna assembly. For certain example implementations, at least one device may utilize one or more antenna assembly configuration parameters 1070 to adjust (e.g., change, increase, decrease, modify, reset, or a combination thereof, etc.) one or more resonant frequencies 430 of (e.g., a frequency matching, a frequency tuned to, a frequency providing a higher amplitude response than one or more other frequencies, or a combination thereof, etc.) at least one antenna assembly 1006, such as a meta-material antenna 1006MM. By way of example but not limitation, at least one portable wireless node may utilize the one or more antenna assembly configuration parameters to adjust one or more resonant frequencies of at least one antenna assembly (e.g., a smart phone may couple one or more control signals to at least one meta-material antenna to modify one or more resonant frequencies of, such as one or more frequencies at which electromagnetic radiation is more strongly emanated from, one or more different locations of the at least one meta-material antenna). However, claimed subject matter is not limited to any particular described embodiments, implementations, examples, etc.

For certain example embodiments, an operation 8612 may be directed at least partially to wherein the utilizing the one or more antenna assembly configuration parameters to adjust one or more resonant frequencies of at least one antenna assembly (of operation 8610) includes varying the one or more antenna assembly configuration parameters to adjust the one or more resonant frequencies of the at least one antenna assembly based, at least partially, on feedback from at least one base station. For certain example implementations, at least one device may vary (e.g., change, raise up, lower, alter, or a combination thereof, etc.) one or more antenna assembly configuration parameters 1070 to adjust one or more resonant frequencies 430 of at least one antenna assembly 1006, such as a meta-material antenna 1006MM, based, at least partially, on feedback 432 from at least one base station 435 (e.g., a cellular communications base station, a base transceiver station (BTS), a fixed WiMaxx node, a fixed Wi-Fi access point, a radio base station (RBS), or a combination thereof, etc.). By way of example but not limitation, at least one portable wireless node may vary the one or more antenna assembly configuration parameters to adjust the one or more resonant frequencies of the at least one antenna assembly based, at least partially, on feedback from at least one base station (e.g., an Asus Ultrabook may increase or decrease one or more different control signals to change one or more different resonant frequencies of at least one meta-material antenna based at least partially on at least one message received from a BTS indicating whether a signal from the Asus Ultrabook is of a higher or a lower quality as compared to a previous signal sent therefrom and received at the BTS). However, claimed subject matter is not limited to any particular described embodiments, implementations, examples, etc.

For certain example embodiments, an operation 8614 may be directed at least partially to wherein the varying the one or more antenna assembly configuration parameters to adjust the one or more resonant frequencies of the at least one antenna assembly based, at least partially, on feedback from at least one base station (of operation 8612) includes receiving from the at least one base station at least one measure of signal quality as determined at least partly responsive to at least one signal reception made at the at least one base station. By way of example but not limitation, at least one portable wireless node may receive from the at least one base station at least one measure of signal quality as determined at least partly responsive to at least one signal reception made at the at least one base station (e.g., an Asus tablet may receive from an RBS at least one signal-to-noise ratio (SNR) or received signal strength indicator (RSSI) that is calculated by the RBS at least partly in response to a signal received at the RBS from the Asus tablet). However, claimed subject matter is not limited to any particular described embodiments, implementations, examples, etc.

For certain example embodiments, an operation 8616 may be directed at least partially to wherein the utilizing the one or more antenna assembly configuration parameters that are associated with the at least one orientation position of the at least one portable wireless node (of operation 504) includes controlling at least one amplitude of electromagnetic radiation emanating from multiple locations of at least one antenna assembly by applying the one or more antenna assembly configuration parameters to form at least one electromagnetic beam. For certain example implementations, at least one device may control (e.g., set, adjust up or down, redirect, cause to be a particular level or value, impact at least partially, or a combination thereof, etc.) at least one amplitude (e.g., size, height, magnitude, or a combination thereof, etc.) of electromagnetic radiation 434 emanating (e.g., radiating, leaving, flowing, emitting, or a combination thereof, etc.) from multiple locations (e.g., spots, places, positions, meta-material antenna elements 1078, or a combination thereof, etc.) of at least one antenna assembly 1006, such as a meta-material antenna 1006MM, by applying (e.g., coupling to, putting into effect, using, or a combination thereof, etc.) one or more antenna assembly configuration parameters 1070 to form (e.g., create, generate through destructive or constructive combination, produce, or a combination thereof, etc.) at least one electromagnetic beam 1028. By way of example but not limitation, at least one portable wireless node may control at least one amplitude of electromagnetic radiation emanating from multiple locations of at least one antenna assembly by applying the one or more antenna assembly configuration parameters to form at least one electromagnetic beam (e.g., a smartphone may set magnitudes of radio frequency (RF) waves being generated at different spots of a meta-material antenna by supplying control signals to the different spots such that the RF waves from the different spots constructively or destructively combine to create an antenna beam pattern generated by the meta-material antenna). However, claimed subject matter is not limited to any particular described embodiments, implementations, examples, etc.

For certain example embodiments, an operation 8618 may be directed at least partially to wherein the controlling at least one amplitude of electromagnetic radiation emanating from multiple locations of at least one antenna assembly by applying the one or more antenna assembly configuration parameters to form at least one electromagnetic beam (of operation 8616) includes controlling the at least one amplitude of electromagnetic radiation emanating from the multiple locations of the at least one antenna assembly to form the at least one electromagnetic beam by applying the one or more antenna assembly configuration parameters to respective resonant frequency adjustors for respective ones of the multiple locations of the at least one antenna assembly. For certain example implementations, at least one device may control at least one amplitude of electromagnetic radiation 434 emanating from multiple locations of at least one antenna assembly 1006, such as a meta-material antenna 1006MM, to form at least one electromagnetic beam 1028 by applying the one or more antenna assembly configuration parameters 1070 to respective resonant frequency adjustors 1080 for respective ones of the multiple locations of at least one antenna assembly 1006. By way of example but not limitation, at least one portable wireless node may control the at least one amplitude of electromagnetic radiation emanating from the multiple locations of the at least one antenna assembly to form the at least one electromagnetic beam by applying the one or more antenna assembly configuration parameters to respective resonant frequency adjustors for respective ones of the multiple locations of the at least one antenna assembly (e.g., a smartphone may set magnitudes of radio frequency (RF) waves being generated at different spots of a meta-material antenna by supplying control signals to control signal junctions of liquid-crystal-based resonant frequency adjustors at the different spots such that the RF waves from the different spots constructively or destructively combine to create an antenna beam pattern generated by the meta-material antenna). However, claimed subject matter is not limited to any particular described embodiments, implementations, examples, etc.

FIG. 6I1 illustrates a flow diagram 600I1 having any one or more of example operations 9602-9618. For certain example embodiments, an operation 9602 may be directed at least partially to wherein the obtaining one or more antenna assembly configuration parameters that are associated with at least one orientation position of at least one portable wireless node (of operation 502) includes obtaining one or more indications of one or more phase shift values that are associated with the at least one orientation position of the at least one portable wireless node. For certain example implementations, at least one device may obtain one or more indications (e.g., description, code, identification, numerical value, signifier, explanation, or a combination thereof, etc.) of one or more phase shift values 436 (e.g., a number or numerical range, a setting implementing a phase shift, one or more switches or processing to realize a phase shift, a phase delay value, an identification of how or how much to change a phase or a timing of a signal, a selection or length of a signal phase delay line, or a combination thereof, etc.) that are associated with at least one orientation position 1072OP of at least one portable wireless node 1002P. By way of example but not limitation, at least one portable wireless node may obtain one or more indications of one or more phase shift values that are associated with the at least one orientation position of the at least one portable wireless node (e.g., an HTC Windows Phone may acquire an identification of a signal path that corresponds to a one-eight wavelength delay, which signal path identification corresponds to a current orientation at which the HTC Windows Phone is being held). However, claimed subject matter is not limited to any particular described embodiments, implementations, examples, etc.

For certain example embodiments, an operation 9604 may be directed at least partially to wherein the obtaining one or more antenna assembly configuration parameters that are associated with at least one orientation position of at least one portable wireless node (of operation 502) includes obtaining one or more indications of one or more temporal delay values that are associated with the at least one orientation position of the at least one portable wireless node. For certain example implementations, at least one device may obtain one or more indications (e.g., description, code, identification, numerical value, signifier, explanation, or a combination thereof, etc.) of one or more temporal delay values 438 (e.g., a number or numerical range, a setting implementing a temporal delay, one or more switches or processing to realize a temporal delay, a time shifting value, an identification of how or how much to change a timing or a phase of a signal, a selection or length of a signal timing delay line, or a combination thereof, etc.) that are associated with at least one orientation position 1072OP of at least one portable wireless node 1002P. By way of example but not limitation, at least one portable wireless node may obtain one or more indications of one or more temporal delay values that are associated with the at least one orientation position of the at least one portable wireless node (e.g., a Samsung Bada phone may acquire 30 millisecond and 22.5 millisecond delay values for signal(s) being coupled toward two different antenna elements, which two delay values correspond to a current orientation at which the Samsung Bada phone is being used). However, claimed subject matter is not limited to any particular described embodiments, implementations, examples, etc.

For certain example embodiments, an operation 9606 may be directed at least partially to wherein the obtaining one or more antenna assembly configuration parameters that are associated with at least one orientation position of at least one portable wireless node (of operation 502) includes obtaining one or more indications of one or more phased array values that are associated with the at least one orientation position of the at least one portable wireless node. For certain example implementations, at least one device may obtain one or more indications (e.g., description, code, identification, numerical value, signifier, explanation, or a combination thereof, etc.) of one or more phased array values 440 (e.g., a number or numerical range, a setting implementing directionality or beamforming, one or more switches or processing to realize a directed or beamformed signal, an explanation of how or how much to change a direction or a shape of a signal wave or beam, an identification of which antenna patch or antenna patches to employ, a matrix of values to program operation of an array-based antenna, or a combination thereof, etc.) that are associated with at least one orientation position 1072OP of at least one portable wireless node 1002P. By way of example but not limitation, at least one portable wireless node may obtain one or more indications of one or more phased array values that are associated with the at least one orientation position of the at least one portable wireless node (e.g., an Apple iPhone may receive a reference to or a code indicating how to configure an antenna assembly to direct a wave front or beam pattern in a desired direction, which code corresponds to an expected or predicted upcoming direction in which the iPhone will be held once it reaches a user's ear/head area). However, claimed subject matter is not limited to any particular described embodiments, implementations, examples, etc.

For certain example embodiments, an operation 9608 may be directed at least partially to wherein the obtaining one or more antenna assembly configuration parameters that are associated with at least one orientation position of at least one portable wireless node (of operation 502) includes obtaining one or more indications of one or more antenna element subsets that are associated with the at least one orientation position of the at least one portable wireless node. For certain example implementations, at least one device may obtain one or more indications (e.g., description, code, identification, numerical value, signifier, explanation, or a combination thereof, etc.) of one or more antenna element subsets 442 (e.g., a listing or group of antenna elements, a listing or group of antenna junctions coupled to antenna elements, a subset of—or less than all of—an available set of antenna elements, a matrix or process coupling less than all available antenna elements to a receive or transmit chain, or a combination thereof, etc.) that are associated with at least one orientation position 1072OP of at least one portable wireless node 1002P. By way of example but not limitation, at least one portable wireless node may obtain one or more indications of one or more antenna element subsets that are associated with the at least one orientation position of the at least one portable wireless node (e.g., an Apple iPad may retrieve a listing of four identifiers of four antenna elements—out of sixteen available ones—on which to transceive including three on one edge and a fourth on another edge of the iPad, which listing corresponds to a typical orientation adopted by a user when a video streaming app is activated). However, claimed subject matter is not limited to any particular described embodiments, implementations, examples, etc.

For certain example embodiments, an operation 9610 may be directed at least partially to wherein the obtaining one or more antenna assembly configuration parameters that are associated with at least one orientation position of at least one portable wireless node (of operation 502) includes obtaining one or more indications of one or more resonant frequency adjustor control values that are associated with the at least one orientation position of the at least one portable wireless node. For certain example implementations, at least one device may obtain one or more indications (e.g., description, code, identification, numerical value, signifier, explanation, or a combination thereof, etc.) of one or more resonant frequency adjustor control values 444 (e.g., a number or numerical range, a current, a voltage level, a representation of control input to set a resonant frequency of at least one position on a surface scattering antenna, a matrix or process to establish one or more resonant frequencies of a meta-material antenna, or a combination thereof, etc.) that are associated with at least one orientation position 1072OP of at least one portable wireless node 1002P. By way of example but not limitation, at least one portable wireless node may obtain one or more indications of one or more resonant frequency adjustor control values that are associated with the at least one orientation position of the at least one portable wireless node (e.g., a Nexus communication device may via experimentation ascertain 12 electrical, magnetic, mechanical, or a combination thereof, etc. signals that facilitate communication when/if the Nexus communication device has a normal vector from the screen that is 180 degrees opposite to that of a gravitational force vector, with the 12 signals respectively corresponding to 12 resonant frequency adjustors of a meta-material antenna). However, claimed subject matter is not limited to any particular described embodiments, implementations, examples, etc.

For certain example embodiments, an operation 9612 may be directed at least partially to wherein the obtaining one or more indications of one or more resonant frequency adjustor control values that are associated with the at least one orientation position of the at least one portable wireless node (of operation 9610) includes obtaining one or more indications of one or more voltage levels that are associated with the at least one orientation position of the at least one portable wireless node. For certain example implementations, at least one device may obtain one or more indications of one or more voltage levels (e.g., a number or numerical range, a value in volts, a function that produces a value in volts, a mechanism to apply a voltage level, or a combination thereof, etc.) that are associated with at least one orientation position 1072OP of at least one portable wireless node 1002P. By way of example but not limitation, at least one portable wireless node may obtain one or more indications of one or more voltage levels that are associated with the at least one orientation position of the at least one portable wireless node (e.g., a Nexus communication device may retrieve from a data structure 12 voltage values that facilitate communication when/if the Nexus communication device has a normal vector from the screen that is 180 degrees opposite to that of a gravitational force vector, with the 12 voltage values respectively corresponding to 12 liquid-crystal-based resonant frequency adjustors of a meta-material antenna). However, claimed subject matter is not limited to any particular described embodiments, implementations, examples, etc.

For certain example embodiments, an operation 9614 may be directed at least partially to wherein the obtaining one or more antenna assembly configuration parameters that are associated with at least one orientation position of at least one portable wireless node (of operation 502) includes determining the one or more antenna assembly configuration parameters that are associated with the at least one orientation position of the at least one portable wireless node based, at least partially, on one or more different antenna assembly configuration parameters that are associated with at least one different orientation position. For certain example implementations, at least one device may determine (e.g., calculate, interpolate, extrapolate, ascertain from evidence, figure out, or a combination thereof, etc.) one or more antenna assembly configuration parameters 1070 that are associated with at least one orientation position 1072OP of at least one portable wireless node 1002P based, at least partially, on one or more different antenna assembly configuration parameters 1070D that are associated with at least one different orientation position 1072DOP. By way of example but not limitation, at least one portable wireless node may determine the one or more antenna assembly configuration parameters that are associated with the at least one orientation position of the at least one portable wireless node based, at least partially, on one or more different antenna assembly configuration parameters that are associated with at least one different orientation position (e.g., a watch may determine a set of phase delays for a current orientation position of the watch using a known set of phase delays for a different orientation position that is rotated approximately 90 degrees along two axes with respect to the current orientation position). However, claimed subject matter is not limited to any particular described embodiments, implementations, examples, etc.

For certain example embodiments, an operation 9616 may be directed at least partially to wherein the determining the one or more antenna assembly configuration parameters that are associated with the at least one orientation position of the at least one portable wireless node based, at least partially, on one or more different antenna assembly configuration parameters that are associated with at least one different orientation position (of operation 9614) includes extrapolating the one or more antenna assembly configuration parameters that are associated with the at least one orientation position of the at least one portable wireless node based, at least partially, on the one or more different antenna assembly configuration parameters that are associated with the at least one different orientation position. By way of example but not limitation, at least one portable wireless node may extrapolate the one or more antenna assembly configuration parameters that are associated with the at least one orientation position of the at least one portable wireless node based, at least partially, on the one or more different antenna assembly configuration parameters that are associated with the at least one different orientation position (e.g., a pair of glasses may determine at least one indicator of a direction in which to emanate an electromagnetic wave when a user's head is pointing north via extension using a first known direction for emanating electromagnetic waves when a user's head is pointing south and using a second known direction for emanating electromagnetic waves when a user's head is pointing east). However, claimed subject matter is not limited to any particular described embodiments, implementations, examples, etc.

For certain example embodiments, an operation 9618 may be directed at least partially to wherein the determining the one or more antenna assembly configuration parameters that are associated with the at least one orientation position of the at least one portable wireless node based, at least partially, on one or more different antenna assembly configuration parameters that are associated with at least one different orientation position (of operation 9614) includes interpolating the one or more antenna assembly configuration parameters that are associated with the at least one orientation position of the at least one portable wireless node based, at least partially, on the one or more different antenna assembly configuration parameters that are associated with the at least one different orientation position. By way of example but not limitation, at least one portable wireless node may interpolate the one or more antenna assembly configuration parameters that are associated with the at least one orientation position of the at least one portable wireless node based, at least partially, on the one or more different antenna assembly configuration parameters that are associated with the at least one different orientation position (e.g., a wireless device with video projection capabilities may determine a set of antenna junctions for receiving an electromagnetic wave when the device is 60 degrees from horizontal via a comparison including a first known set of antenna junctions for receiving electromagnetic waves when the device is 45 degrees from horizontal and including a second known set of antenna junctions for receiving electromagnetic waves when the device is 75 degrees from horizontal). However, claimed subject matter is not limited to any particular described embodiments, implementations, examples, etc.

FIG. 6I2 illustrates a flow diagram 60012 having any one or more of example operations 9620-9630. For certain example embodiments, an operation 9620 may be directed at least partially to wherein the obtaining one or more antenna assembly configuration parameters that are associated with at least one orientation position of at least one portable wireless node (of operation 502) includes determining the one or more antenna assembly configuration parameters that are associated with the at least one orientation position of the at least one portable wireless node based, at least partially, on one or more different antenna assembly configuration parameters that are associated with the at least one orientation position at a different spatial location entry stored in at least one antenna configuration data structure. For certain example implementations, at least one device may determine (e.g., calculate, interpolate, extrapolate, ascertain from evidence, figure out, or a combination thereof, etc.) one or more antenna assembly configuration parameters 1070 that are associated with at least one orientation position 1072OP of at least one portable wireless node 1002P based, at least partially, on one or more different antenna assembly configuration parameters 1070D that are associated with at least one orientation position 1072OP at a different spatial location entry 446 stored in at least one antenna configuration data structure 1008. By way of example but not limitation, at least one portable wireless node may determine the one or more antenna assembly configuration parameters that are associated with the at least one orientation position of the at least one portable wireless node based, at least partially, on one or more different antenna assembly configuration parameters that are associated with the at least one orientation position at a different spatial location entry stored in at least one antenna configuration data structure (e.g., a smart phone may ascertain a set of phase delays that correspond to a current orientation position—such as a top edge pointing up—and a current spatial location—such as a living room— by retrieving from a data structure a set of phase delays that correspond to the current orientation position—top edge pointing up—but are stored in an entry pertaining to a spatial location—such as the kitchen—that is different from the current spatial location—the living room). However, claimed subject matter is not limited to any particular described embodiments, implementations, examples, etc.

For certain example embodiments, an operation 9622 may be directed at least partially to wherein the obtaining one or more antenna assembly configuration parameters that are associated with at least one orientation position of at least one portable wireless node (of operation 502) includes obtaining the one or more antenna assembly configuration parameters that are associated with the at least one orientation position of the at least one portable wireless node from another portable wireless node. For certain example implementations, at least one device may obtain one or more antenna assembly configuration parameters 1070 that are associated with at least one orientation position 1072OP of at least one portable wireless node 1002P from another portable wireless node 1002P0. By way of example but not limitation, at least one portable wireless node may obtain the one or more antenna assembly configuration parameters that are associated with the at least one orientation position of the at least one portable wireless node from another portable wireless node (e.g., an Apple iPhone may acquire one or more resonance frequency adjustment values for a horizontal positioning from an Apple iPad that is present in a same restaurant). However, claimed subject matter is not limited to any particular described embodiments, implementations, examples, etc.

For certain example embodiments, an operation 9624 may be directed at least partially to wherein the obtaining the one or more antenna assembly configuration parameters that are associated with the at least one orientation position of the at least one portable wireless node from another portable wireless node (of operation 9622) includes obtaining the one or more antenna assembly configuration parameters that are associated with the at least one orientation position of the at least one portable wireless node from the other portable wireless node via at least one local wireless link. By way of example but not limitation, at least one portable wireless node may obtain the one or more antenna assembly configuration parameters that are associated with the at least one orientation position of the at least one portable wireless node from the other portable wireless node via at least one local wireless link (e.g., a new Samsung Galaxy smartphone may acquire from an older Samsung Galaxy smartphone an indication of which antenna junctions to activate if the new Samsung Galaxy smartphone is tilted 45 degrees and pointed west-north-west using a Bluetooth connection or an NFC connection between the two Samsung Galaxy smartphones). However, claimed subject matter is not limited to any particular described embodiments, implementations, examples, etc.

For certain example embodiments, an operation 9626 may be directed at least partially to wherein the obtaining one or more antenna assembly configuration parameters that are associated with at least one orientation position of at least one portable wireless node (of operation 502) includes obtaining the one or more antenna assembly configuration parameters that are associated with the at least one orientation position of the at least one portable wireless node in at least partial dependence on an existence of an auxiliary relay item that is wirelessly linked to the at least one portable wireless node. For certain example implementations, at least one device may obtain one or more antenna assembly configuration parameters 1070 that are associated with at least one orientation position 1072OP of at least one portable wireless node 1002P in at least partial dependence on an existence (e.g., a presence, a proximity sufficient to enable wireless communication, a knowledge, or a combination thereof, etc.) of an auxiliary relay item 1036 that is wirelessly linked to (e.g., synchronized with, capable of wireless communication with, aware of one another, or a combination thereof, etc.) at least one portable wireless node 1002P. By way of example but not limitation, at least one portable wireless node may obtain the one or more antenna assembly configuration parameters that are associated with the at least one orientation position of the at least one portable wireless node in at least partial dependence on an existence of an auxiliary relay item that is wirelessly linked to the at least one portable wireless node (e.g., a smart phone or Bluetooth headset may retrieve one or more directions with which to transceive based at least partially on knowledge that a hat wireless relay item is available, with the one or more directions intended to aim towards a top of a head of a user given an orientation of the smart phone or Bluetooth headset). However, claimed subject matter is not limited to any particular described embodiments, implementations, examples, etc.

For certain example embodiments, an operation 9628 may be directed at least partially to wherein the obtaining the one or more antenna assembly configuration parameters that are associated with the at least one orientation position of the at least one portable wireless node in at least partial dependence on an existence of an auxiliary relay item that is wirelessly linked to the at least one portable wireless node (of operation 9626) includes obtaining the one or more antenna assembly configuration parameters that are associated with the at least one orientation position of the at least one portable wireless node in at least partial dependence on an existence of a watch that is wirelessly linked to the at least one portable wireless node. By way of example but not limitation, at least one portable wireless node may obtain the one or more antenna assembly configuration parameters that are associated with the at least one orientation position of the at least one portable wireless node in at least partial dependence on an existence of a watch that is wirelessly linked to the at least one portable wireless node (e.g., a smart phone may receive one or more identified antenna elements with which to transceive based at least partially on a stored indicator that a watch relay item is available and knowledge that the watch relay item has a clearer view of a remote counterpart wireless node, with the one or more identified antenna elements intended to form a beam pattern that aims towards at least one wrist of a user given that the smart phone is being held vertically against the user's head). However, claimed subject matter is not limited to any particular described embodiments, implementations, examples, etc.

For certain example embodiments, an operation 9630 may be directed at least partially to wherein the utilizing the one or more antenna assembly configuration parameters that are associated with the at least one orientation position of the at least one portable wireless node (of operation 504) includes utilizing the one or more antenna assembly configuration parameters that are associated with the at least one orientation position of the at least one portable wireless node to transceive with at least one base station via at least one auxiliary relay item. For certain example implementations, at least one device may utilize one or more antenna assembly configuration parameters 1070 that are associated with at least one orientation position 1072OP of at least one portable wireless node 1002P to transceive (e.g., transmit, receive, wirelessly communicate, or a combination thereof, etc.) with at least one base station 435 (e.g., a cellular communications base station, a base transceiver station (BTS), a fixed WiMaxx node, a fixed Wi-Fi access point, a radio base station (RBS), or a combination thereof, etc.) via at least one auxiliary relay item 1036. By way of example but not limitation, at least one portable wireless node may utilize the one or more antenna assembly configuration parameters that are associated with the at least one orientation position of the at least one portable wireless node to transceive with at least one base station via at least one auxiliary relay item (e.g., a mobile phone may apply to an antenna assembly of the mobile phone a set of variables or a procedure, which correspond to at least one angle at which the mobile phone is being held, to direct a signal from the mobile phone toward a watch on a user's wrist to facilitate using the watch as a relay or repeater between (i) the mobile phone and (ii) a Wi-Fi access point or a cellular antenna). However, claimed subject matter is not limited to any particular described embodiments, implementations, examples, etc.

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for facilitating wireless communication in conjunction with orientation position, the method being at least partially implemented by at least one device, the method comprising:
   receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item; and
   utilizing the one or more antenna assembly configuration parameters associated with the at least one orientation position of the at least one portable wireless node.

2. A system for facilitating wireless communication in conjunction with orientation position, the system comprising:
   means for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item; and
   means for utilizing the one or more antenna assembly configuration parameters associated with the at least one orientation position of the at least one portable wireless node.

3. An apparatus for facilitating wireless communication in conjunction with orientation position, the apparatus comprising:
   circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item; and
   circuitry for utilizing the one or more antenna assembly configuration parameters associated with the at least one orientation position of the at least one portable wireless node.

4. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
   circuitry for receiving one or more antenna assembly configuration parameters associated with at least one orientation position of at least one portable wireless node to facilitate at least one transmission from the at least one portable wireless node to the at least one remote node, the one or more antenna assembly configuration parameters received from a relay item in communication with the at least one remote node and received in response to a request from the at least one portable wireless node to the relay item to provide the one or more antenna assembly configuration parameters, the request sent to the relay item subsequent to a determination that a communication link between the relay item and the at least one remote node has greater signal quality than a communication link between the at least one portable wireless node and the at least one remote node.

5. The apparatus of claim 4, wherein circuitry for utilizing the one or more antenna assembly configuration parameters associated with the at least one orientation position of the at least one portable wireless node comprises:
   circuitry for storing the one or more antenna assembly configuration parameters with at least one antenna configuration data structure.

6. The apparatus of claim 4, wherein circuitry for utilizing the one or more antenna assembly configuration parameters associated with the at least one orientation position of the at least one portable wireless node comprises:

circuitry for communicating with at least one other wireless node using the one or more antenna assembly configuration parameters that are received from at least one remote node.

7. The apparatus of claim 4, wherein circuitry for receiving one or more antenna assembly configuration parameters associated with at least one orientation position of at least one portable wireless node from at least one remote node comprises:
 circuitry for employing multiple antenna assembly configuration parameters for a particular at least one orientation position of the at least one portable wireless node during wireless communication.

8. The apparatus of claim 7, wherein circuitry for employing multiple antenna assembly configuration parameters for a particular at least one orientation position of the at least one portable wireless node during wireless communication comprises:
 circuitry for ascertaining the one or more antenna assembly configuration parameters from among the multiple antenna assembly configuration parameters for the particular at least one orientation position of the at least one portable wireless node based, at least partially, on at least one measure of signal quality.

9. The apparatus of claim 7, wherein circuitry for employing multiple antenna assembly configuration parameters for a particular at least one orientation position of the at least one portable wireless node during wireless communication comprises:
 circuitry for ascertaining the one or more antenna assembly configuration parameters from among the multiple antenna assembly configuration parameters for the particular at least one orientation position of the at least one portable wireless node based, at least partially, on at least one measure of power.

10. The apparatus of claim 9, wherein circuitry for ascertaining the one or more antenna assembly configuration parameters from among the multiple antenna assembly configuration parameters for the particular at least one orientation position of the at least one portable wireless node based, at least partially, on at least one measure of power comprises:
 circuitry for ascertaining the one or more antenna assembly configuration parameters from among the multiple antenna assembly configuration parameters for the particular at least one orientation position of the at least one portable wireless node based, at least partially, on at least one power constraint.

11. The apparatus of claim 7, wherein circuitry for employing multiple antenna assembly configuration parameters for a particular at least one orientation position of the at least one portable wireless node during wireless communication comprises:
 circuitry for reemploying at least a portion of the multiple antenna assembly configuration parameters for the particular at least one orientation position of the at least one portable wireless node during wireless communication if an extent of movement comports with at least one spatial threshold.

12. The apparatus of claim 7, wherein circuitry for employing multiple antenna assembly configuration parameters for a particular at least one orientation position of the at least one portable wireless node during wireless communication comprises:
 circuitry for employing multiple antenna assembly configuration parameters for a different particular at least one orientation position of the at least one portable wireless node during wireless communication if a degree of movement comports with at least one orientation threshold.

13. The apparatus of claim 4, wherein circuitry for utilizing the one or more antenna assembly configuration parameters associated with the at least one orientation position of the at least one portable wireless node comprises:
 circuitry for utilizing the one or more antenna assembly configuration parameters with at least one surface scattering antenna.

14. The apparatus of claim 4, wherein circuitry for utilizing the one or more antenna assembly configuration parameters associated with the at least one orientation position of the at least one portable wireless node comprises:
 circuitry for utilizing the one or more antenna assembly configuration parameters to adjust one or more resonant frequencies of at least one antenna assembly.

15. The apparatus of claim 14, wherein circuitry for utilizing the one or more antenna assembly configuration parameters to adjust one or more resonant frequencies of at least one antenna assembly comprises:
 circuitry for varying the one or more antenna assembly configuration parameters to adjust the one or more resonant frequencies of the at least one antenna assembly based, at least partially, on feedback from at least one base station.

16. The apparatus of claim 4, wherein circuitry for utilizing the one or more antenna assembly configuration parameters associated with the at least one orientation position of the at least one portable wireless node comprises:
 circuitry for controlling at least one amplitude of electromagnetic radiation emanating from multiple locations of at least one antenna assembly by applying the one or more antenna assembly configuration parameters to form at least one electromagnetic beam.

17. The apparatus of claim 4, wherein circuitry for utilizing the one or more antenna assembly configuration parameters associated with the at least one orientation position of the at least one portable wireless node comprises:
 circuitry for utilizing one or more antenna assembly configuration parameters associated with the at least one orientation position of the at least one portable wireless node to transceive with at least one base station via at least one auxiliary relay item.

18. The apparatus of claim 4, wherein circuitry for receiving one or more antenna assembly configuration parameters associated with at least one orientation position of at least one portable wireless node from at least one remote node comprises:
 circuitry for receiving a plurality of antenna assembly configuration parameters associated with a plurality of spatial locations, wherein the portable wireless node is outside of radio frequency range of the at least one remote node during the receiving.

19. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving one or more antenna assembly configuration parameters that are associated with at least one spatial location or geographical position of the at least one portable wireless node.

20. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving one or more antenna assembly configuration parameters associated with at least one predicted upcoming orientation position of the at least one portable wireless node.

21. The apparatus of claim 20, wherein circuitry for receiving one or more antenna assembly configuration parameters associated with at least one predicted upcoming orientation position of the at least one portable wireless node comprises:

circuitry for receiving one or more antenna assembly configuration parameters associated with at least one predicted upcoming orientation position of the at least one portable wireless node, including at least a predicted upcoming orientation position of a first part of the at least one portable wireless node relative to a second part of the at least one portable wireless node.

22. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving one or more antenna assembly configuration parameters that are associated with at least one Euler value of at least one portable wireless node.

23. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving the one or more antenna assembly configuration parameters that are associated with the at least one orientation position of the at least one portable wireless node with the at least one orientation position representative of at least one direction to which at least a portion of the at least one portable wireless node at least one of points or faces.

24. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving for at least one meta-material antenna or at least one array-based antenna the one or more antenna assembly configuration parameters that are associated with the at least one orientation position of the at least one portable wireless node.

25. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for retrieving the one or more antenna assembly configuration parameters that are associated with the at least one orientation position of the at least one portable wireless node from at least one memory of the at least one portable wireless node.

26. The apparatus of claim 3, wherein circuitry for utilizing the one or more antenna assembly configuration parameters associated with the at least one orientation position of the at least one portable wireless node comprises:

circuitry for employing the one or more antenna assembly configuration parameters with at least one antenna assembly of the at least one portable wireless node.

27. The apparatus of claim 26, wherein circuitry for employing the one or more antenna assembly configuration parameters with at least one antenna assembly of the at least one portable wireless node comprises:

circuitry for coupling one or more signals to one or more junctions of the at least one antenna assembly based, at least partially, on the one or more antenna assembly configuration parameters.

28. The apparatus of claim 26, wherein circuitry for employing the one or more antenna assembly configuration parameters with at least one antenna assembly of the at least one portable wireless node comprises:

circuitry for forming at least one beam using the at least one antenna assembly based, at least partially, on the one or more antenna assembly configuration parameters.

29. The apparatus of claim 26, wherein circuitry for employing the one or more antenna assembly configuration parameters with at least one antenna assembly of the at least one portable wireless node comprises:

circuitry for communicating with at least one other wireless node using the at least one antenna assembly of the at least one portable wireless node with the at least one antenna assembly configured in accordance with the one or more antenna assembly configuration parameters.

30. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for receiving one or more condition-configuration parameter associations from the at least one remote node.

31. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for receiving one or more indications of at least one condition that may be experienced by the at least one portable wireless node and one or more indications of at least one antenna assembly configuration parameter that are to be associated therewith.

32. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for receiving from the at least one remote node multiple antenna assembly configuration parameters for multiple orientation positions that correspond to at least one spatial location of the at least one portable wireless node.

33. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for transmitting to at least one remote node at least a portion of at least one physical state of the at least one portable wireless node.

34. The apparatus of claim 33, wherein circuitry for transmitting to at least one remote node at least a portion of at least one physical state of the at least one portable wireless node comprises:
  circuitry for transmitting to the at least one remote node at least a portion of at least one elevation position of the at least one portable wireless node.

35. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for employing at least one different antenna assembly configuration parameter for the at least one orientation position of the at least one portable wireless node to perform at least one experimental reception.

36. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for experimenting with multiple antenna junctions for the at least one orientation position of the at least one portable wireless node to select the one or more antenna assembly configuration parameters.

37. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:
  circuitry for determining the one or more antenna assembly configuration parameters that are associated with the at least one orientation position of the at least one portable wireless node based, at least partially, on one or more different antenna assembly configuration parameters associated with at least one different orientation position.

38. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for determining the one or more antenna assembly configuration parameters associated with the at least one orientation position of the at least one portable wireless node based, at least partially, on one or more different antenna assembly configuration parameters associated with the at least one orientation position at a different spatial location entry stored in at least one antenna configuration data structure.

39. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving one or more antenna assembly configuration parameters associated with at least one orientation position of the at least one portable wireless node from another portable wireless node as the relay item, the another portable wireless node wirelessly linked to the at least one remote node.

40. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving the one or more antenna assembly configuration parameters that are associated with the at least one orientation position of the at least one portable wireless node in at least partial dependence on an existence of an auxiliary relay item that is wirelessly linked to the at least one portable wireless node.

41. The apparatus of claim 3, wherein circuitry for receiving one or more antenna assembly configuration parameters associated with at least one orientation position of at least one portable wireless node from a relay item wirelessly linked to at least one remote node at least partly in response to transmitting the at least one orientation position of the at least one portable wireless node, the received one or more antenna assembly configuration parameters defining at least one antenna beam orientation relative to the at least one orientation position of the at least one portable wireless node based on an expected location and orientation of the at least one portable wireless node with respect to an expected location of the relay item comprises:

circuitry for receiving the one or more antenna assembly configuration parameters from a relay item wirelessly linked to at least one remote node at least partly in response to transmitting the at least one spatial position of the at least one portable wireless node.

\* \* \* \* \*